(12) United States Patent
Meyhofer et al.

(10) Patent No.: US 12,523,625 B2
(45) Date of Patent: Jan. 13, 2026

(54) CALORIMETER

(71) Applicants: The Regents of the University of Michigan, Ann Arbor, MI (US); Google LLC, Mountain View, CA (US)

(72) Inventors: Edgar Meyhofer, Ann Arbor, MI (US); Pramod Reddy, Ann Arbor, MI (US); David Fork, Mountain View, CA (US); Ju Won Lim, Ann Arbor, MI (US); Amin Reihani, Ann Arbor, MI (US)

(73) Assignees: The Regents of the University of Michigan, Ann Arbor, MI (US); Google LLC, Mountain View, CA (US)

( * ) Notice: Subject to any disclaimer, the term of this patent is extended or adjusted under 35 U.S.C. 154(b) by 359 days.

(21) Appl. No.: 18/034,096

(22) PCT Filed: Oct. 20, 2021

(86) PCT No.: PCT/US2021/055835
§ 371 (c)(1),
(2) Date: Apr. 27, 2023

(87) PCT Pub. No.: WO2022/093595
PCT Pub. Date: May 5, 2022

(65) Prior Publication Data
US 2023/0400426 A1    Dec. 14, 2023

Related U.S. Application Data

(60) Provisional application No. 63/108,024, filed on Oct. 30, 2020.

(51) Int. Cl.
*G01N 25/48* (2006.01)
*G01N 25/20* (2006.01)

(52) U.S. Cl.
CPC ........... *G01N 25/484* (2013.01); *G01N 25/20* (2013.01); *G01N 25/4826* (2013.01); *G01N 25/486* (2013.01); *G01N 25/4886* (2013.01)

(58) Field of Classification Search
CPC ............. G01N 25/484; G01N 25/4826; G01N 25/486; G01N 25/4886; G01N 25/20
(Continued)

(56) References Cited

U.S. PATENT DOCUMENTS 3,266,307 A    8/1966  Winter
4,072,050 A    2/1978  Ter-Minassian
(Continued)

FOREIGN PATENT DOCUMENTS

DE    3839798    6/1990
FR    2962539    1/2012

OTHER PUBLICATIONS

Translation of DE 3839798A1 (Year: 1990).*
(Continued)

*Primary Examiner* — Mirellys Jagan
(74) *Attorney, Agent, or Firm* — Casimir Jones; Thomas A. Isenbarger

(57) ABSTRACT

Provided herein is technology relating to calorimetry and particularly, but not exclusively, to apparatuses, methods, and systems for making high-resolution thermodynamic measurements of reactions between gas phase reactants and nanomaterials. For example, the technology can provide thermodynamic measurements with a high heat flow resolution and long term stability at a wide range of temperatures and reaction pressures. The technology is used, for example, to study the thermodynamics of surface reactions and phase transformations in nanomaterials.

17 Claims, 35 Drawing Sheets

(58) Field of Classification Search
USPC .......................................................... 374/31
See application file for complete search history.

(56) References Cited

U.S. PATENT DOCUMENTS

| | | | |
|---|---|---|---|
| 4,095,453 | A | 6/1978 | Woo |
| 4,159,057 | A | 6/1979 | Teramoto |
| 4,869,597 | A | 9/1989 | Christopher |
| 6,572,263 | B1 | 6/2003 | Refalo et al. |
| 8,931,950 | B2 | 1/2015 | King et al. |
| 2006/0133951 | A1 | 6/2006 | Hunter et al. |
| 2008/0166792 | A1* | 7/2008 | Attar ...................... G01N 21/78 422/400 |
| 2008/0247441 | A1* | 10/2008 | Salvetti .................. G01K 17/00 374/33 |
| 2010/0290501 | A1 | 11/2010 | De Bruyker et al. |
| 2013/0344612 | A1 | 12/2013 | Zuo |
| 2015/0219574 | A1 | 8/2015 | Yao |
| 2015/0260665 | A1 | 9/2015 | Nishimura et al. |
| 2016/0216259 | A1 | 7/2016 | Chang et al. |
| 2019/0003995 | A1* | 1/2019 | Monaselidze ........ G01N 33/483 |
| 2020/0015685 | A1* | 1/2020 | Reddy .................... G01N 25/20 |
| 2020/0064286 | A1 | 2/2020 | Adidharma et al. |

OTHER PUBLICATIONS

International Search Report and Written Opinion for PCT/US21/55835 mailed Jan. 12, 2022. 17 pages.
Akiba et al., Development of adiabatic calorimetry system for enthalpy of gas absorption/adsorption and its application to H2/D2 absorption into palladium nanoparticles. Thermochimica Acta 2018, 670, 87-91.
Assael et al., Thermal conductivity of polymethyl methacrylate (PMMA) and borosilicate crown glass BK7. International Journal of Thermophysics 2005, 26 (5), 1595-1605.
Astrom et al., Computer-controlled systems: theory and design. Prentice Hall, 1997, TOC only. 10 pages.
Bardhan et al., Uncovering the intrinsic size dependence of hydriding phase transformations in nanocrystals. Nature materials 2013, 12 (10), 905-912.
Behm et al., Evidence for "subsurface"hydrogen on Pd (110): An intermediate between chemisorbed and dissolved species. The Journal of Chemical Physics 1983, 78 (12), 7486-7490.
Bergman et al., Fundamentals of heat and mass transfer John Wiley & Sons. Inc: 2007. TOC only. 23 pages.
Dantzer et al., Advances in hydride phase growth: Automatic high precision calorimeter-volumetric devices, for thermodynamic and kinetics analyses. Review of scientific instruments 2000, 71 (1), 142-153.
Fiorino et al., Parallelized, real-time, metabolic-rate measurements from individual *Drosophila*. Scientific reports 2018, 8 (1), 1-10.
Fischer-Wolfarth et al., An improved single crystal adsorptioncalorimeter for determining gas adsorption and reaction energies on complex model catalysts. Review of Scientific Instruments 2011, 82 (2), 024102. 15 pages.
Gao et al., Nanocalorimetry: Door opened for in situ material characterization under extreme non-equilibrium conditions. Progress in Materials Science. 2019. 104, 53-137.
Griessen et al., Thermodynamics of the hybrid interaction of hydrogen with palladium nanoparticles. Nature materials 2016, 15 (3), 311-317.
Huang et al., Chemical activity of palladium clusters: Sorption of hydrogen. J Phys Chem B. Nov. 2, 2006;110(43):21783-7.
Hur et al., Sub-nanowatt resolution direct calorimetry for probing real-time metabolic activity of individual C. elegans worms. Nat Commun. Jun. 12, 2020;11(1):2983. 9 pages.
Ioannou et al., Robust adaptive control. Dover Publication, Inc. 2012, TOC only. 11 pages.
Jewell et al., Review of absorption and adsorption in the hydrogen-palladium system. Applied Catalysis A: General 2006, 310, 1-15.
Johnson et al., Facets and vertices regulate hydrogen uptake and release in palladium nanocrystals. Nature materials 2019, 18 (5), 454-458.
Jung et al., Stretching DNA origami: effect of nicks and Holliday junctions on the axial stiffness. Nucleic Acids Res. Dec. 2, 2020;48(21):12407-12414.
Krohn-Hite 3384. Krohn-Hite Corporation, Brockton, MA. Retrieved from the internet Mar. 25, 2024.
Langhammer et al., Size-dependent kinetics of hydriding and dehydriding of Pd nanoparticles. Phys Rev Lett. Apr. 2, 2010;104(13):135502. 4 pages.
Lide, CRC handbook of chemistry and physics. CRC press: 2004; vol. 85. TOC only. 9 pages.
Macleod et al., High-temperature high-pressure calorimeter for studying gram-scale heterogeneous chemical reactions. Review of Scientific Instruments 2017, 88 (8), 084101. 8 pages.
Mauron et al., High-pressure and high-temperature differential scanning calorimeter for combined pressure-concentration-temperature measurements of hydrides. Review of Scientific Instruments 2009, 80 (9), 095113. 6 pages.
Mcmahon. Thermal radiation characteristics of some glasses. Journal of the American Ceramic Society 1951, 34 (3), 91-96.
Minakov et al., High-speed dynamics of temperature distribution in ultrafast (up to 108 K/s) chip-nanocalorimeters, measured by infrared thermography of high resolution. J. Appl. Phys. 2019, 125, 054501. 15 pages.
MKS 925 Micro Pirani. Retrieved from https://www.mks.com on Mar. 22, 2024. 4 pages.
Mohtadi et al., The renaissance of hydrides as energy materials. Nature Reviews Materials 2016, 2 (3), 1-15.
Murdoch et al., The effect of gold loading and particle size on photocatalytic hydrogen production from ethanol over Au/TiO$_2$ nanoparticles. Nat Chem. Jun. 2011;3(6):489-92.
Omega Polyimide Film insulated heaters, 1" by 5", power=2.5 W/in2. Retrieved from the internet Mar. 25, 2024. 5 pages.
Omega PXM409-035BA10V. Retrieved from the internet Mar. 22, 2024. 8 pages.
Parker Hannifin, Series 99. Retrieved from the internet Mar. 22, 2024. 20 pages.
Pfitzner et al., Rigid DNA beams for high-resolution single-molecule mechanics. Angew Chem Int Ed Engl. Jul. 22, 2013;52(30):7766-71.
Powell et al., Thermal conductivity of selected materials. US Department of Commerce, National Bureau of Standards Washington, DC: 1966; vol. 8. TOC only. 8 pages.
Prieto et al., Towards stable catalysts by controlling collective properties of supported metal nanoparticles. Nat Mater. Jan. 2013;12(1):34-9.
Robinson et al., Metal hydride differential scanning calorimetry as an approach to compositional determination of mixtures of hydrogen isotopologues and helium. International Journal of Hydrogen Energy 2015, 40 (41), 14257-14270.
Roder. Thermal conductivity of hydrogen for temperatures between 78 and 310 K with pressures to 70 MPa. International journal of thermophysics 1984, 5 (4), 323-350.
Sadat et al., Reddy P. Resistance thermometry-based picowatt-resolution heat-flow calorimeter. Appl. Phys. Lett. 2013; 102:163110. 5 pages.
Setaram C80. Calvet Calorimeter. Retrieved from internet Mar. 25, 2024. 8 pages.
Sharp et al., Effect of composition and temperature on the specific heat of glass. Journal of the American Ceramic Society 1951, 34 (9), 260-271.
Smith et al., Principles of quartz crystal microbalance/heat conduction calorimetry: Measurement of the sorption enthalpy of hydrogen in palladium. Thermochimica Acta 2005, 432 (2), 202-211.
Swagelok SS-SS1, Stainless Steel Low Flow Metering Valve. Retrieved from Internet Mar. 25, 2024. 3 pages.
Syrenova et al., Hydride formation thermodynamics and hysteresis in individual Pd nanocrystals with different size and shape. Nat Mater. Dec. 2015;14(12):1236-44.
TA Instruments Nano ITC. Retrieved from the internet Mar. 25, 2024. 24 pages.

(56) References Cited

OTHER PUBLICATIONS

Tavarez et al., Modeling the thermal behavior of solder paste inside reflow ovens. J. Electron. Packag. 2003, 125 (3), 335-346.
Texas Instruments TMUX 1208. Multiplexer. Retrieved from the internet Mar. 25, 2024. 36 pages.
US Sensor GP105V8J. Retrieved from the internet Mar. 22, 2024. 1 page.
Vishay's ultra-high precision Z-foil resistors (Y145310K0000V9L). Retrieved from internet Mar. 25, 2024. 8 pages.
Vries. Specific Heat of Pyrex Glass from 25 to 175 C. Ind. Eng. Chem. 1930, 22, 6, 617-618.
Wadell et al., Thermodynamics of hydride formation and decomposition in supported sub-10 nm Pd nanoparticles of different sizes. Chemical Physics Letters 2014, 603, 75-81.
Xu et al., Size-dependent catalytic activity of supported metal clusters. Nature 1994, 372 (6504), 346-348.
Yamauchi et al., Nanosize effects on hydrogen storage in palladium. The Journal of Physical Chemistry C 2008, 112 (9), 3294-3299.
Zhao et al., DNA Origami Delivery System for Cancer Therapy with Tunable Release Properties. ACSNANO 2012; 6(10), 8684-8691.
Ziegler et al., Optimum settings for automatic controllers. ASME 1942, 64 (11), 759-765.

\* cited by examiner

CALORIMETER

This application is a national phase application under 35 U.S.C. § 371 of PCT International Application No.: PCT/US2021/055835, filed on Oct. 20, 2021, which claims priority to U.S. provisional patent application Ser. No. 63/108,024, filed Oct. 30, 2020, which is incorporated herein by reference in its entirety.

FIELD

Provided herein is technology relating to calorimetry and particularly, but not exclusively, to apparatuses, methods, and systems for making high-resolution thermodynamic measurements of reactions between gas phase reactants and nanomaterials.

BACKGROUND

Knowledge of the thermodynamics of surface reactions and phase transformations in nanomaterials is important, e.g., for heterogeneous catalysis, sustainable production of fuels and chemicals (1-2), and for hydrogen storage and fuel cell applications (3). In particular, nanomaterials, such as noble metal nanoparticles, are excellent candidates for these applications because they provide a high surface to volume ratio and low resistance to reactant mass diffusion (4). Further, in the context of hydrogen storage for renewable energy and transportation applications, metal hydride nanoparticles are considered to be a promising platform because they enable storage of large amounts of hydrogen (volumetric hydrogen storage density) in the interstitial sites of crystal lattices and feature rapid kinetics at room temperature (3).

Calorimetric reactors provide a technology to measure reaction thermodynamics and kinetics directly. Past work (e.g., 5-9) has developed sensitive calorimeters to study surface reactions and catalysis. Table 1 summarizes data from five representative studies, listing their operating range and main figures of merit. The instruments summarized in Table 1 comprise various types of temperature sensors, such as RTDs (5), thermocouples (6-7), and pyroelectric heat detectors (8). In addition, they use several techniques for quantifying the mass of gas phase reactants, such as pressure-concentration measurements (5-6), molecular beams with known fluxes of reactants (8), and gravimetric measurements using a microbalance (9). Additionally, the specifications of two relevant, commercially available instruments are listed in Table 1.

TABLE 1

Calorimetry instruments for study of surface and catalytic reactions

| Study Ref. # | Typical sample size — | p range Bar | T range ° C. | Thermal time constant s | T resolution $K/\sqrt{Hz}$ | Power resolution $W/\sqrt{Hz}$ | Long-term stability W/h | Mass balance ability — | Mass balance resolution mol |
|---|---|---|---|---|---|---|---|---|---|
| Ref. 5 | ~4 g | 0.1-200 | 100-600 | 90 | $10^{-3}$ | $10^{-3}$ | <0.5 | Yes | NA |
| Ref. 6 | ~1 g | 1-33 | RT-1300 | ~1800 | <0.1 | 0.44 | <0.75 | Yes | 0.02 mol |
| Ref. 7 | 0.4 g | 1-1.3 | RT | ~60 s | NA | NA | 0.007 K/hour | Yes | NA |
| Ref. 8 | 1 μm films | $10^{-6}$-$10^{-3}$ | −173-+27 | 0.15 | NA | ~$10^{-7}$ W | 1 mK/h | Yes | $8 \times 10^{-12}$ mol/cm$^2$ of sample |
| Ref. 9 | 10 μg | Vacuum-1 | RT-45 | NA | $10^{-4}$ | $10^{-6}$ | $10^{-6}$ | Yes | 0.01 mol |
| TA Instruments Nano ITC | Volume 1.0 ml | NA | 2-80 | 13 | NA | $10^{-7}$ W | <$2 \times 10^{-8}$ | No | NA |
| Setaram C80 | Volume 12.5 ml | up to 1000 bar | Ambient to 300 | ~320 s * | 0.1 | $10^{-6}$ W | NA | Yes | NA |
| Current instrument | 1-5 mg | 10 mbar-30 bar | 22-300 | <75 s @25° C. <30 s @300° C. | <$10^{-3}$ | <$3 \times 10^{-6}$ | <$4 \times 10^{-6}$ | Yes | 0.1 μmol/$\sqrt{Hz}$ |

An important criterion for calorimetric measurements of chemical reactions is the amount of sample required for measurements. The amounts and types of catalyst samples differ among previous studies: some use powdered samples, typically on the gram-scale (5-7), while others use either thin film single crystal or dispersed samples (8-9). While the former group can achieve high temperature and pressure reaction conditions, the latter group is limited to low pressures and operation close to room temperature. The limitation of the latter groups is largely due to use of microfabricated devices or sensors incompatible with high pressure or temperature, or the need for operation under vacuum environment. In addition, the high temperature and pressure operation of the calorimeters utilizing powdered samples is impeded by poor long-term temperature stability and low heat flow resolution due to high effective thermal conductance of the calorimeter. In addition, lab synthesis of novel catalysts and nanoparticles on the gram scale is often challenging. Accordingly, the calorimetry field and other fields, e.g., nanomaterials, gas phase-surface chemistry, and hydrogen storage, would benefit from advances in calorimeter technology that provide accurate thermodynamic measurements at high temperature and pressure and using milligram scale samples.

SUMMARY

Accordingly, provided herein is a technology related to a calorimetry instrument that makes thermodynamic measurements with a high heat flow resolution (e.g., <3 $\mu W/\sqrt{Hz}$) and long term stability (e.g., <4 $\mu W$/hour), e.g., at temperatures from 20° C. to 300° C. and reaction pressures of 10 mbar to 30 bar. The calorimetry instrument described herein resolves reaction energetics with a high signal to noise ratio over a duration of several hours. For example, during the development of embodiments of the technology provided herein, the calorimetry instrument was tested over a duration of several days at temperatures of up to 280° C. and for a duration of several hours at a temperature of 300° C.

Accordingly, in some embodiments, the technology relates to a calorimetry apparatus. For example, in some embodiments, the technology provides a calorimetry apparatus comprising a sample holder capsule; an inner thermal shield encapsulating the capillary and in thermal communication with the capillary; and an outer thermal shield encapsulating the inner thermal shield and thermally isolated from the environment. In some embodiments, the inner thermal shield comprises and/or is made of aluminum. In some embodiments, the outer thermal shield comprises and/or is made of copper.

In some embodiments, the capillary comprises glass (e.g., borosilicate glass). In some embodiments, the capillary has an inner diameter of approximately 2 mm (e.g., 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.11, 2.12, 2.13, 2.14, 2.15, 2.16, 2.17, 2.18, 2.19, or 2.20 mm) and/or the capillary has an outer diameter of approximately 3 mm (e.g., 2.70, 2.71, 2.72, 2.73, 2.74, 2.75, 2.76, 2.77, 2.78, 2.79, 2.80, 2.81, 2.82, 2.83, 2.84, 2.85, 2.86, 2.87, 2.88, 2.89, 2.90, 2.91, 2.92, 2.93, 2.94, 2.95, 2.96, 2.97, 2.98, 2.99, 3.00, 3.01, 3.02, 3.03, 3.04, 3.05, 3.06, 3.07, 3.08, 3.09, 3.10, 3.11, 3.12, 3.13, 3.14, 3.15, 3.16, 3.17, 3.18, 3.19, 3.20, 3.21, 3.22, 3.23, 3.24, 3.25, 3.26, 3.27, 3.28, 3.29, or 3.30 mm).

In some embodiments, the outer shield encloses a volume at a pressure of less than 10, 9, 8, 7, 6, or 5 $\mu$Torr (e.g., less than 10.0, 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 $\mu$Torr). In some embodiments, the outer thermal shield further comprises a heater on its external surface. In some embodiments, the inner thermal shield further comprises an integrated heater on its external surface. In some embodiments, the integrated heater comprises nichrome wire. In some embodiments, the inner thermal shield comprises a first portion of the inner thermal shield coupled to a second portion of the inner thermal shield by a mechanically compliant component. In some embodiments, the mechanically compliant component comprises a spring. In some embodiments, thermal communication between said inner thermal shield and said capillary is provided by copper wires coupled to the inner thermal shield on a first end of said copper wires and coupled to the capillary on a second end of said copper wires. In some embodiments, the copper wires are coupled to said capillary by ultrasonic solder.

In some embodiments, the calorimetry apparatus further comprises a plurality of glass-encapsulated thermistors. In some embodiments, the glass-encapsulated thermistors comprise a first thermistor inside the outer thermal shield, a second thermistor at a first side of the inner thermal shield, a third thermistor at a second side of the inner thermal shield, a fourth thermistor at a left side of the capillary, a fifth thermistor at a middle position of the capillary, and a sixth thermistor at a right side of the capillary. In some embodiments, the plurality of glass-encapsulated thermistors are soldered directly to the capillary by glass-to-glass ultrasonic solder.

In some embodiments, the calorimetry apparatus further comprises a gas handling unit. In some embodiments, the gas handling unit comprises a prechamber, a gas handling unit capillary tube, and a plurality of fast switching solenoid valves. In some embodiments, the gas handling unit further comprises a turbomolecular pump. In some embodiments, the pre-chamber and gas handling unit capillary tube enclose a volume at a pressure of less than 10, 9, 8, 7, 6, or 5 $\mu$Torr (e.g., less than 10.0, 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 $\mu$Torr). In some embodiments, the gas handling unit further comprises a vacuum gauge and a high accuracy pressure transducer.

In some embodiments, the calorimetry apparatus further comprises an automatically switched Wheatstone bridge circuit.

In some embodiments, the calorimetry apparatus has a heat flow resolution of less than 3 $\mu W/\sqrt{Hz}$ (e.g., less than approximately 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, or 3.50 $\mu W/\sqrt{Hz}$). In some embodiments, the calorimetry apparatus operates over a temperature range of 20° C. to 300° C. (e.g., approximately 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300° C.). In some embodiments, the calorimetry apparatus is constructed to measure the thermodynamics of a gas phase reactant reacting with 1-10 mg (e.g., approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 mg) of a solid phase reactant. In some embodiments, the solid phase reactant comprises a nanomaterial.

Further, in some embodiments, the technology provides a calorimetry system. For example, in some embodiments, the calorimetry system comprises a calorimetry apparatus comprising: a capillary comprising a sample holder capsule; an inner thermal shield encapsulating the capillary and in thermal communication with the capillary; and an outer thermal shield encapsulating the inner thermal shield and thermally isolated from the environment; and a gas handling unit comprising: a prechamber; a gas handling unit capillary tube; and a plurality of fast switching solenoid valves. In some embodiments, the inner thermal shield comprises and/or is made of aluminum. In some embodiments, the outer thermal shield comprises and/or is made of copper. In some embodiments, the capillary of the calorimetry apparatus comprises glass (e.g., borosilicate glass). In some embodiments, the capillary of the calorimetry apparatus has an inner diameter of approximately 2 mm (e.g., 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.11, 2.12, 2.13, 2.14, 2.15, 2.16, 2.17, 2.18, 2.19, or 2.20 mm) and/or the capillary of the calorimetry apparatus has an outer diameter of approximately 3 mm (e.g., 2.70, 2.71, 2.72, 2.73, 2.74, 2.75, 2.76, 2.77, 2.78, 2.79, 2.80, 2.81, 2.82, 2.83, 2.84, 2.85, 2.86, 2.87, 2.88, 2.89, 2.90, 2.91, 2.92, 2.93, 2.94, 2.95, 2.96, 2.97, 2.98, 2.99, 3.00, 3.01, 3.02, 3.03, 3.04, 3.05, 3.06, 3.07, 3.08, 3.09, 3.10, 3.11, 3.12, 3.13, 3.14, 3.15, 3.16, 3.17, 3.18, 3.19, 3.20, 3.21, 3.22, 3.23, 3.24, 3.25, 3.26, 3.27, 3.28, 3.29, or 3.30 mm).

In some embodiments, the outer shield encloses a volume at a pressure of less than 10, 9, 8, 7, 6, or 5 µTorr (e.g., less than 10.0, 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 µTorr). In some embodiments, the outer thermal shield further comprises a heater on its external surface. In some embodiments, the inner thermal shield further comprises an integrated heater on its external surface. In some embodiments, the integrated heater comprises nichrome wire. In some embodiments, the inner thermal shield comprises a first portion of the inner thermal shield coupled to a second portion of the inner thermal shield by a mechanically compliant component. In some embodiments, mechanically compliant component comprises a spring.

In some embodiments, the calorimetry system further comprises copper wires coupled to the inner thermal shield on a first end of said copper wires and coupled to the capillary on a second end of said copper wires, wherein said copper wires are configured to provide thermal communication between said inner thermal shield and said capillary. In some embodiments, the copper wires are coupled to said capillary by ultrasonic solder. In some embodiments, the calorimetry system further comprises a plurality of glass-encapsulated thermistors. In some embodiments, the glass-encapsulated thermistors comprise a first thermistor inside the outer thermal shield, a second thermistor at a first side of the inner thermal shield, a third thermistor at a second side of the inner thermal shield, a fourth thermistor at a left side of the capillary, a fifth thermistor at a middle position of the capillary, and a sixth thermistor at a right side of the capillary. In some embodiments, the plurality of glass-encapsulated thermistors are soldered directly to the capillary by glass-to-glass ultrasonic solder. In some embodiments, the gas handling unit further comprises a turbomolecular pump. In some embodiments, the pre-chamber and gas handling unit capillary tube enclose a volume at a pressure of less than 10, 9, 8, 7, 6, or 5 µTorr (e.g., less than 10.0, 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 µTorr). In some embodiments, the gas handling unit further comprises a vacuum gauge and a high accuracy pressure transducer. In some embodiments, the calorimetry system further comprises an automatically switched Wheatstone bridge circuit. In some embodiments, the calorimetry apparatus has a heat flow resolution of less than 3 µW/√Hz (e.g., less than approximately 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, or 3.50 µW/√Hz). In some embodiments, the calorimetry apparatus operates over a temperature range of 20° C. to 300° C. (e.g., approximately 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300° C.).

In some embodiments, the calorimetry system further comprises a gas phase reactant. In some embodiments, the calorimetry system further comprises a solid phase reactant. In some embodiments, the solid phase reactant has a mass of 1-10 mg (e.g., approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 mg). In some embodiments, the solid phase reactant comprises a nanomaterial. In some embodiments, the sample holder capsule comprises 1-10 mg (e.g., approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 mg) of a nanomaterial reactant. In some embodiments, the gas handling unit is configured to provide a gas phase reactant to said sample holder capsule.

The technology further relates to methods, e.g., methods of measuring a heat transfer for a chemical reaction. In some embodiments, methods comprise providing a calorimetry apparatus comprising: a capillary comprising a sample holder capsule; an inner thermal shield encapsulating the capillary and in thermal communication with the capillary; and an outer thermal shield encapsulating the inner thermal shield and thermally isolated from the environment; reacting a first reactant with a second reactant in said sample holder capsule; and recording a heat transfer measurement of heat produced by reacting said first reactant with said second reactant. In some embodiments, the first reactant is a solid phase reactant. In some embodiments, the second reactant is a gas phase reactant. In some embodiments, methods further comprise providing said second reactant using a has handling unit. In some embodiments, the heat transfer measurement has a resolution of less than 3 $\mu W/\sqrt{Hz}$ (e.g., less than approximately 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, or 3.50 $\mu W/\sqrt{Hz}$). In some embodiments, methods further comprise removing gas from a volume enclosed by said outer shield to provide a pressure of less than 10, 9, 8, 7, 6, or 5 $\mu$Torr (e.g., less than 10.0 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 $\mu$Torr). In some embodiments, methods comprise heating the outer thermal shield. In some embodiments, methods comprise heating the inner thermal shield. In some embodiments, methods comprise removing gas from a volume enclosed by said gas handling unit to provide a pressure of less than 10, 9, 8, 7, 6, or 5 $\mu$Torr (e.g., less than 10.0, 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 $\mu$Torr).

In some embodiments, the solid phase reactant has a mass of 1-10 mg (e.g., approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 mg). In some embodiments, the solid phase reactant comprises a nanomaterial.

In some embodiments, recording a heat transfer measurement comprising using a thermistor ultrasonically soldered to said capillary.

In some embodiments, methods comprise quantifying a mass of said second reactant introduced into the calorimeter. In some embodiments, methods comprise quantifying the mass of said second reactant that reacted with said first reactant to form a product.

In some embodiments, the technology relates to uses of a calorimeter apparatus as described herein to perform a thermodynamic measurement. In some embodiments, the technology relates to use of a calorimetry system as described herein to perform a thermodynamic measurement. In some embodiments, the technology relates to use of a calorimeter apparatus as described herein to perform a thermodynamic measurement, e.g., for a reaction of a gas phase reactant with 1-10 mg (e.g., approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 mg) of a nanomaterial reactant. In some embodiments, the technology relates to use of a calorimetry system as described herein to perform a thermodynamic measurement, e.g., for a reaction of a gas phase reactant with 1-10 mg (e.g., approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 mg) of a nanomaterial reactant.

The calorimeter technology described herein provides a number of advantages over previous calorimeter apparatuses and related technologies. Embodiments of the technology comprise one or more components, alone or in combination, that provide the resolution, stability, and accuracy of the technology.

For example, in some embodiments, the calorimeter comprises an inner thermal shield and an inner thermal shield. In this "double shield" design, the inner shield provides heating to the part of the capillary (reaction) tube under measurement conditions. The inner shield comprises an integrated heater and the capillary tube connects the low temperature and high temperature parts of the instrument. Accordingly, in some embodiments, the calorimeter has a relatively simple design.

In some embodiments, the calorimeter comprises components having a metal-glass hybrid structure. This metal-glass hybrid structure provides a low thermal conductance through the glass capillary and the metal thermal shields provide good thermal stability and/or uniformity. One problem associated with use of hybrid structures, such as a metal-glass hybrid structure described herein, over a large temperature range is thermal expansion mismatch between the two materials, which can produce breakage and/or cause inefficiencies in the apparatus. Embodiments of the technology described herein solve this problem by providing a mechanically compliant component (e.g., spring-loaded component) to mediate the mechanical contact between the two components having a thermal expansion mismatch (e.g., glass and metal), e.g., to couple the metal component to the glass component. The mechanically compliant component thus compensates for thermal expansion and minimizes and/or eliminates mechanical stresses on components associated with thermal expansion.

In some embodiments, thermal contact between the inner thermal shield and the capillary (reaction) tube is provided by flexible wires (e.g., copper wires) soldered directly to the capillary glass using an ultrasonic method. The ultrasonic metal-class weld provides a robust and stable thermal link between the metal of the wires and glass of the capillary. This thermal link minimizes and/or eliminates long-term thermal drift and provides an efficient heating path to the reaction tube. In contrast, some previous calorimetry apparatuses were observed to have long term thermal drifts as high as 100 s of millikelvin that scale with reaction temperature. Accordingly, the thermal contact of the present calorimeter describes herein provides an apparatus having long term thermal stability.

In some embodiments, the calorimeter comprises glass-encapsulated thermistors (e.g., a thermistor encapsulated by glass) directly soldered to the capillary (reaction) tube to provide long-term stability of the thermal contact between the glass-encapsulated thermistors and the capillary. The directly soldered connection minimizes and/or eliminates the variation between the measured temperature using the thermistor and the real temperature of the reaction tube and minimizes and/or eliminates long term changes. The long-term stability of the thermal contact between the glass-encapsulated thermistors and the capillary improves and/or maximizes the long-term stability of calorimeter.

In some embodiments, thermal modelling and system identification are used to determine the location of temperature sensors (e.g., glass encapsulated thermistors). In some embodiments, thermal modelling and system identification are used to precisely quantify heat flux with minimal assumptions based on the physical representation of instrument.

In some embodiments, the calorimeter comprises a high resolution temperature readout circuit with a large operating range. For example, in some embodiments, the calorimeter comprises an automatically balanced Wheatstone bridge to provide a high resolution temperature readout circuit with a large operating range. Although the use of AC-driven Wheatstone bridges combined with lock-in measurement has been used previously for high-resolution temperature readout of thermistors, the range of operation of previous circuits is limited because of tradeoffs between range and resolution in prior conventional designs. In contrast, the present technology described herein provides a calorimeter comprising a custom-built resistor bank that is automatically switched based on the measured temperature. The circuits described herein provide high-resolution temperature readings over a larger range of temperatures than in conventional prior devices. Accordingly, in some embodiments, the technology provided herein relates to a calorimeter having both a high sensitivity (e.g., a heat flow resolution of less than 3 $\mu W/\sqrt{Hz}$) and a large temperature range (e.g., from 20° C. to 300° C.).

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

(FIG. 7A) and 222° C. (FIG. 7B). The reactant gas ($H_2$) is introduced at t=1 hour, which perturbs $T_{c-left}$ and $T_{c-right}$ temperatures. The temperatures equilibrate back to millikelvin stability within 15 minutes after introduction. The RMS temperature variation in a 1-Hz bandwidth is shown for two time intervals before and after gas introduction (0-0.9 hours and 1.5-6 hours).

(FIGS. 8A and 8B) or 230° C. (FIGS. 8C and 8D)). Each experiment is repeated at two different $H_2$ pressures. FIGS. 8A and 8C show the transient response of the calorimeter to step inputs to heat flow ($\dot{q}_{mid}$) with ~1-Hz sampling frequency. FIGS. 8B and 8D show the steady temperature rise as a function of heat flow input, where the effective thermal conductance and the heat flow resolution of the calorimeter are obtained.

(FIGS. 9A and 9B), 125° C. (FIGS. 9C and 9D), and 230° C. (FIGS. 9E and 9F). FIGS.

Figure 9A:
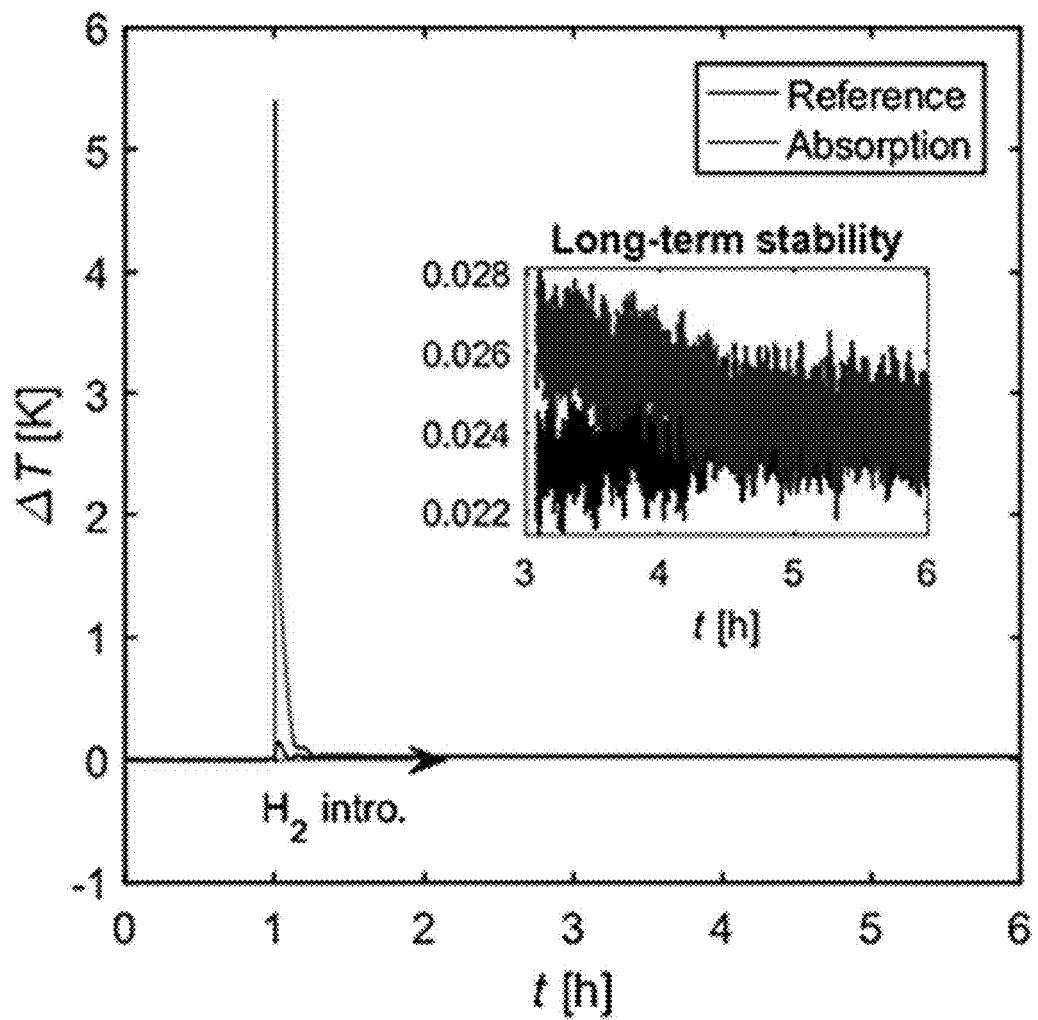
FIG. 9A to 9F are plots of experimental data from measurements of temperature rise and heat release rate associated with adsorption of $H_2$ on Pd samples obtained following the protocol described in Table 2 at an absolute pressure of 7 bar at 30° C.
Figure 9B:
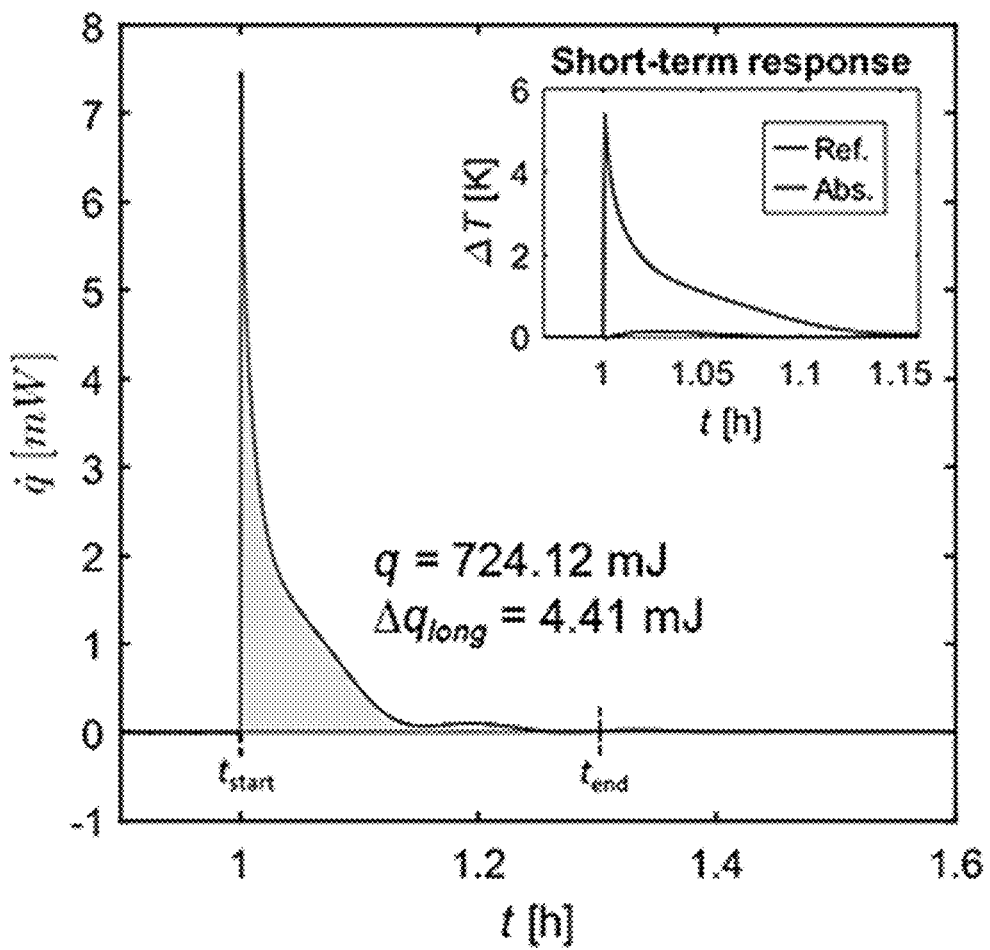
Figure 9C:
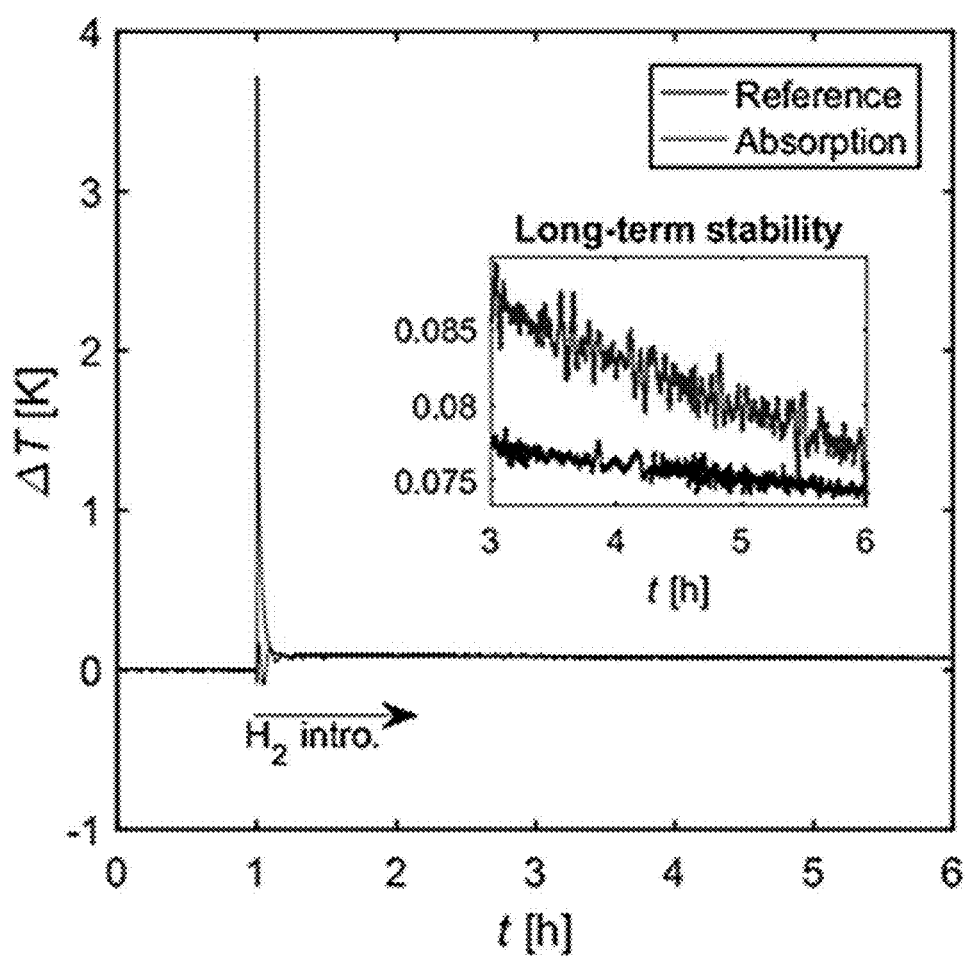
Figure 9D:
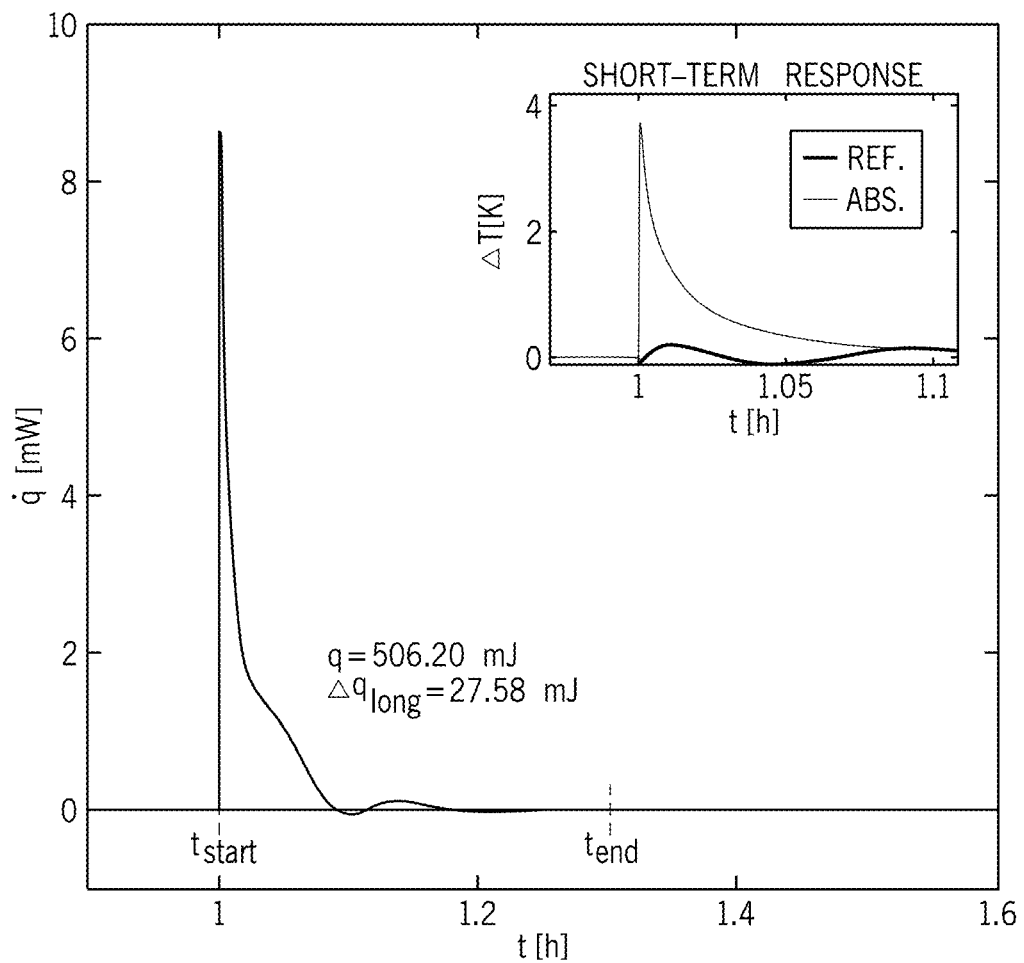
Figure 9E:
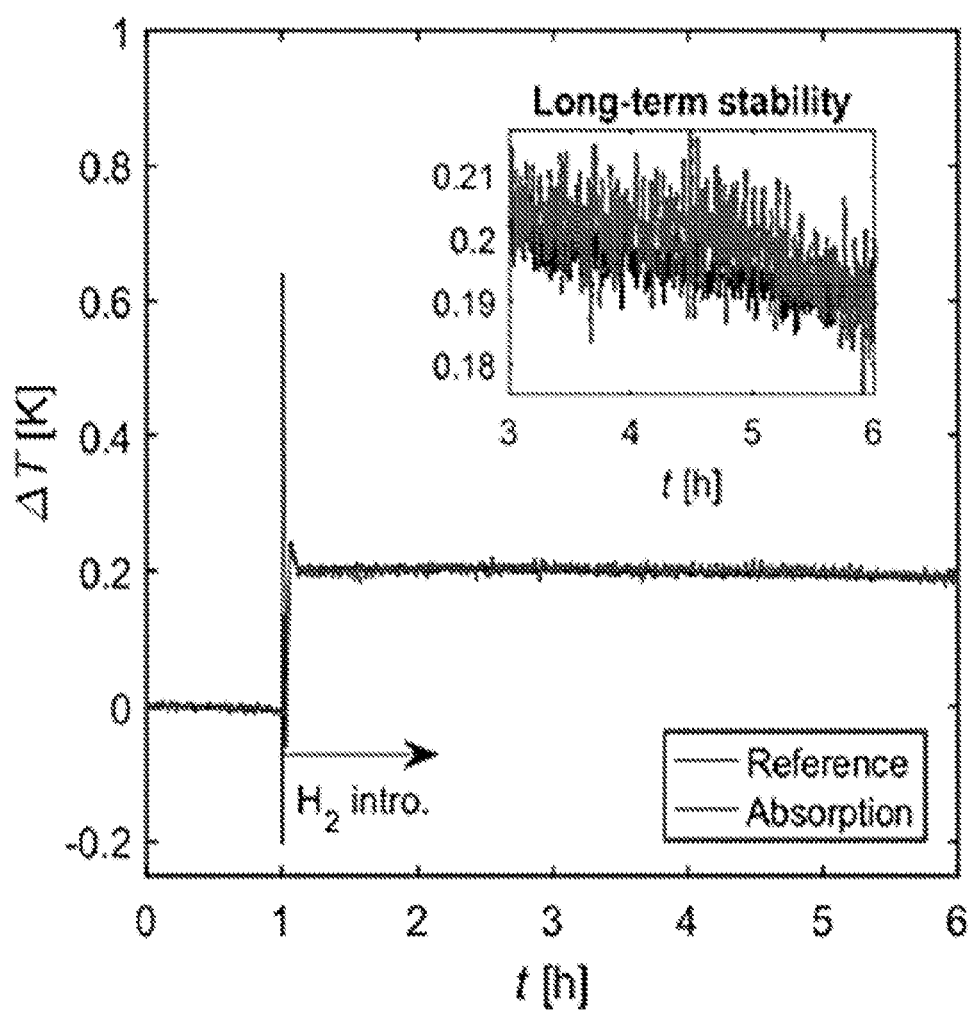
Figure 9F:
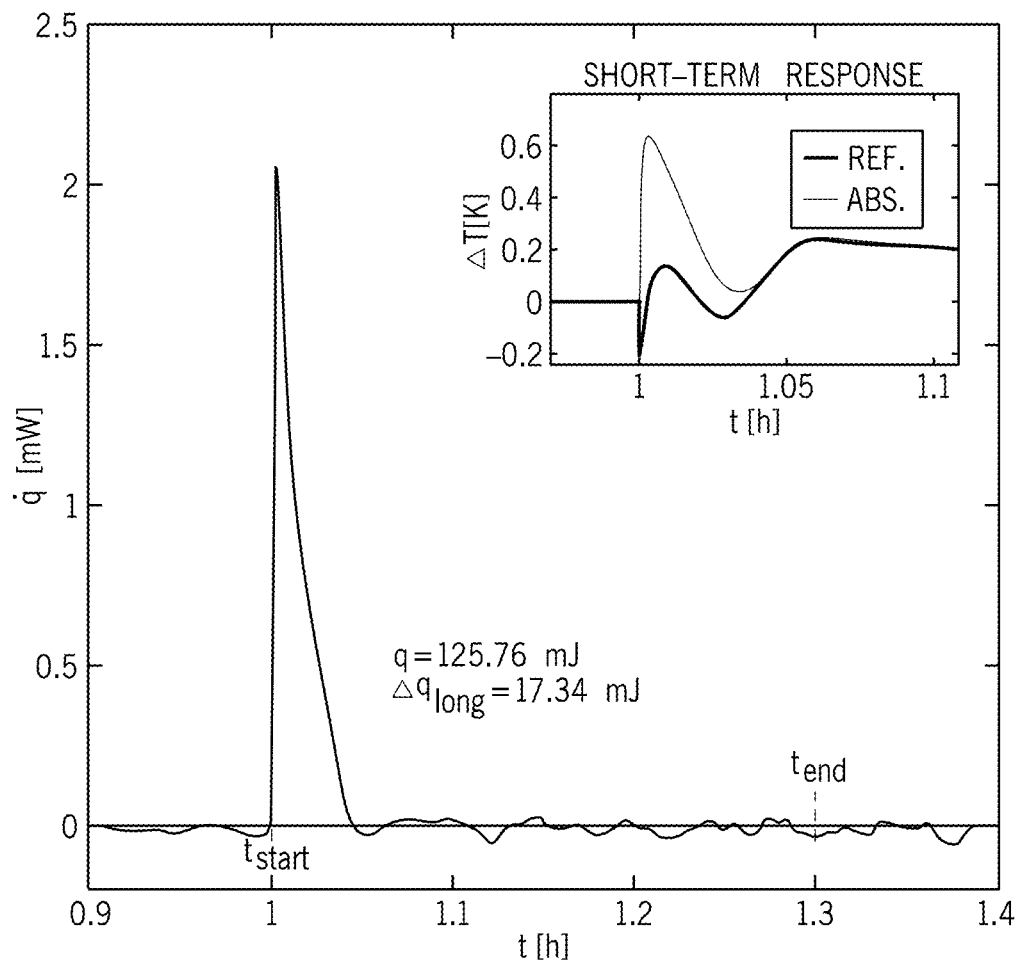

9A, 9C, and 9E show the recorded ΔT of the baseline experiment with an empty sample holder and the absorption experiment using the Pd sample. The capillary reaction tube is initially under vacuum and, at time t=1 hour, hydrogen is introduced to the reaction tube, resulting in an exothermic reaction and a transient heat output signal shown in FIGS. 9B, 9D, and 9F. The heat of reaction (q) was obtained by integrating the heat flow between t=1 to 1.3 hours. $\Delta q_{long}$ shows the long-term stability, which is the maximum cumulative heat release from t=5 to 6 hours. The insets in FIGS. 9A, 9C, and 9E show the long-term response and the insets in FIGS. 9B, 9D, and 9F show the short-term response. The mass of the Pd sample was 5.10 mg, 3.89 mg, and 3.77 mg for the reactions at 30° C., 125° C., and 230° C., respectively.

Figure 10A:
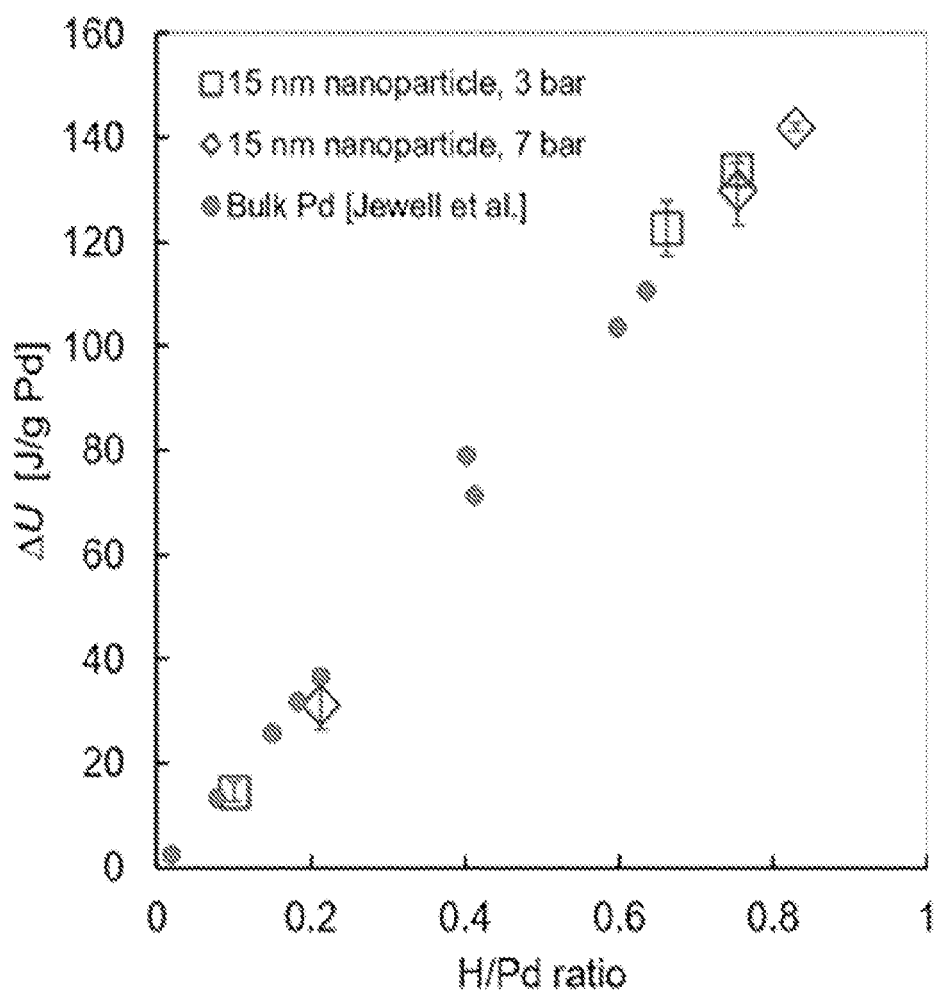

FIG. 10A is a plot showing the internal energy of reaction per unit mass of Pd sample. Red dots show previous measurements on bulk Pd, adapted with permission from reference number 28, which is incorporated herein by reference.

Figure 10B:
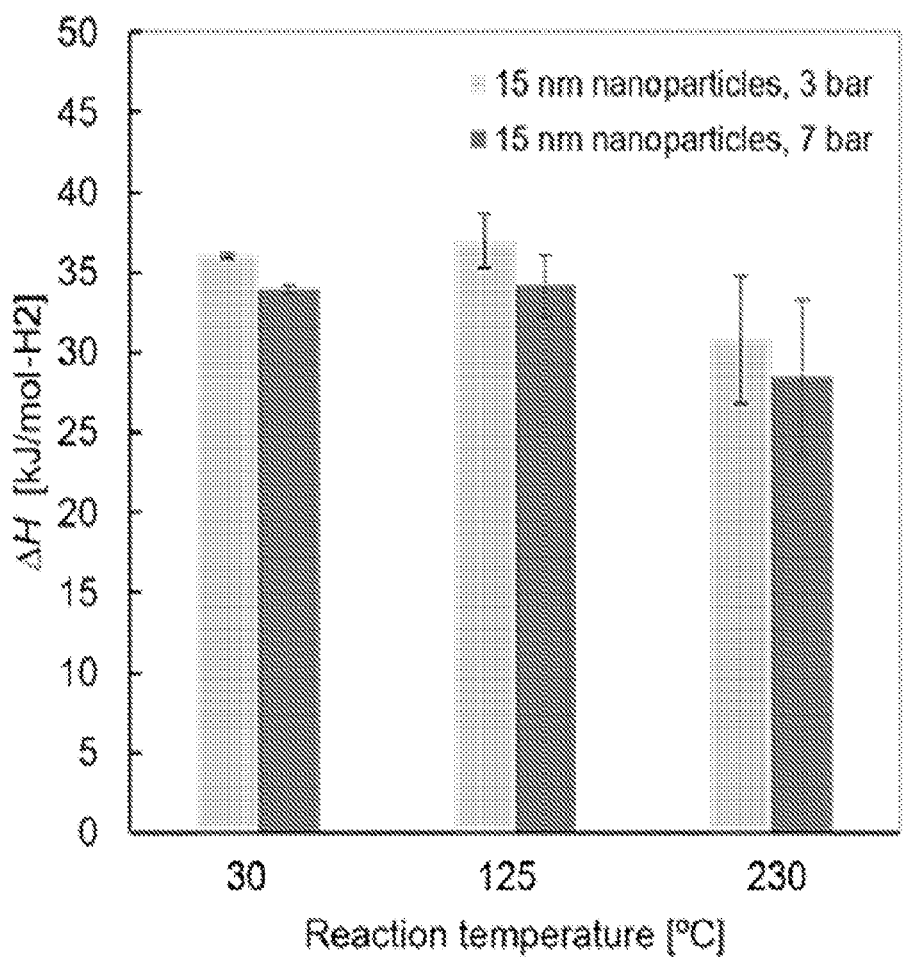

FIG. 10B is a bar plot showing the enthalpy per moles of absorbed $H_2$ at three reaction temperatures and two pressure levels. Error bars are calculated based on the maximum long-term stability.

Figure 11:
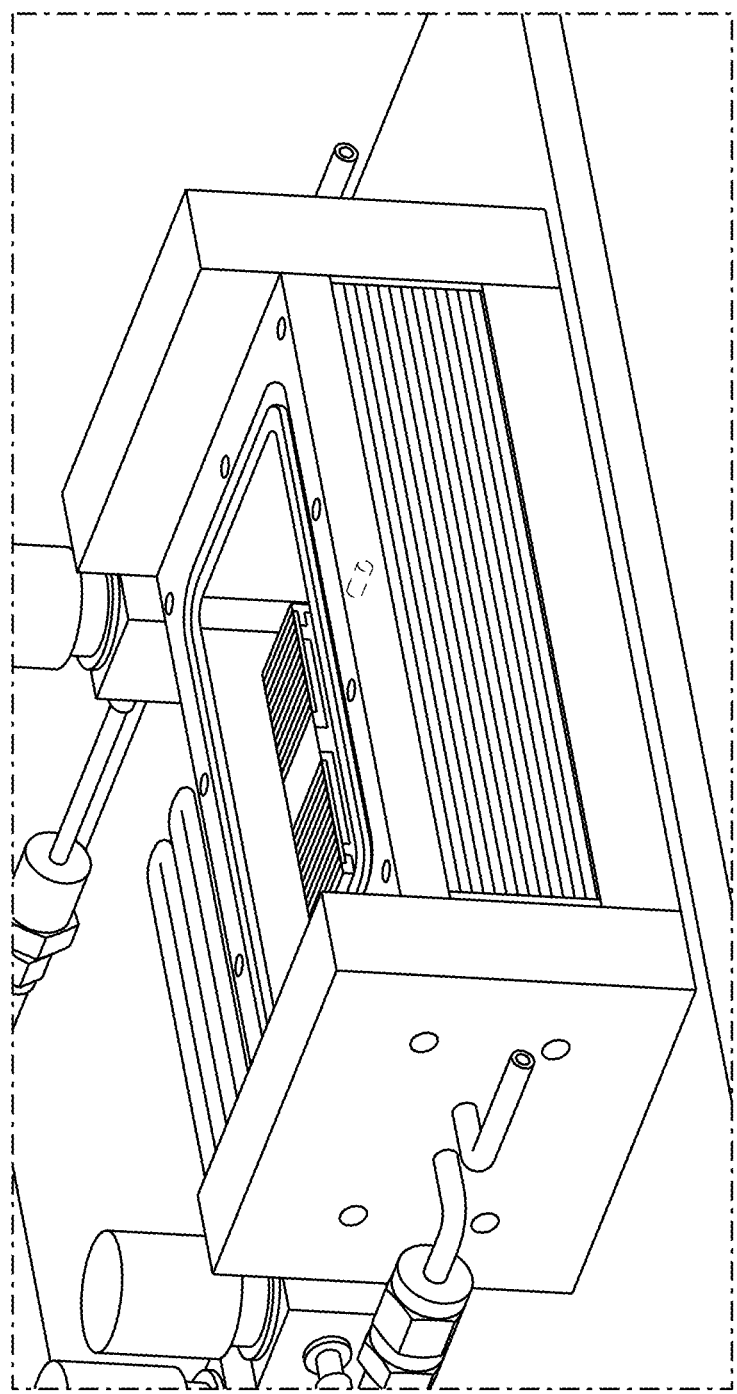

FIG. 11 is a drawing showing the location of the Tos thermistor and a planar film heater on the outer shield.

Figure 12:
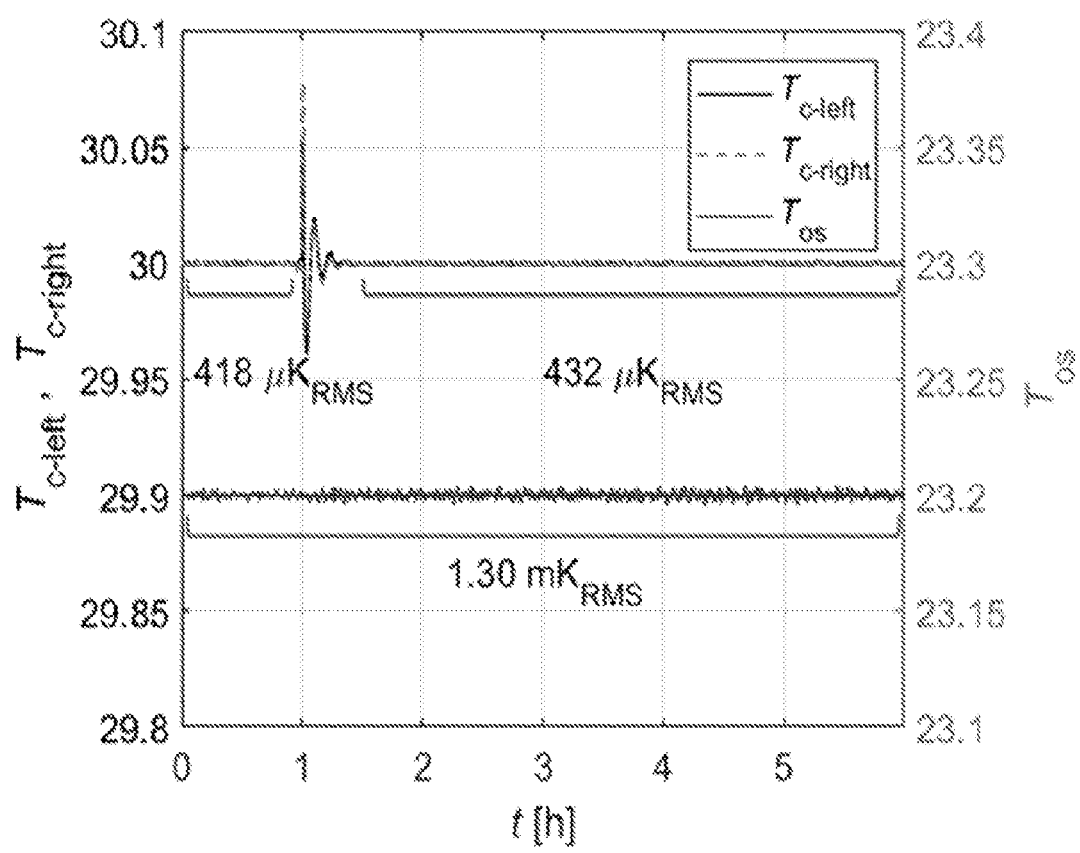

FIG. 12 is a plot showing the stability of the capillary left ($T_{c\text{-}left}$), capillary right ($T_{c\text{-}right}$), and outer shield ($T_{os}$) temperatures during introduction of reactants to the capillary tube at setpoint of 30° C. The reactant gas ($H_2$) is introduced at t=1 hour, perturbing $T_{c\text{-}left}$ and $T_{c\text{-}right}$ temperatures. The temperatures equilibrate to millikelvin stability within 15 minutes after introduction. The outer shield temperature is not affected by the introduction of reactants and remains steady. The RMS temperature variation in a 1-Hz bandwidth is shown in the intervals indicated by blue brackets.

Figure 13A:
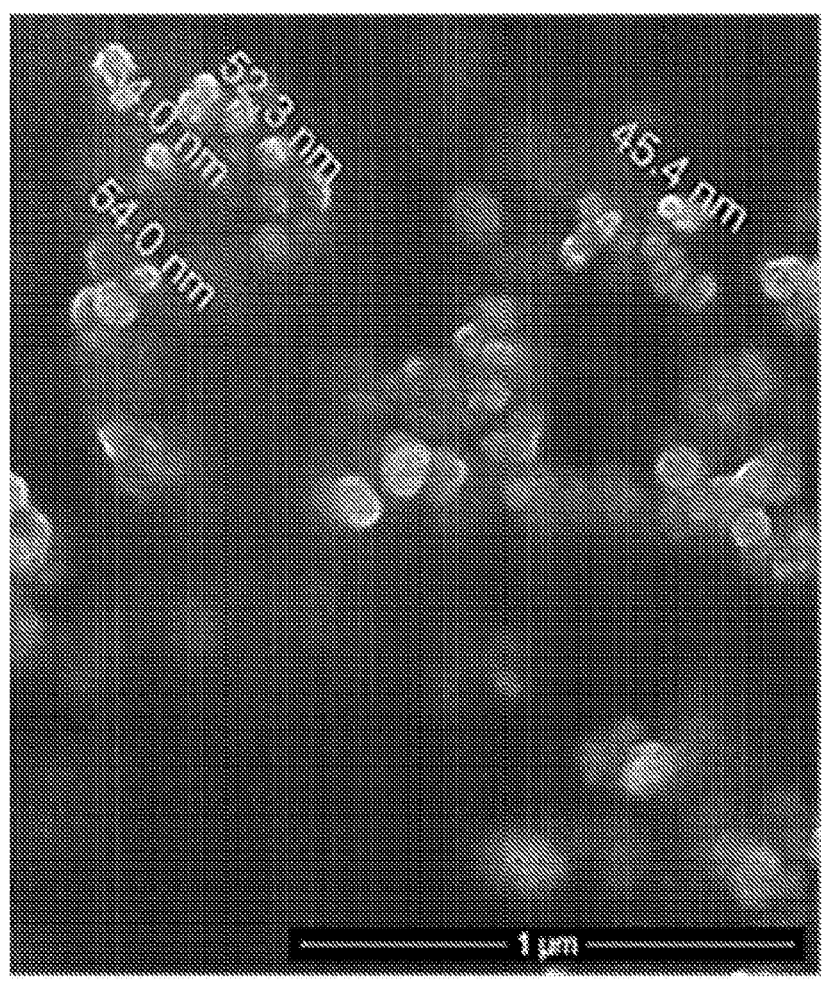

FIG. 13A shows a SEM micrograph of unprepared commercial Pd nanoparticle samples.

Figure 13B:
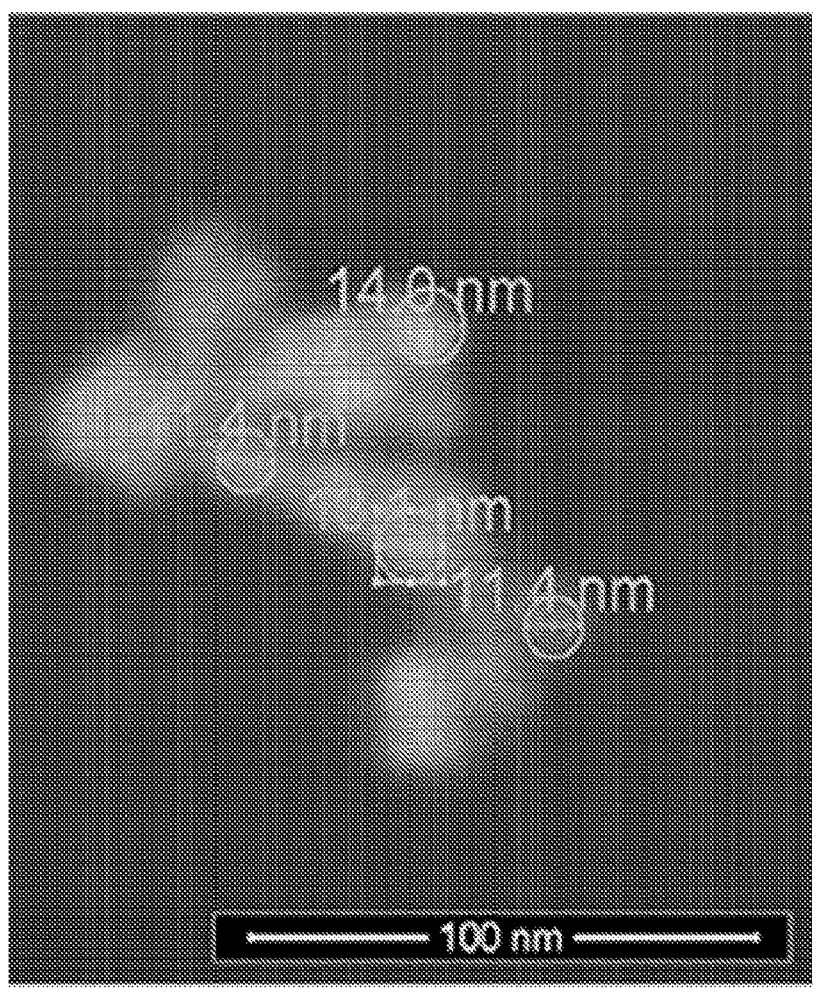

FIG. 13B shows a SEM micrograph of commercial Pd nanoparticle samples dispersed by sonication in DI water.

Figure 13C:
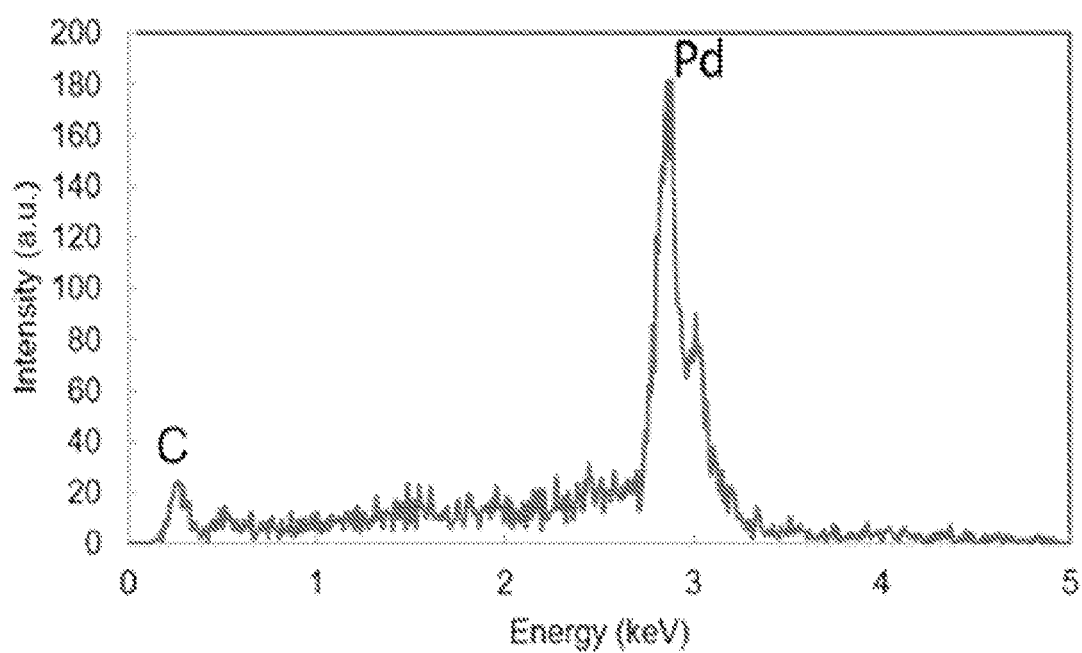

FIG. 13C shows the EDX spectrum of the samples of FIG. 13A and FIG. 13B showing peaks of Pd and carbon (C).

Figure 14A:
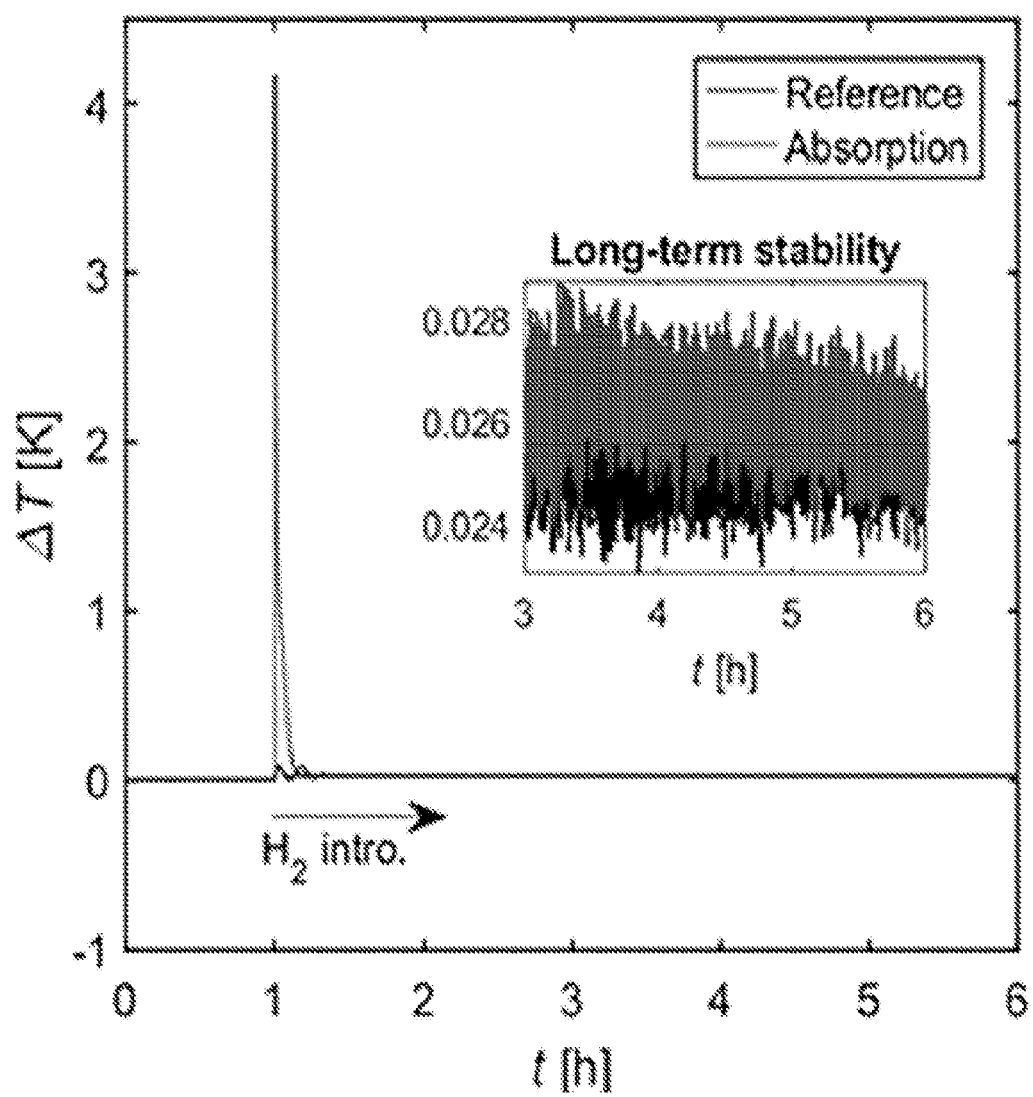
Figure 14B:
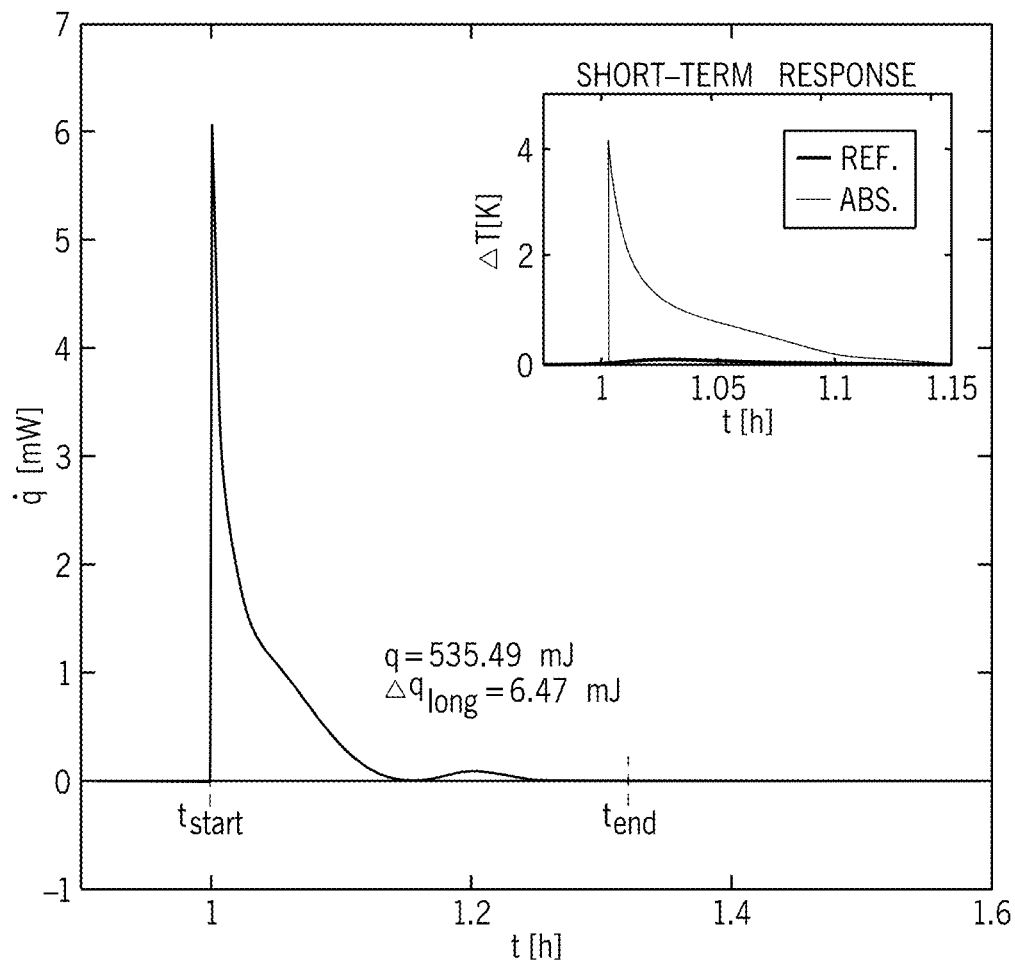
Figure 14C:
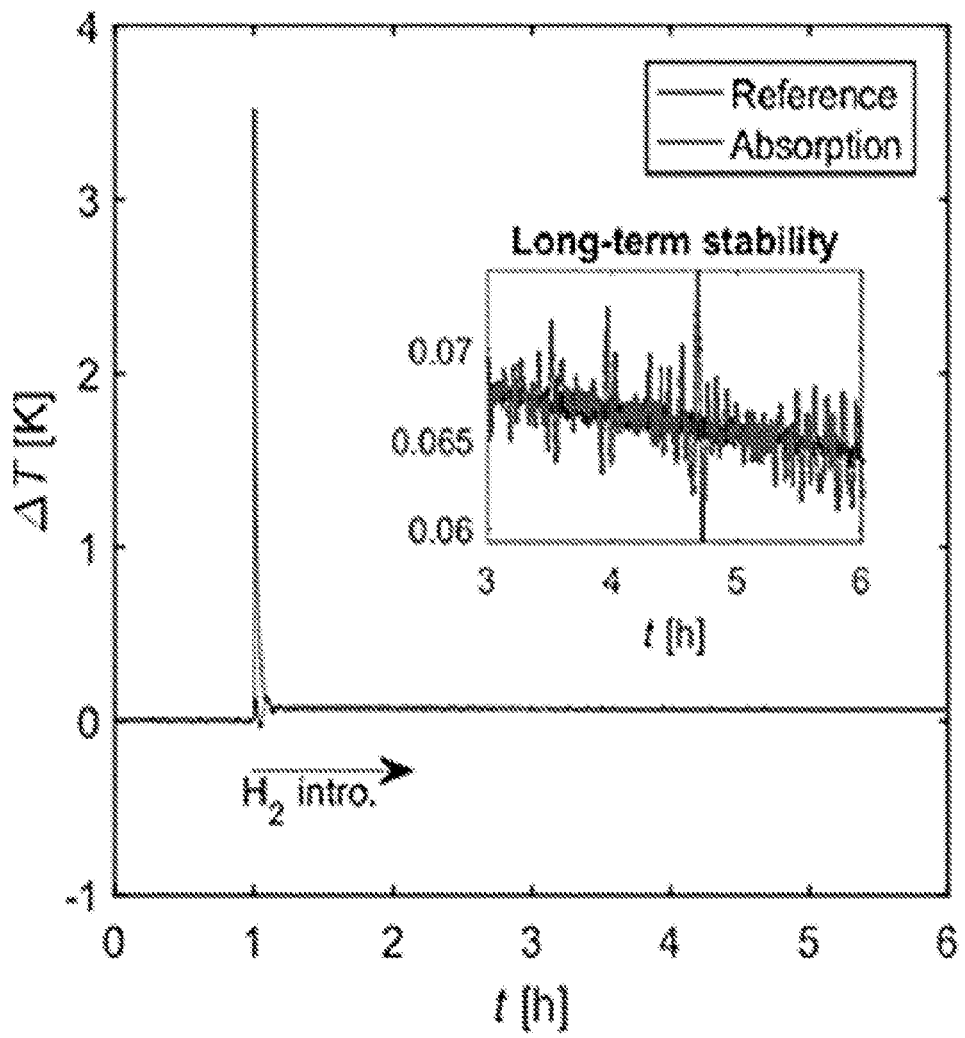
Figure 14D:
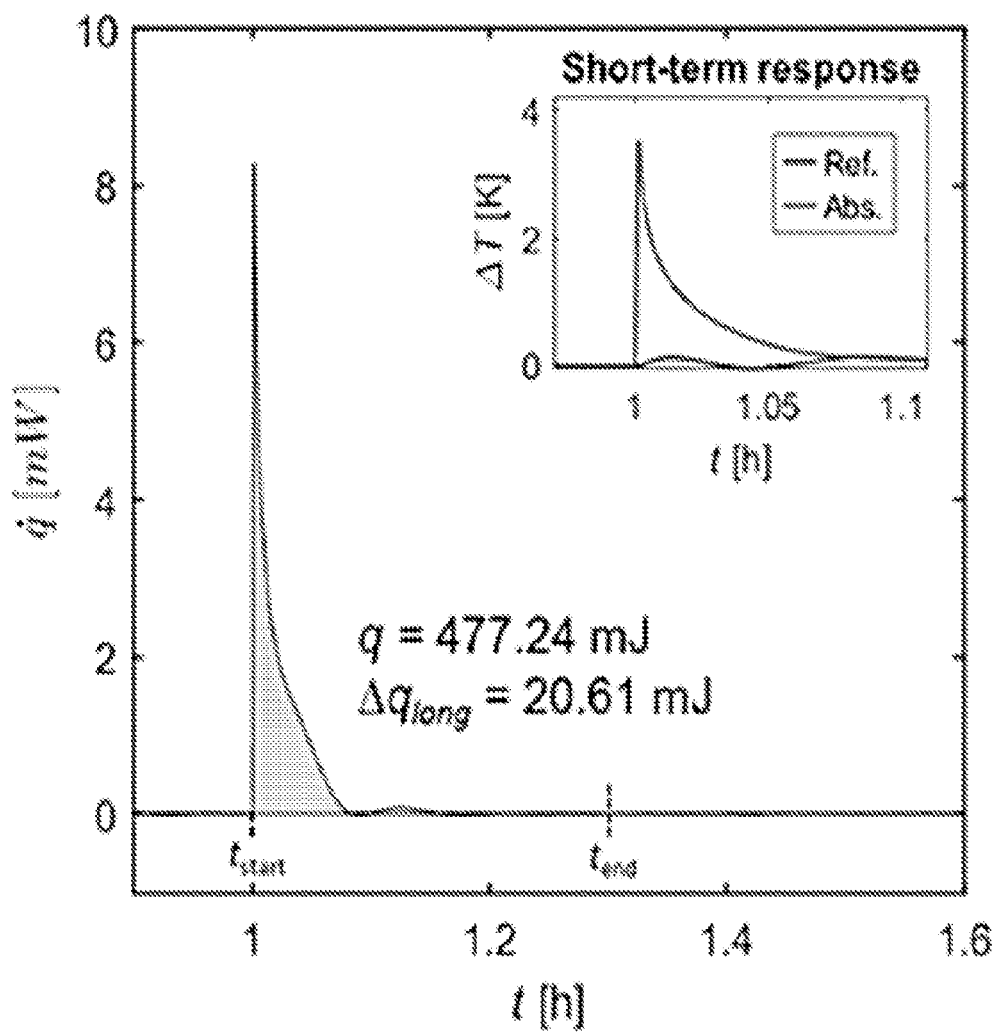
Figure 14E:
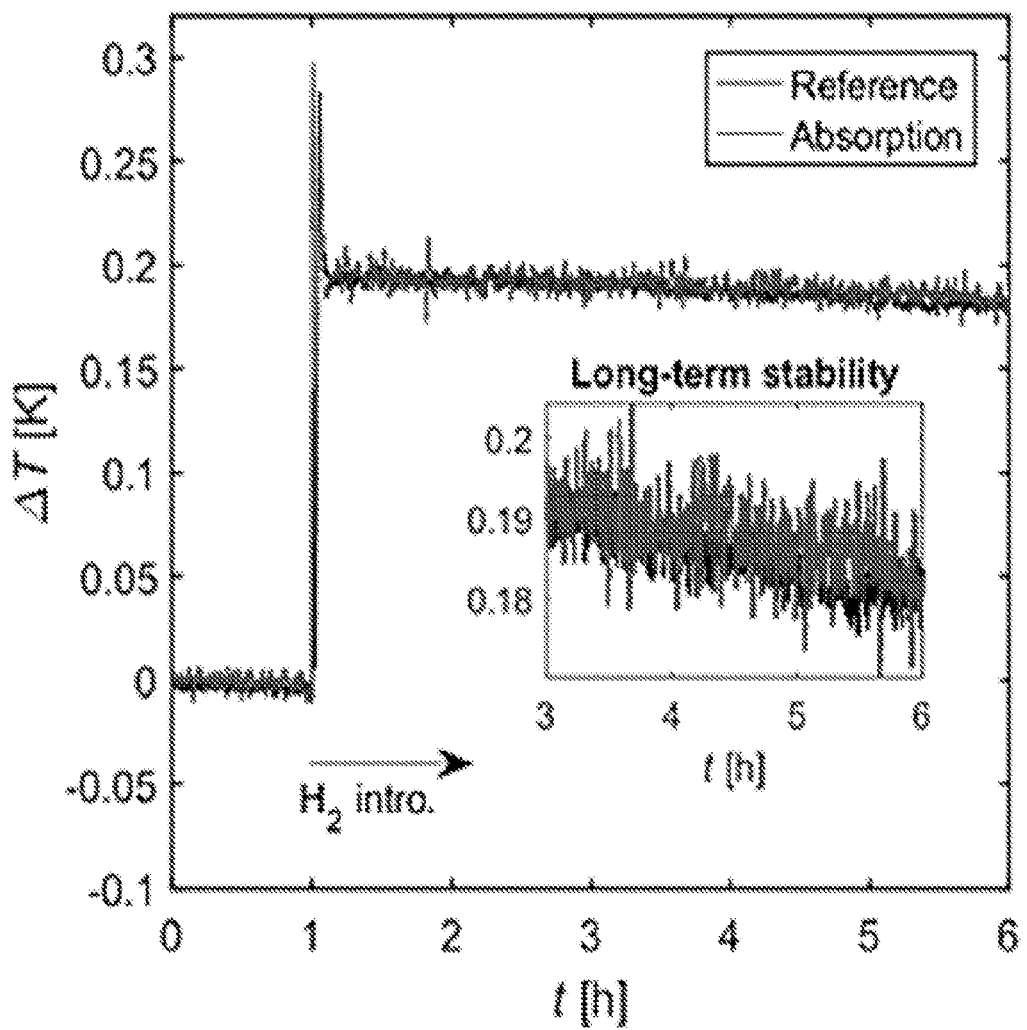
Figure 14F:
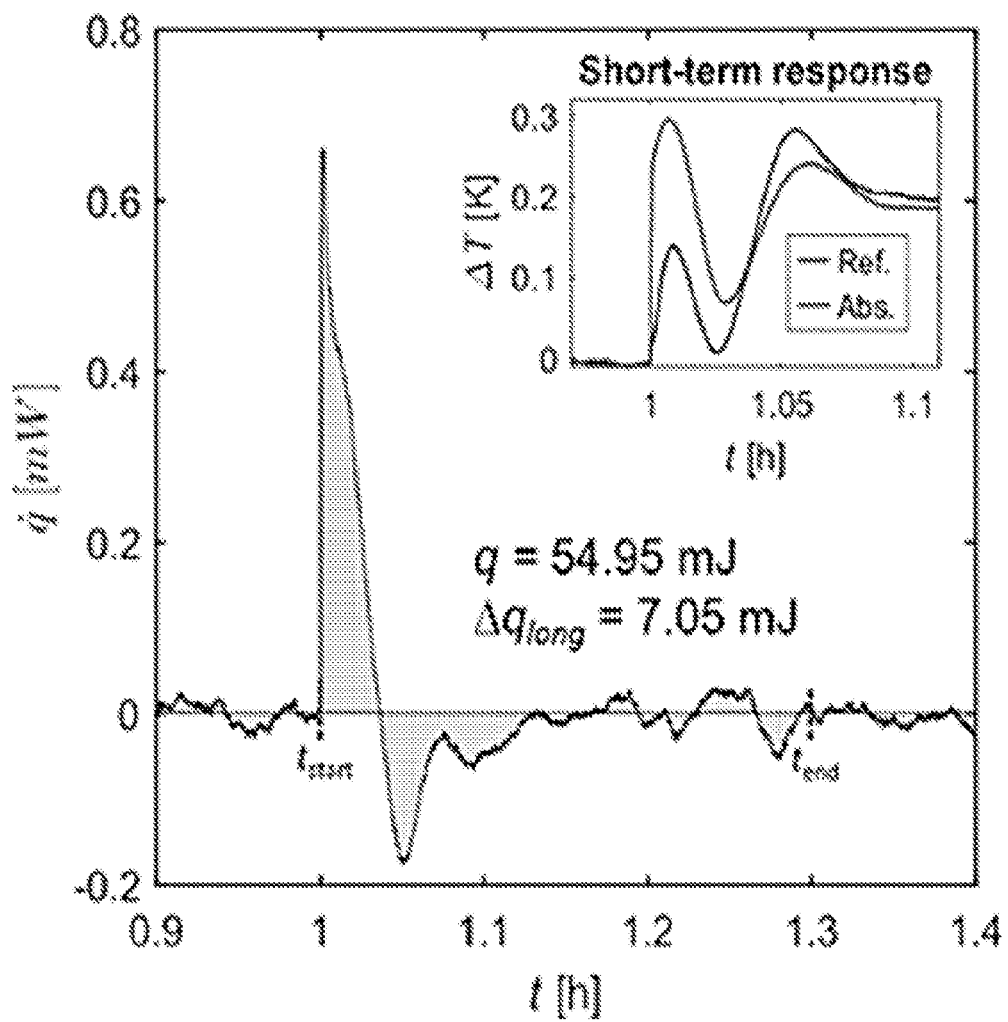

FIG. 14A to FIG. 14F are plots of experimental data of temperature rise and heat release rate associated with adsorption of $H_2$ on Pd samples obtained following the protocol described in Table 2 at an absolute pressure of 3 bar and at various temperatures (30° C. (FIGS. 14A and 14B), 125° C. (FIG. 14C and FIG. 14D), and 230° C. (FIG. 14E and FIG. 14F). FIGS. 14A, 14C, and 14E show the ΔT recorded during the empty sample holder baseline experiment and the absorption experiment using the Pd sample. The capillary reaction tube is under vacuum during the first hour of the experiment, at time t=1 hour hydrogen is introduced to the reaction tube resulting in an exothermic reaction and a transient heat output signal shown in FIG. 14B, FIG. 14D, and FIG. 14F. The heat of reaction (q), shown by the shaded area in the right hand graphs, is obtained by integrating the heat flow between t=1 to 1.3 hour. The bounds on q show the long term stability from t=5 to 6 h. The mass of the Pd sample was 5.28 mg (FIGS. 14A and 14B); 3.89 mg (FIG. 14C and FIG. 14D); 3.77 mg (FIG. 14E and FIG. 14F).

Figure 15:
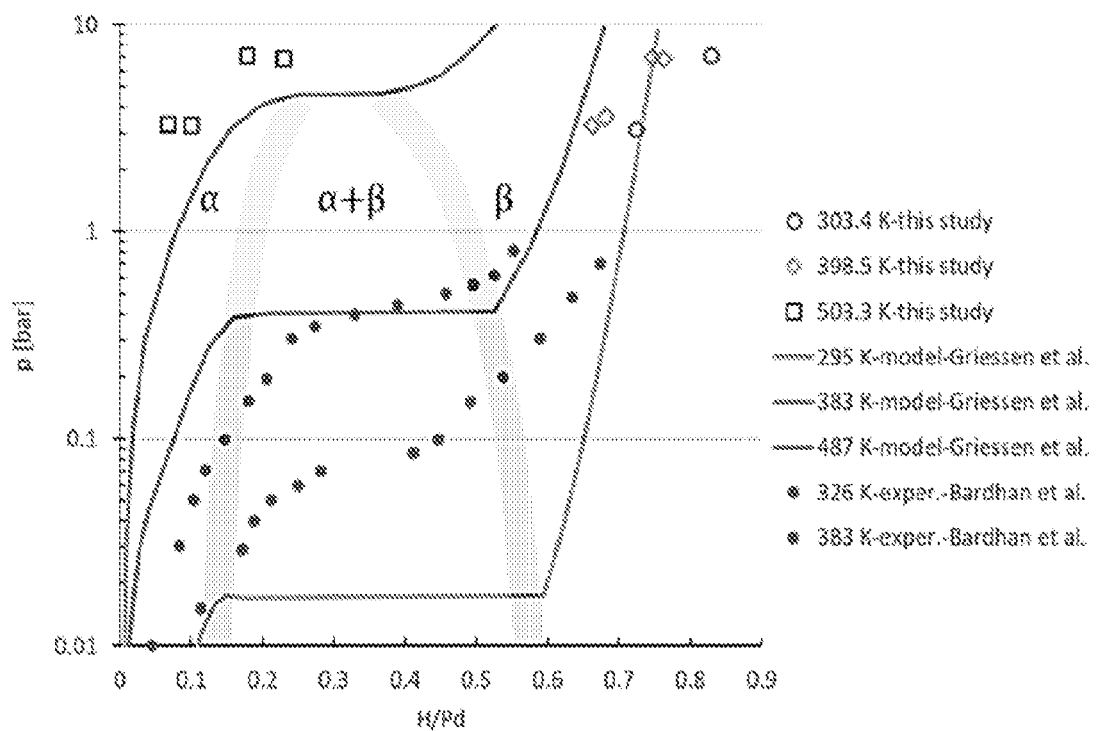

FIG. 15 is a plot showing the equilibrium H/Pd ratio of 15 nm Pd nanoparticles obtained from current instrument plotted on the phase diagram of H—Pd system of 32 nm Pd nanocubes. Solid lines show the results of a statistical mechanics Ising model (adapted with permission from Griessen, infra) and filled circles are experimental results using luminescent based sensing of H-content (adapted with permission from Griessen, infra, which are scaled results measured by Bardhan, infra).

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Calorimetry of reactions involving nanomaterials is of great current interest. Accordingly, calorimetry technologies providing high-resolution heat flow measurements and long-term thermal stability would support advances in nanomaterial development. In particular, research is especially challenging at elevated reaction pressures and temperatures. Accordingly, the present technology relates to a calorimetry instrument that finds use in measuring the enthalpy of reactions between gas phase reactants and milligram scale nanomaterial samples. In some embodiments, this instrument resolves the net change in the amount of gas phase reactants due to surface reactions in an operating range from room temperature to 300° C. (e.g., approximately 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300° C.) and reaction pressures of 10 mbar to 30 bar (e.g., 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 mbar; 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 bar). The calorimetric resolution is shown to be <3 µW/√Hz (e.g., approximately 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, or 3.50 µW/√Hz), with a long-term stability <4 µW/hour (e.g., approximately 3.50, 3.55, 3.60, 3.65, 3.70, 3.75, 3.80, 3.85, 3.90, 3.95, 4.00, 4.05, 4.10, 4.15, 4.20, 4.25, 4.30, 4.35, 4.40, 4.45, 4.50 µW/hour). During the development of embodiments of the technology provided herein, the performance of the calorimetry instrument was evaluated in a set of experiments involving $H_2$ absorption on Pd nanoparticles at various pressures and temperatures. In these experiments, the data collected indicated that the calorimetry instrument provided measurements of mass balance with a resolution of 0.1 µmol/√Hz (e.g., approximately 0.080, 0.081, 0.082, 0.083, 0.084, 0.085, 0.086, 0.087, 0.088, 0.089, 0.090, 0.091, 0.092, 0.093, 0.094, 0.095, 0.096, 0.097, 0.098, 0.099, 0.100, 0.101, 0.102, 0.103, 0.104, 0.105, 0.106, 0.107, 0.108, 0.109, 0.110, 0.111, 0.112, 0.113, 0.114, 0.115, 0.116, 0.117, 0.118, 0.119, or 0.120 µmol/√Hz). Results from these experiments agree with past studies establishing the feasibility of performing high resolution calorimetry on milligram scale nanomaterials, which find use in studies probing catalysis, phase transformations, and thermochemical energy-storage. Thus, provided herein is technology relating to calorimetry and particularly, but not exclusively, to apparatuses, methods, and systems for making high-resolution thermodynamic measurements of reactions between gas phase reactants and nanomaterials.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present or "absent") is used in a relative sense to describe the amount or level of a particular entity (e.g., an analyte). For example, when an analyte is said to be "present" in a test sample, it means the level or amount of this analyte is above a pre-determined threshold; conversely, when an analyte is said to be "absent" in a test sample, it means the level or amount of this analyte is below a pre-determined threshold. The pre-determined threshold may be the threshold for detectability associated with the particular test used to detect the analyte or any other threshold. When an analyte is "detected" in a sample it is "present" in the sample; when an analyte is "not detected" it is "absent" from the sample. Further, a sample in which an analyte is "detected" or in which the analyte is "present" is a sample that is "positive" for the analyte. A sample in which an analyte is "not detected" or in which the analyte is "absent" is a sample that is "negative" for the analyte.

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "reliability" refers to a measure (e.g., a statistical measure) of the performance of a system without failure and/or error. In some embodiments, reliability is a measure of the length of time and/or number of functional cycles a system performs without a failure and/or error.

As used herein, the term "structured to [verb]" means that the identified element or assembly has a structure that is shaped, sized, disposed, coupled, and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb.

As used herein, the term "associated" means that the elements are part of the same assembly and/or operate together or act upon/with each other in some manner. For example, an automobile has four tires and four hub caps. While all the elements are coupled as part of the automobile, it is understood that each hubcap is "associated" with a specific tire.

As used herein, the term "coupled" refers to two or more components that are secured, by any suitable means, together. Accordingly, in some embodiments, the statement that two or more parts or components are "coupled" shall mean that the parts are joined or operate together either directly or indirectly, e.g., through one or more intermediate parts or components. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the term "removably coupled" or "temporarily coupled" means that one component is coupled with another component in an essentially temporary manner. That is, the two components are coupled in such a way that the joining or separation of the components is easy and does not damage the components. Accordingly, "removably coupled" components may be readily uncoupled and recoupled without damage to the components.

As used herein, the term "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the term "number" shall mean one or an integer greater than one (e.g., a plurality).

As used herein, the term "component" refers broadly to a material or individual component used in a device.

As used herein, the term "thermal contact" refers to the ability of two or more materials and/or structures that are capable of substantial heat transfer from the higher temperature material to the lower temperature material, such as by conduction.

As used herein, the term "thermal communication" refers to a configuration of two or more components such that heat can be directly or indirectly transferred from one component to another. In some embodiments, components in thermal communication are in direct thermal communication wherein heat is directly transferred from one component to another. In some embodiments, components in thermal communication are in indirect thermal communication wherein heat is indirectly transferred from one component to another via one or more intermediate structures separating the components.

As used herein, the term "electrical communication" refers to a configuration of two or more components such that electricity can be directly or indirectly transferred from one component to another. In some embodiments, components in electrical communication are in direct electrical communication wherein an electronic signal or charge carrier is directly transferred from one component to another. In some embodiments, components in electrical communication are in indirect electrical communication wherein an electronic signal or charge carrier is indirectly transferred from one component to another via one or more intermediate structures, such as circuit elements, separating the components. As used herein, electrical communication includes one way and two way electrical communication.

As used herein, the term "thin layer" refers to a material that at least partially covers an underlying substrate, wherein the thickness is less than or equal to 300 µm, less than or equal to 200 µm, or less than or equal to 50 µm.

As used herein, the term "nanomaterial" refers to a solid material having one, two, or three of its dimensions less than approximately 1000 nanometers, preferably less than approximately 500 nanometers, most preferably less than approximately 100 nanometers (e.g., the range of a few nanometers to several tens or hundreds of nanometers). Nanomaterials can either occur naturally in nature or be manufactured and may comprise a variety of shapes, sizes, and properties. Nanomaterials are often divided into four categories: carbon-based, metal-based, dendrimers, and composites. Examples of nanomaterials include, but are not limited to, fullerenes, carbon nanotubes, quantum dots, graphene oxide flakes, ceramics, clays, metal nanoparticles, pure substances (e.g., iron (III) oxide ($Fe_2O_3$), tungsten (VI) oxide ($WO_3$), titanium (IV) oxide ($TiO_2$), molybdenum (VI) oxide ($MoO_3$), vanadium (V) oxide ($V_2O_5$), chromium (III) oxide ($Cr_2O_3$), indium (III) oxide ($In_2O_3$), tin (IV) oxide ($SnO_2$), and manganese (IV) oxide ($MnO_2$)), pure substances of specific crystalline structure (monoclinic, orthorhombic, cubic, etc.), pure substances of specific solid phase (alpha, beta, gamma, epsilon, etc.), pure substances with dopants (gamma $Fe_2O_3$ doped with $TiO_2$, for example), substances made with specific synthesis methods (sol gel, co-precipitation, ultrasonically assisted co-precipitation, flame spray pyrolysis, etc.), and substances formed with specific nanocrystalline structures (nanoparticles, single-walled nanotubes, multi-walled nanotubes, single crystal nanowires, nanospheres, nanorods, nanofilms, nanoclusters, etc.).

As used herein, the term "encapsulate" refers to the orientation of one structure such that it at least partially, and in some cases completely, surrounds one or more other structures. "Partially encapsulate" refers to the orientation of one structure such that it partially surrounds one or more other structures. "Completely encapsulate" refers to the orientation of one structure such that it completely surrounds one or more other structures. In some embodiments, the term "encapsulated" is used, which refers to the orientation of one structure such that it is at least partially, and in some cases completely, surrounded by one or more other structures. "Partially encapsulated" refers to the orientation of one structure such that it is partially surrounded by one or more other structures. "Completely encapsulated" refers to the orientation of one structure such that it is completely surrounded one or more other structures.

As used herein, the term "mechanically compliant", e.g., a "mechanically compliant component" (e.g., a spring) refers to the ability of the mechanically compliant component to allow movement of a first component to move relative to a second component such that shocks and movements associated with the first component and/or second component are absorbed by the mechanically compliant component. In some embodiments, the mechanically compliant component couples the first component to the second component.

As used herein, the term "room temperature" refers to a temperature range of from approximately 20° C. to approximately 26° C.

Calorimeter Apparatus

In some embodiments, the technology relates to a calorimeter, e.g., as shown in FIG. 1. In some embodiments, the calorimeter comprises thermal shields (e.g., machined from copper and/or aluminum) to minimize temperature fluctuations. In some embodiments, the calorimeter comprises an outer thermal shield (e.g., comprising copper) and an inner thermal shield (e.g., comprising aluminum).

In some embodiments, the thermal shields encapsulate a capillary (e.g., a glass capillary (e.g., a borosilicate glass capillary)). In some embodiments, the capillary has an inner diameter (ID) of approximately 2 mm (e.g., approximately 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.11, 2.12, 2.13, 2.14, 2.15, 2.16, 2.17, 2.18, 2.19, or 2.20 mm). In some embodiments, the capillary has an outer diameter (OD) of approximately 3 mm (e.g., approximately 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.11, 2.12, 2.13, 2.14, 2.15, 2.16, 2.17, 2.18, 2.19, 2.20, 2.21, 2.22, 2.23, 2.24, 2.25, 2.26, 2.27, 2.28, 2.29, 2.30, 2.31, 2.32, 2.33, 2.34, 2.35, 2.36, 2.37, 2.38, 2.39, 2.40, 2.41, 2.42, 2.43, 2.44, 2.45, 2.46, 2.47, 2.48, 2.49, 2.50, 2.51, 2.52, 2.53, 2.54, 2.55, 2.56, 2.57, 2.58, 2.59, 2.60, 2.61, 2.62, 2.63, 2.64, 2.65, 2.66, 2.67, 2.68, 2.69, 2.70, 2.71, 2.72, 2.73, 2.74, 2.75, 2.76, 2.77, 2.78, 2.79, 2.80, 2.81, 2.82, 2.83, 2.84, 2.85, 2.86, 2.87, 2.88, 2.89, 2.90, 2.91, 2.92, 2.93, 2.94, 2.95, 2.96, 2.97, 2.98, 2.99, 3.00, 3.01, 3.02, 3.03, 3.04, 3.05, 3.06, 3.07, 3.08, 3.09, 3.10, 3.11, 3.12, 3.13, 3.14, 3.15, 3.16, 3.17, 3.18, 3.19, 3.20, 3.21, 3.22, 3.23, 3.24, 3.25, 3.26, 3.27, 3.28, 3.29, or 3.30 mm).

In some embodiments, the capillary comprises a sample holder capsule (e.g., a glass sample holder capsule (e.g., a borosilicate glass sample holder capsule)). In some embodiments, the capillary comprises an inward notch to hold the borosilicate sample holder capsule (see FIG. 1B). In some embodiments, the capillary comprises an inward notch to hold the borosilicate sample holder capsule at the center of the capillary (e.g., where the reaction occurs).

In some embodiments, the volume enclosed by the outer shield is under a high vacuum (<7 μTorr (e.g., less than approximately 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 μTorr)). In some embodiments, the temperature of the volume enclosed by the outer shield is stabilized. In some embodiments, the temperature of the volume enclosed by the outer shield is stabilized above room temperature (e.g., 23 to 36° C. (e.g., approximately 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, or 40.0° C.). In some embodiments, the temperature of the volume enclosed by the outer shield is stabilized by a feedback control loop using two planar film heaters (see FIG. 11).

In some embodiments, the outer shield is thermally isolated from other components and/or from the environment. In some embodiments, the outer shield is placed on supports (e.g., ceramic balls) (see, e.g., FIG. 1A) to provide thermal isolation from the environment and/or other components, e.g., from the gas handling unit. In some embodiments, the outer shield is placed on a plurality of (e.g., 2, 3, 4, 5, 6, 7, 8, 9, 10, or more) supports (e.g., ceramic balls) (see, e.g., FIG. 1A) to provide thermal isolation from the environment and/or other components, e.g., from the gas handling unit. In some embodiments, the inner shield (see, e.g., FIGS. 1A and 1C) covers the central part of the capillary tube. In some embodiments, the capillary tube is heated to the target reaction temperature (e.g., 25-300° C. (e.g., approximately 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300° C.)) using resistive heaters (e.g., comprising NiChrome wire (e.g., AWG 38)) as shown by red lines in FIG. 1A. In some embodiments, the resistive heaters cover the circumference of the inner shield and thus uniformly heat the inner shield.

In some embodiments, a thin (e.g., 50-100 μm (e.g., 50, 55, 60, 65, 70, 75, 80, 85, 90, 95, or 100 μm)) layer of a ceramic adhesive (e.g., Ted Pella, 16026) is applied underneath the resistive heaters (e.g., NiChrome wire) to provide electrical insulation from the inner shield (e.g., aluminum inner shield). In some embodiments, the inner shield is split (e.g., in the middle) and held together by a movable and/or compliant component (e.g., springs) to compensate for the mismatch of radial thermal expansion between the material of the inner shield (e.g., aluminum) and the material of the capillary tube (e.g., borosilicate glass), e.g., at high temperatures.

In some embodiments, heat is poorly conducted across the line contact between the inner shield halves and the tube surface (e.g., due to low thermal conductance). In some embodiments, fluctuations in the thermal conductance across this poor site of heat conductance have a relatively small impact on the temperature of the capillary tube. Nevertheless, in some embodiments, a stable strong thermal link between the inner shield and capillary tube is provided for efficient heating of the central part of the capillary tube. In particular embodiments, a stable strong thermal link between the inner shield and capillary tube is provided using wires (e.g., flexible copper wires) (e.g., a plurality of (e.g., 10-20 (e.g., 10, 11, 12, 13, 14, 15, 16, 17, 18, 19, 20 (e.g., 15))) AWG38 wires (e.g., comprising a length of 20 mm (e.g., 15-25 mm (e.g., 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0)) on each side of the inner shield). In some embodiments, the wires (e.g., flexible copper wires) are connected mechanically on a first end to the inner shield and on a second end to the capillary tube (see, e.g., FIG. 1A). In some embodiments, the second ends of the wires are soldered (e.g., ultrasonically) directly to the capillary tube. This method of thermal connection (e.g., using flexible wires) is robust and insensitive (e.g., substantially insensitive) to thermal expansion. Accordingly, in some embodiments, the design of the calorimeter provides high long-term thermal stability over a large number of operating cycles. During the development of this apparatus, experiments conducted indicated that other approaches to making thermal contacts, such as using high-temperature ceramic epoxy (e.g., Ted Pella, 16026) and mechanical contacts (e.g., using leaf springs inserted in the clearance between inner shield and capillary tube) were not suitable because their thermal conductance drifts significantly over time due to the mismatch in thermal expansion between the aluminum inner shield and glass capillary tube.

In some embodiments, the calorimeter temperature is monitored at a plurality of points (e.g., six points) using glass encapsulated thermistors that are read out with Wheatstone Bridges as described herein. For example, in some embodiments, the temperature of the outer shield ($T_{os}$) is measured by a thermistor located 6 mm inside the bulk of the outer shield (see FIG. 11). The temperatures at the left ($T_{is\_left}$) and the right ($T_{is\_right}$) side of the inner shield are measured close to the contact points of the copper wires that connect to the capillary tube (see, e.g., FIGS. 1A and 1C). The temperature of the capillary tube is monitored at three different locations (e.g., left, right, and center) of the capillary tube (e.g., labeled $T_{c\text{-}left}$, $T_{c\text{-}right}$, and $T_{c\text{-}mid}$, respectively). The thermistors are soldered directly on the capillary tube using ultrasonic soldering of glass to glass to minimize and/or eliminate long-term drift associated with a change in contact thermal conductance. At the center of the tube, an additional thermistor is installed to act as a dedicated heater (by Joule heating) and is used to calibrate the calorimeter as described herein. The heat conduction by the thermistor leads is minimized by using thin electrical connection wires (e.g., AWG 42 to AWG 50) that are >30 mm in length.

Methods

Figure 2:
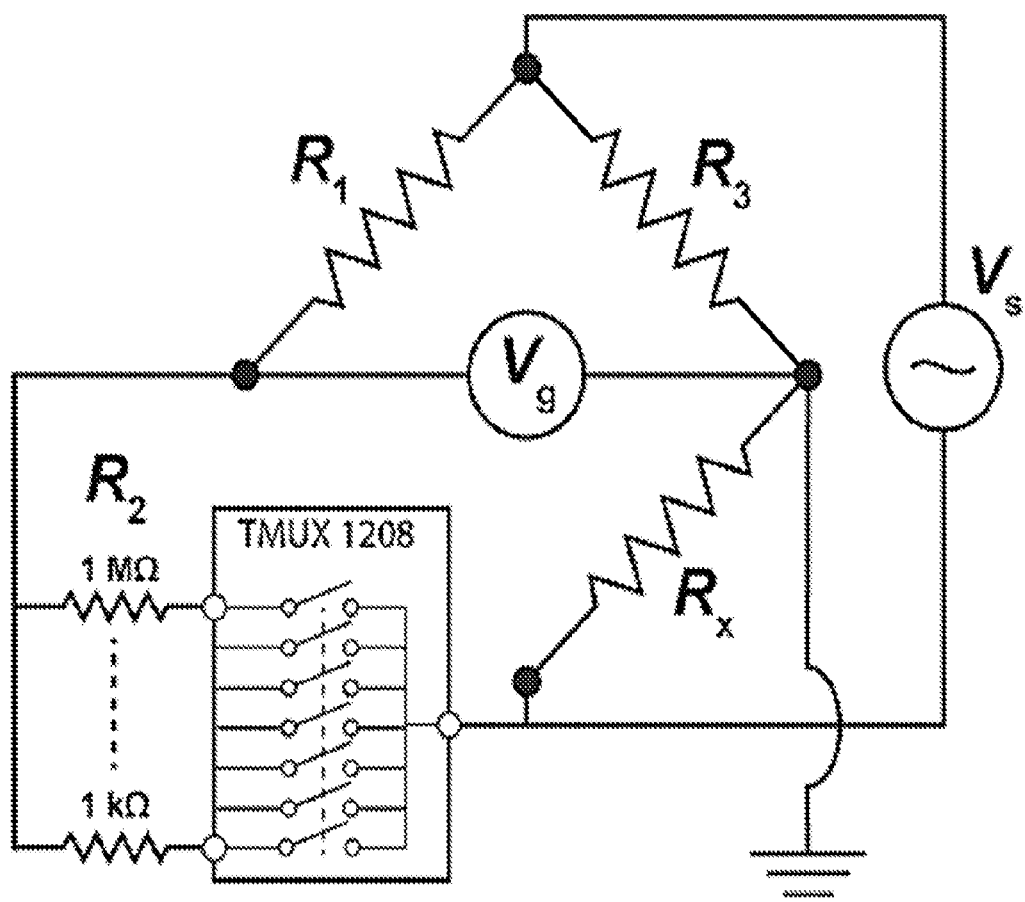
FIG. 2 is a schematic drawing of a Wheatstone bridge circuit with a switching balance resistor for readout of thermistor resistance Rx. The bridge is driven via an AC voltage with amplitude of 100 mV·p at 199 Hz, and Vg is recorded using a lock-in technique. The balance resistor $R_2$ is switched automatically using a look-up table at discrete values of resistance ranging from 1 MΩ to 1 kΩ to keep the bridge in range as the thermistor value Rx changes in the operating temperature range of 25 to 300° C. $R_1$ and $R_3$ have a constant value of 10 kΩ.

In some embodiments, the technology relates to methods of measuring heat and/or temperature, e.g., using a calorimeter as described herein. In some embodiments, methods comprise sensing temperature using a thermistor (e.g., a glass-encapsulated thermistor (e.g., a 1-MOhm (e.g., approximately 0.80, 0.85, 0.90, 0.95, 1.00, 1.05, 1.10, 1.15, or 1.20 MOhm) glass-encapsulated thermistor (e.g., US Sensor GP105V8J))). In some embodiments, methods comprise reading measurements from the thermistor, e.g., as described in references 10 and/or 11, each of which is incorporated herein by reference. For example, in some embodiments, methods comprise measuring thermistor resistance, e.g., using a full Wheatstone bridge (see, e.g., FIG. 2). In some embodiments, methods comprise driving the Wheatstone bridge. In some embodiments, methods comprise providing an AC voltage (e.g., having a 100 mV peak amplitude (e.g., approximately 90, 91, 92, 93, 94, 95, 96, 97, 98, 99, 100, 101, 102, 103, 104, 105, 106, 107, 108, 109, or 110 mV peak amplitude)) at approximately 199 Hz (e.g., approximately 190, 191, 192, 193, 194, 195, 196, 197, 198, 199, 200, 201, 202, 203, 204, 205, 206, 207, 208, 209, or 210 Hz)). In some embodiments, methods comprise providing a function generator. In some embodiments, methods comprise generating the AC voltage using a function generator (e.g., an Agilent 33120 function generator). In some embodiments, methods comprise amplifying the output voltage of the bridge ($V_g$) by 40 dB (e.g., amplifying by approximately 35.0, 35.1, 35.2, 35.3, 35.4, 35.5, 35.6, 35.7, 35.8, 35.9, 36.0, 36.1, 36.2, 36.3, 36.4, 36.5, 36.6, 36.7, 36.8, 36.9, 37.0, 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, 40.0, 40.1, 40.2, 40.3, 40.4, 40.5, 40.6, 40.7, 40.8, 40.9, 41.0, 41.1, 41.2, 41.3, 41.4, 41.5, 41.6, 41.7, 41.8, 41.9, 42.0, 42.1, 42.2, 42.3, 42.4, 42.5, 42.6, 42.7, 42.8, 42.9, 43.0, 43.1, 43.2, 43.3, 43.4, 43.5, 43.6, 43.7, 43.8, 43.9, 44.0, 44.1, 44.2, 44.3, 44.4, 44.5, 44.6, 44.7, 44.8, 44.9, or 45.0 dB) to produce an amplified output voltage. In some embodiments, methods comprise filtering the amplified output voltage, e.g., using a low pass filter (e.g., having a cut off frequency of 220 Hz (e.g., approximately 210, 211, 212, 213, 214, 215, 216, 217, 218, 219, 220, 221, 222, 223, 224, 225, 226, 227, 228, 229, or 230 Hz) to produce a filtered output voltage. In some embodiments, the low pass filter is a 4th-order Butterworth filter (e.g., Krohn-Hite 3384). In some embodiments, methods comprise amplifying the filtered voltage (e.g., amplifying by 10 dB (e.g., amplifying by approximately 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, or 11.0 dB)) and/or recording the filtered voltage (e.g., using an analog input DAQ channel (e.g., NI PCP-6014), e.g., at a 19.9 kHz sampling rate (e.g., at approximately a 19.50, 19.55, 19.60, 19.65, 19.70, 19.75, 19.80, 19.85, 19.90, 19.95, 20.00, 20.05, 20.10, 20.15, 20.20, 20.25, 20.30, 20.35, 20.40, 20.45, or 20.50 kHz sampling rate)). In some embodiments, methods comprise measuring the signal amplitude and phase with respect to the excitation at the excitation frequency. In some embodiments, methods comprise synchronously measuring the signal amplitude and phase with respect to the excitation at the excitation frequency. In some embodiments, measuring the signal amplitude and phase with respect to the excitation at the excitation frequency comprises using a LabView lock-in program. In some embodiments, methods comprise providing and/or using electronic components featuring very low temperature coefficients of resistance (e.g., Vishay's ultra-high precision Z-foil resistors (Y145310K0000V9L) to minimize and/or eliminate the effect of thermal drift.

Since the measurement range for the capillary and inner shield thermistors spans from 25 to 300° C., their electrical resistance changes accordingly from 1 MΩ to 0.5 kΩ (at 300° C.). This large variation of resistance significantly reduces the Wheatstone bridge sensitivity. Therefore, in some embodiments, methods comprise varying (e.g., actively varying) the balance resistor ($R_2$) of the Wheatstone bridge (see, e.g., FIG. 2) to provide a sub-millikelvin sensitivity in the entire operating range. In some embodiments, varying (e.g., actively varying) the balance resistor ($R_2$) of the Wheatstone bridge comprises providing and/or using a resistor bank and a multiplexer (TMUX 1208). In some embodiments, the multiplexer comprises a plurality of resistors. In some embodiments, the multiplexer comprises eight resistors. In some embodiments, the plurality of resistors provide resistances having values ranging from 1 kOhm to 1 MOhm (e.g., 1, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 kOhm), e.g., to balance the Wheatstone bridge at over the range temperatures in which the calorimeter operates. In some embodiments, the upper resistors in the bridge, $R_1$ and $R_3$, have a constant value (e.g., 10 kOhm (e.g., approximately 9.80, 9.85, 9.90, 9.95, 10.00, 10.05, 10.10, 10.15, or 10.20 kOhm)).

Figure 3:
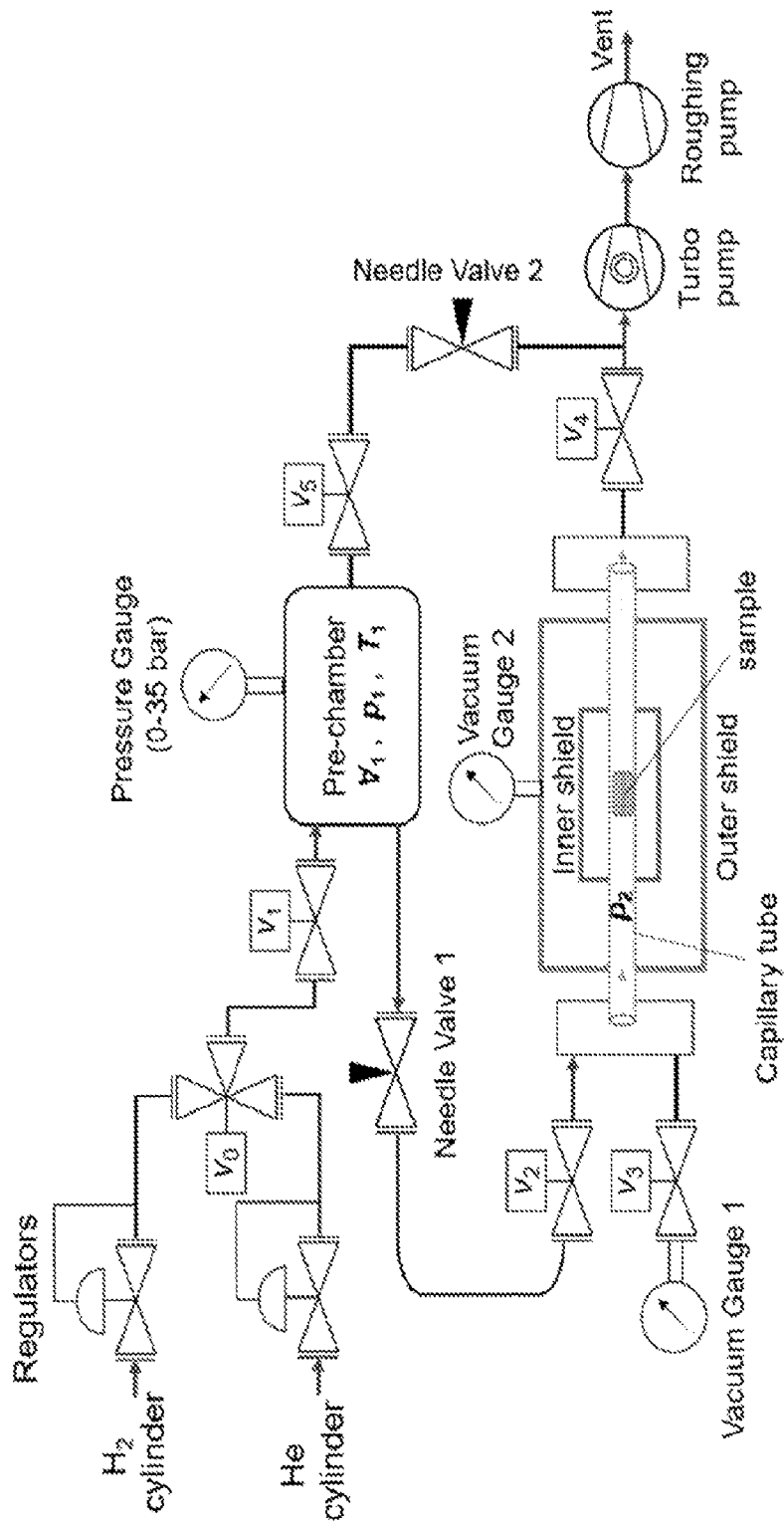
FIG. 3 is a schematic drawing of a gas handling unit and flow path of the calorimetric reactor. The valves $V_0$ to $V_5$ are miniature solenoid valves. During a hydrogen absorption experiment the prechamber is loaded with the reactant gas to a desired pressure $p_1$, then this known amount of gas is introduced to the reaction tube while pressure recording provides a measurement used to determine the mass of absorbed gas on the sample.

In some embodiments, methods comprise managing a gas flow, e.g., by providing and/or using a gas handling unit. For example, e.g., as shown in FIG. 3, the gas handling unit comprises a gas handling unit and a flow path for gases. In some embodiments, the gas handling unit comprises a prechamber, a capillary tube, and a plurality of (e.g., 6) miniature fast switching solenoid valves (e.g., Parker Hannifin, Series 99). In some embodiments, methods comprise measuring gas pressure, e.g., to quantify the mass of gas introduced into the calorimeter. In some embodiments, quantifying the mass of gas introduced into the calorimeter comprises removing gases from the pre-chamber and capillary tube (e.g., by pumping) to a low vacuum level (<10 mTorr (e.g., less than 10.0, 9.9, 9.8, 9.7, 9.6, 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5, 6.4, 6.3, 6.2, 6.1, 6.0, 5.9, 5.8, 5.7, 5.6, 5.5, 5.4, 5.3, 5.2, 5.1, 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, or 0.1 mTorr)), e.g., using a turbomolecular pump.

For example, as shown in FIG. 3, methods comprise pumping gases from the pre-chamber and capillary tube by opening valves 4 and 2 and keeping all other valves closed. In some embodiments, methods comprise measuring the vacuum level, e.g., using a vacuum gauge (e.g., a MKS 925 Micro Pirani) (e.g., vacuum gauge 1 in FIG. 3 when valve 3 is open). Then, in some embodiments, methods comprise closing a valve (e.g., valve 3 in FIG. 3) prior to gas introduction, e.g., to isolate the large parasitic volume of this vacuum gauge from the rest of the calorimeter and prevent damage to the gauge at high pressures. Then, in some embodiments, methods comprise closing all other valves for a short duration (e.g., a few seconds (e.g., 0.5 to 5.0 seconds) to prevent introducing unwanted gas to the vacuum system when valve 1 is opened. Accordingly, as shown in FIG. 3, opening valve 1 introduces a known volume (e.g., 3.80 ml (e.g., 3.8, 3.9, 4.0, 4.1, 4.2, or 4.3 ml)) of reactant gas into the pre-chamber at the pressure set by the gas cylinder regulator. Then, in some embodiments, methods comprise measuring the gas pressure in the pre-chamber, e.g., using a high accuracy pressure transducer (e.g., Omega PXM409-035BA10V) (e.g., having a range of 35 bar), and adjusting the high accuracy pressure transducer to a set point by bleeding off excess pressure (e.g., using valve 5 in FIG. 3). In some embodiments, methods comprise allowing the gas to pass into the capillary after the pressure and temperature are stabilized in the pre-chamber (e.g., by opening valve 2 in FIG. 3). In some embodiments, methods comprise recording (e.g., continuously recording) the pressure of the pre-chamber (e.g., $p_1$ in FIG. 3), e.g., at a 20-Hz sampling rate (e.g., approximately 15-25 Hz sampling rate (e.g., 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, or 25.0 Hs sampling rate). In some embodiments, methods comprise providing a needle metering valve (e.g., Swagelok SS-SS1), e.g., needle valve 1 in FIG. 3. In some embodiments, methods comprise adjusting the rate of gas introduction to the chamber using a needle metering valve. In some embodiments, methods comprise maintaining the rate of gas introduction at a constant (e.g., substantially constant) during a set of experiments.

In some embodiments, methods comprise calculating the amount of gas absorption using the measured gas volume, pressure, temperature, and composition before and after expansion. For example, in some embodiments, calculating the amount of gas absorption ($\Delta n_{absorbed}$ [$\mu$mol]) based on the mass balance of a closed system comprises using Equation 1:

$$\Delta n_{absorbed} = n_1 - n_2 = \forall_1 \bar{\rho}_1 - (\forall_1 + \forall_2)\bar{\rho}_2 \tag{1}$$

where $\forall_1$ is the volume of pre-chamber; and $\forall_2$ is the sum of volumes of capillary tube, connection tubes, and parasitic volume of valves. In other words, $\forall_1$ is the volume of gas prior to expansion and $\forall_1 + \forall_2$ is the volume of gas after expansion. Similarly, $\bar{\rho}_1$ and $\bar{\rho}_2$ are the volume-averaged molar densities of gas before and after expansion that were obtained from the measured temperature and pressure of the gas and by linearly interpolating the density data obtained from NIST thermophysical properties (see, e.g., 12, incorporated herein by reference). Calculating $\bar{\rho}_2$ involves considering local densities due to temperature differences at various locations in the reaction tube calculated as $\bar{\rho}_2 = \Sigma_i \rho_i V_i / \Sigma_i V_i$. The local gas temperature was estimated along the length of the capillary tube by linearly interpolating between the measured temperatures at the three sensors.

Figure 4:
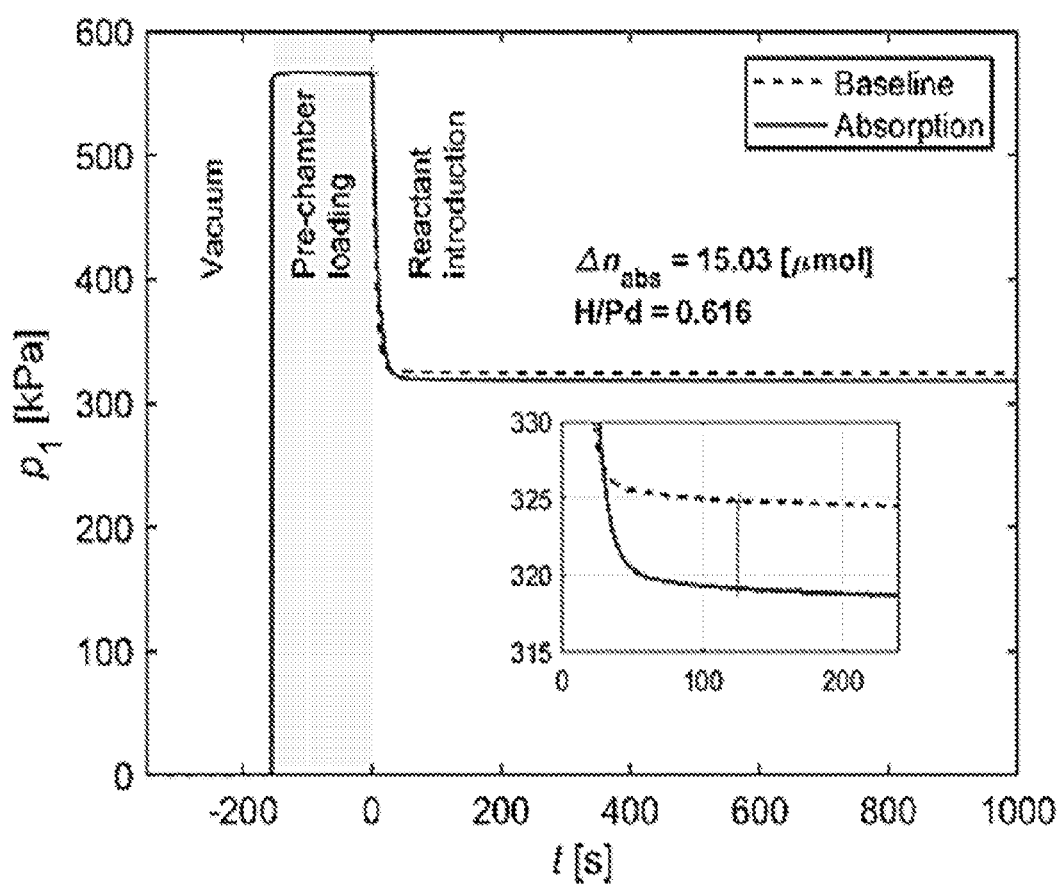
FIG. 4 is a plot showing the measured pre-chamber pressure during gas introduction from pre-chamber to capillary for resolving the amount of absorbed gas $\Delta n_{absorbed}$ and equilibrium H/Pd ratio. The dashed line shows a baseline experiment performed using an inert sample capsule with no material. The blue line shows a subsequent experiment with a Pd nano-powder sample of mass 5.19 mg. The red line in the inset indicates the drop in the pressure trace due to absorption of gas on the solid sample.

During the development of embodiments of the technology provided herein, experiments were conducted to calculate gas absorption during a reaction in the calorimeter. The pre-chamber volume ($\forall_1$) was determined separately to be 3.80 ml by measuring the amount of water required to fill the pre-chamber. For accurate quantification of $\forall_2$ a baseline measurement using an empty sample capsule was sued, where $\forall_2$ was calculated by setting $\Delta n_{absorbed} = 0$ in Equation 1, which was measured to be 2.79±0.03 ml. The pressure sensing resolution was estimated to be 40 Pa/$\sqrt{\text{Hz}}$ (estimated from a pressure measurement of a pressurized closed chamber under equilibrium) leading to a mass balance resolution better than 0.1 $\mu$mol in the entire operating range of the instrument. FIG. 4 shows pressure measurements performed during $H_2$ absorption during a baseline experiment for quantification of $\Delta n_{absorbed}$. The three steps of evacuating the chamber, introducing gas into the pre-chamber, and introducing reactant into capillary tube (labelled "Vacuum", "Pre-chamber loading", and "Reactant introduction", respectively) are shown in FIG. 4. Further, the drop in the equilibrium $H_2$ pressure with respect to the baseline after introduction of $H_2$ is shown in the inset of FIG. 4 with the red vertical line. This drop in pressure is due to absorption of $H_2$ on the sample and is used to quantify $\Delta n_{absorbed}$.

Although the disclosure herein refers to certain illustrated embodiments, it is to be understood that these embodiments are presented by way of example and not by way of limitation.

EXAMPLES

The technology provided herein provides a calorimetric reactor for measuring the heat of chemical reactions, e.g., between a gas phase reactant and milligram-scale solid phase samples. During the development of embodiments of the technology described, experiments were conducted to test the calorimeter.

The instrument measures the amount of absorbed reactants on the sample using a pressure-concentration measurement technique with a resolution of 0.1 μmol/√Hz. The instrument finds use in studying nanomaterial samples, given that typical laboratory synthesis of nanomaterials yields milligram scale samples. The operating range of this instrument is from room temperature to 300° C., and 10 mbar to 30 bar. To accurately interpret the results of the calorimetry, a one-state lumped-thermal capacity heat transfer model was developed with pressure and temperature-dependent thermal conductance and temperature-dependent heat capacitance (see Examples). The instrument parameters, such as total thermal conductance and thermal capacitance, were calibrated using an electrical heater installed at the sample location. The heat flow resolution was demonstrated to be better than 3 μW/√Hz in the entire operating range, which was validated via a set of $H_2$ absorption experiments on Pd nanoparticles with a sample mass in the 3-5 mg range and performed at two pressure levels (3, 7 bar), and three temperatures (30, 125, and 230° C.). The results agree with previously reported values of the enthalpy of hydrogenation of Pd and the equilibrium H/Pd ratio. The advances presented here enable high-resolution calorimetry for measurement of thermodynamics and kinetics of chemical processes on nanomaterials including catalytic reactions, phase transformations, and thermochemical energy storage using metal hydrides.

Example 1

Figure 1A:
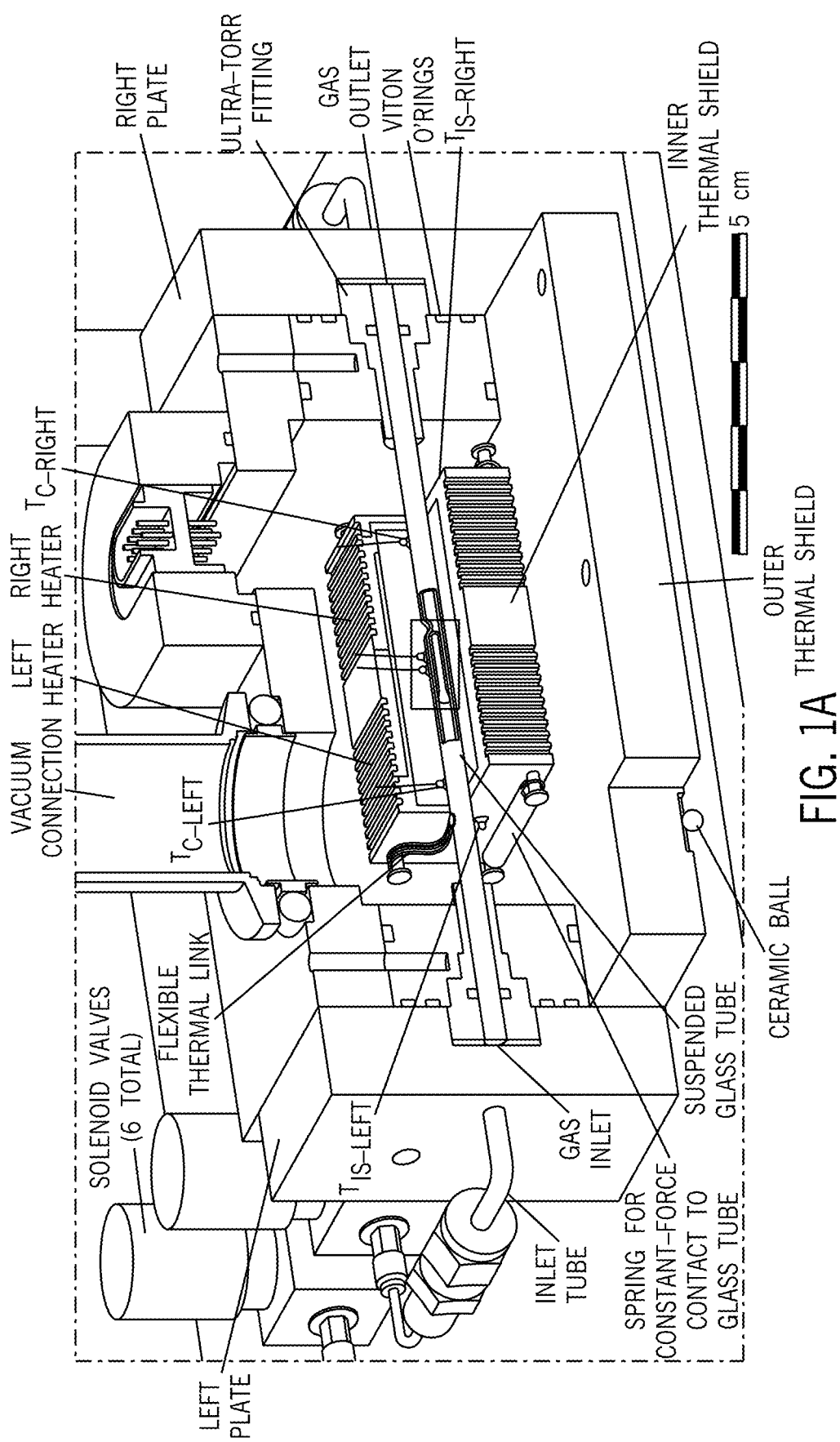
FIG. 1A is a drawing showing a cross-sectional view of a calorimeter and its components. The outer copper shield and the inner aluminum shield are shown. The suspended glass tube extends along the length of the calorimeter. The location of thermistors for temperature measurements are shown as small blue circles. Although not apparent from the drawing, the inlet tube and gas inlet are internally connected.
Figure 1B:
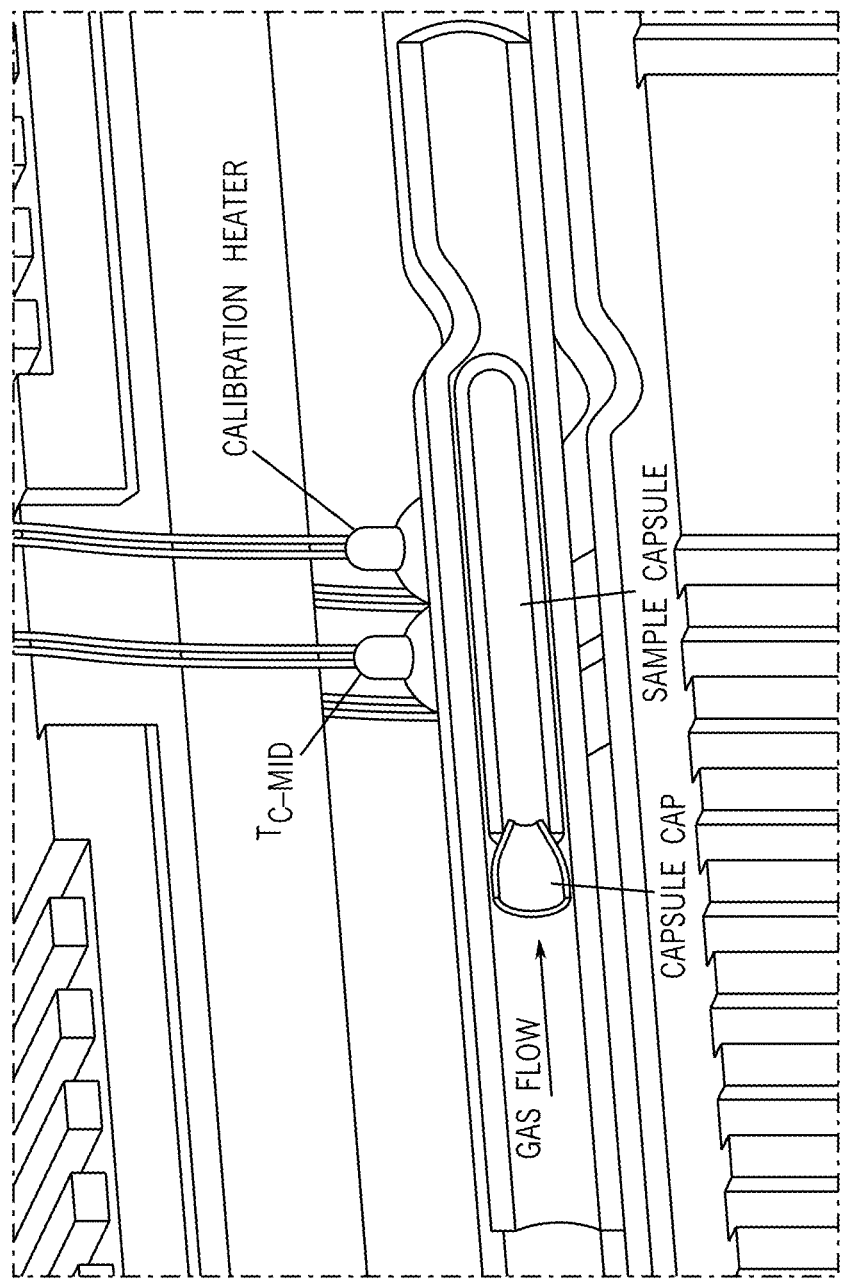
FIG. 1B is a drawing showing a zoomed-in view of the center of the glass tube and sample holder capsule assembly.
Figure 1C:
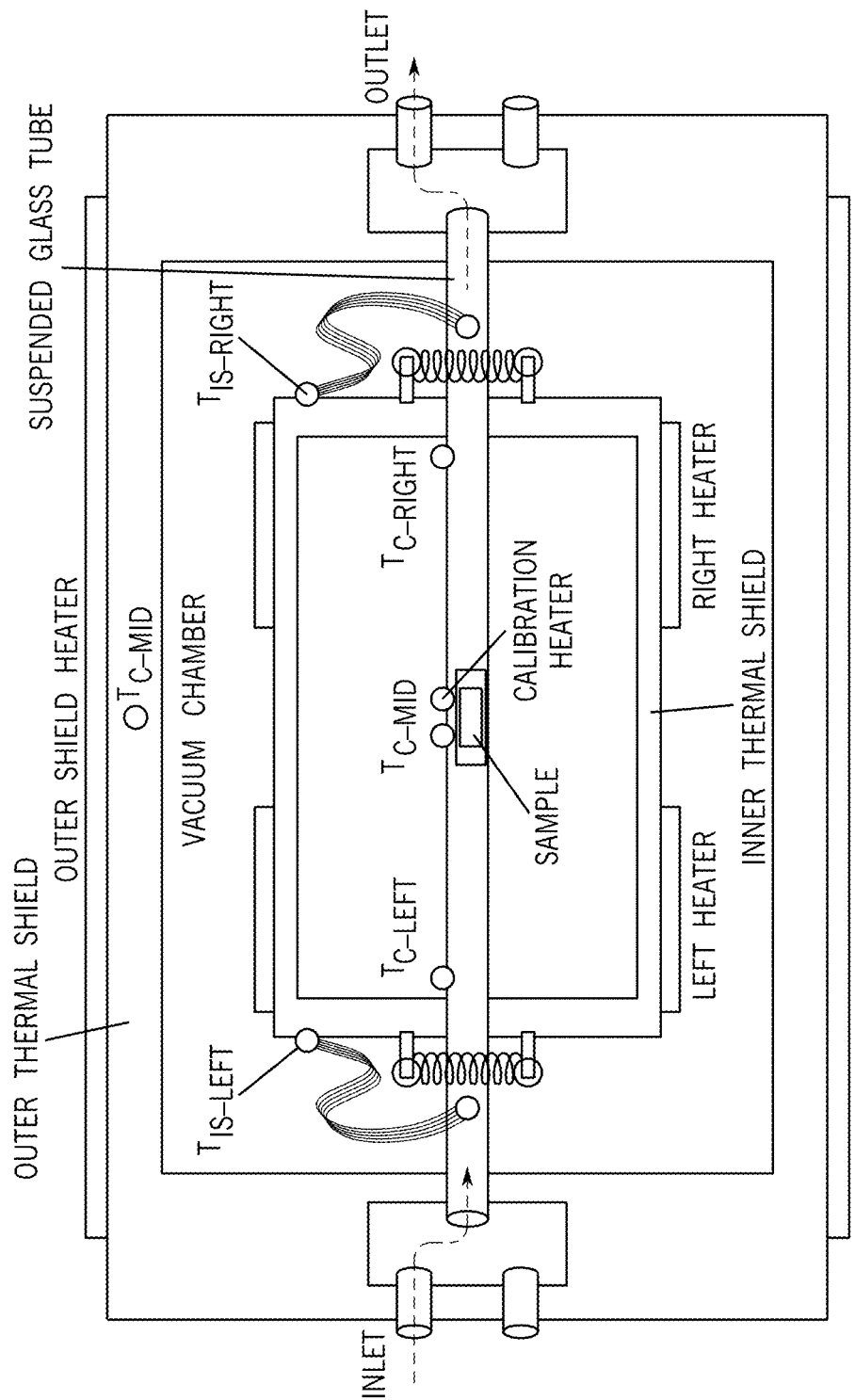
FIG. 1C is a schematic drawing of the calorimeter (not to scale).

The design of the calorimeter developed in this work is shown schematically in FIG. 1. It comprises two thermal shields, and inner shield machined from aluminum and an outer shield machined from copper, to minimize temperature fluctuations. A borosilicate glass capillary (Inner diameter (ID)=2 mm, Outer diameter (OD)=3 mm) is encapsulated by the shields. The capillary has an inward notch to hold a borosilicate sample holder capsule (see FIG. 1B) at the center of the capillary where the reaction occurs. The volume enclosed by the outer shield is under a high vacuum (<7 μTorr) and its temperature is stabilized, via a feedback control loop, above room temperature (typically set to a temperature in the range of 23 to 36° C.) using two planar film heaters (see FIG. 11). The outer shield is placed on four ceramic balls (see FIG. 1A) to thermally isolate it from the environment and gas handling unit.

The inner shield (shown in FIGS. 1A and 1C) covers the central part of the capillary tube, which is heated to the target reaction temperature (25-300° C.) using two resistive heaters made of NiChrome wire (AWG 38) (shown by red lines in FIG. 1A), which cover the circumference of the shield and uniformly heat the inner shield. A thin (50-100 μm) layer of a ceramic adhesive (Ted Pella, 16026) is applied underneath the NiChrome wire to provide electrical insulation from the aluminum inner shield. The inner shield is split in the middle and held together via two springs to compensate for the mismatch of radial thermal expansion between aluminum and the borosilicate tube at high temperatures.

The line contact between the inner shield halves and the tube surface results in a weak thermal link (e.g., low thermal conductance); therefore, fluctuations in the thermal conductance of this weak link have a relatively small impact on the temperature of the capillary tube. Nevertheless, a stable strong thermal link between the inner shield and capillary tube is required to enable efficient heating of the central part of the capillary tube. This strong thermal link is achieved via flexible copper wires (fifteen AWG38 wires with a length of 20 mm were used on each side of the inner shield), which on one end are connected mechanically to the inner shield and on the other end soldered ultrasonically directly on the capillary tube as shown in FIG. 1A. This method of thermal connection via flexible wires is robust and insensitive to thermal expansion, therefore, it provides high long-term thermal stability over a large number of operating cycles. During the development of this apparatus, it was found that other approaches to making thermal contacts, such as high-temperature ceramic epoxy (Ted Pella, 16026) and mechanical contacts via leaf springs inserted in the clearance between inner shield and capillary tube, were not suitable as their thermal conductance drifts significantly over time due to the mismatch in thermal expansion between the aluminum inner shield and glass capillary tube.

The calorimeter temperature is monitored at six points using glass encapsulated thermistors that are read out with Wheatstone Bridges as described below. The temperature of the outer shield ($T_{os}$) is measured by a thermistor located 6 mm inside the bulk of the outer shield (see FIG. 11). The temperatures at the left ($T_{is\_left}$) and the right ($T_{is\_right}$) side of the inner shield are measured close to the contact points of the copper wires that connect to the capillary tube (see FIG. 1A and FIG. 1C). The temperature of the capillary tube is monitored at three different locations; left, right, and center of the capillary tube and are labeled $T_{c-left}$, $T_{c-right}$, and $T_{c-mid}$, respectively. The thermistors are soldered directly on the capillary tube using ultrasonic soldering of glass to glass to prevent any long term drift associated with the change in contact thermal conductance. At the center of the tube, an additional thermistor is installed to act as a dedicated heater (by Joule heating) and is employed for calibration of the calorimeter as described later. The heat conduction via thermistor leads is minimized by using thin electrical connection wires (AWG 42 to AWG 50) that are >30 mm in length.

Example 2

Figure 5:
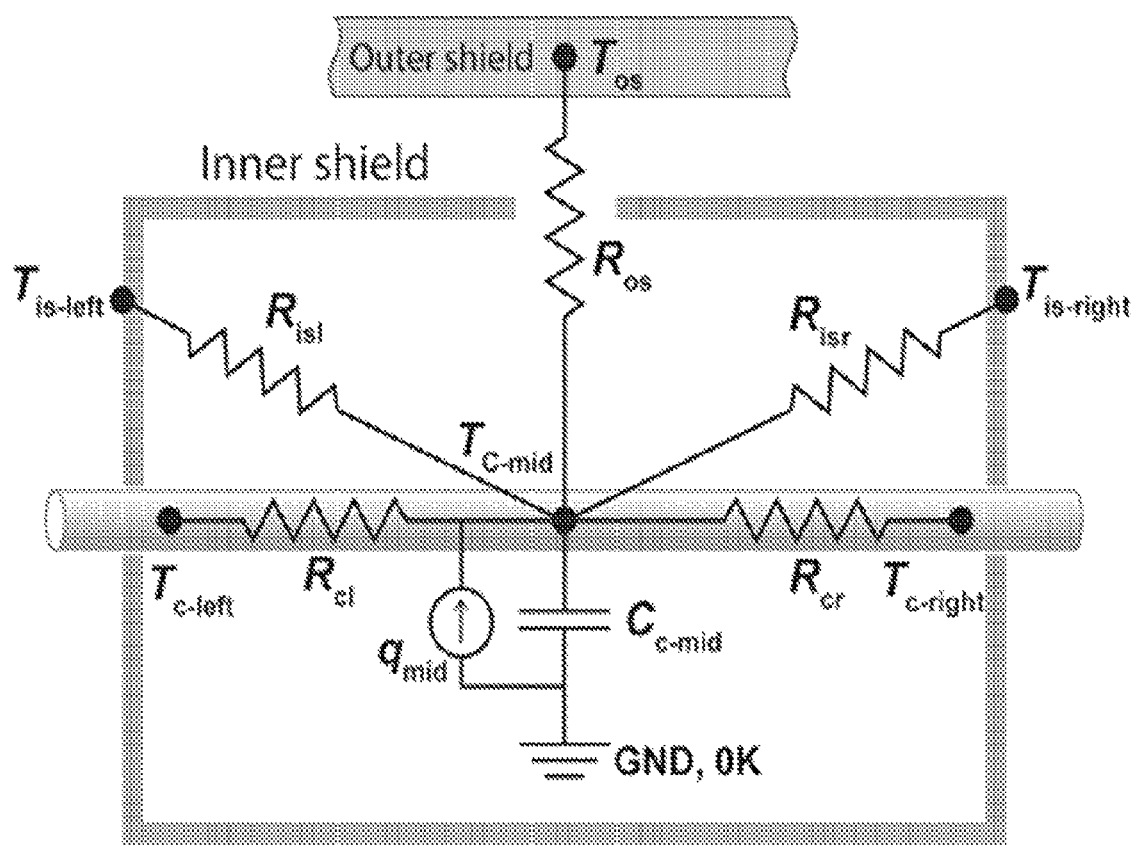
FIG. 5 is a schematic drawing showing the a lumped thermal capacity model. The center part of the capillary tube comprising the sample capsule and the sample and the two thermistors mounted on this region are lumped as a single thermal capacity of $C_{c-mid}$. Five thermal resistances are included, which connect the center node to capillary left/right, inner shield left/right, and outer shield.

During the development of embodiments of the technology provided herein, experiments were conducted to measure and characterize the thermal response of the calorimeter. In particular, a lumped thermal capacity heat transfer model (13) was developed to understand and predict the thermal response of the calorimeter. The physical parameters of the model, including thermal resistances and capacitances, were identified via calibration runs. In order to accurately interpret the results of experiments and convert the recorded values, such as temperature, pressure, and heating power, to quantities of interest (e.g., heat output in reactions), a lumped thermal capacity model of the system was developed. The equivalent thermal circuit of the lumped thermal capacity model is shown in FIG. 5, where the central part of the capillary tube comprising the sample capsule and the two central thermistors (shown in FIG. 1C) is abstracted as a node with lumped heat capacity $C_{c-mid}$, $R_{cl}$ and $R_{cr}$ represent the thermal resistances from the center node of the capillary to the left and right nodes, respectively, and capture the effects of heat conduction through the borosilicate tube and gas inside the tube. $R_{os}$ is the thermal resistance through $T_{c-mid}$ thermistor and calibration heater lead wires to the outer shield. In addition, $R_{isl}$ and $R_{isr}$ are the thermal resistances between the $T_{c-mid}$ node and the left and right nodes of the inner shield, respectively. Since the space inside the outer and inner shields is kept at a high vacuum (<7 µTorr), $R_{isl}$ and $R_{isr}$ capture the effects of heat transfer via thermal radiation and become especially important at high temperatures. Finally, amid is the sum of all heat flows to the center node, which includes the heat of reaction, heat transfer via the reactant gas, and heating by the calibration thermistor. The transient behavior of this model is described by a first order ordinary differential equation, where the heat release rate at the center node ($\dot{q}_{mid}$) is calculated using Eq. 2. Here, the first term indicates the heat flow due to conduction from multiple parallel paths with thermal resistances $R_i$ (as shown in FIG. 5) and the second term indicates the transient heat flow due to variation in stored thermal energy in the central node.

$$\dot{q}_{mid} = \sum_i (T_{c-mid} - T_i)/R_i + C_{c-mid}\frac{dT_{c-mid}}{dt} \quad (2)$$

The values of thermal resistances (R) and thermal capacitance (c) associated with the central node of the calorimeter are estimated by considering the material properties using simple heat conductance and capacitance relations shown in Equations 3 and 4:

$$R = \frac{1}{G} = \frac{L}{A_{Cross}k} \quad (3)$$

$$C = \sum_i m_i c_i \quad (4)$$

Figure 6A:
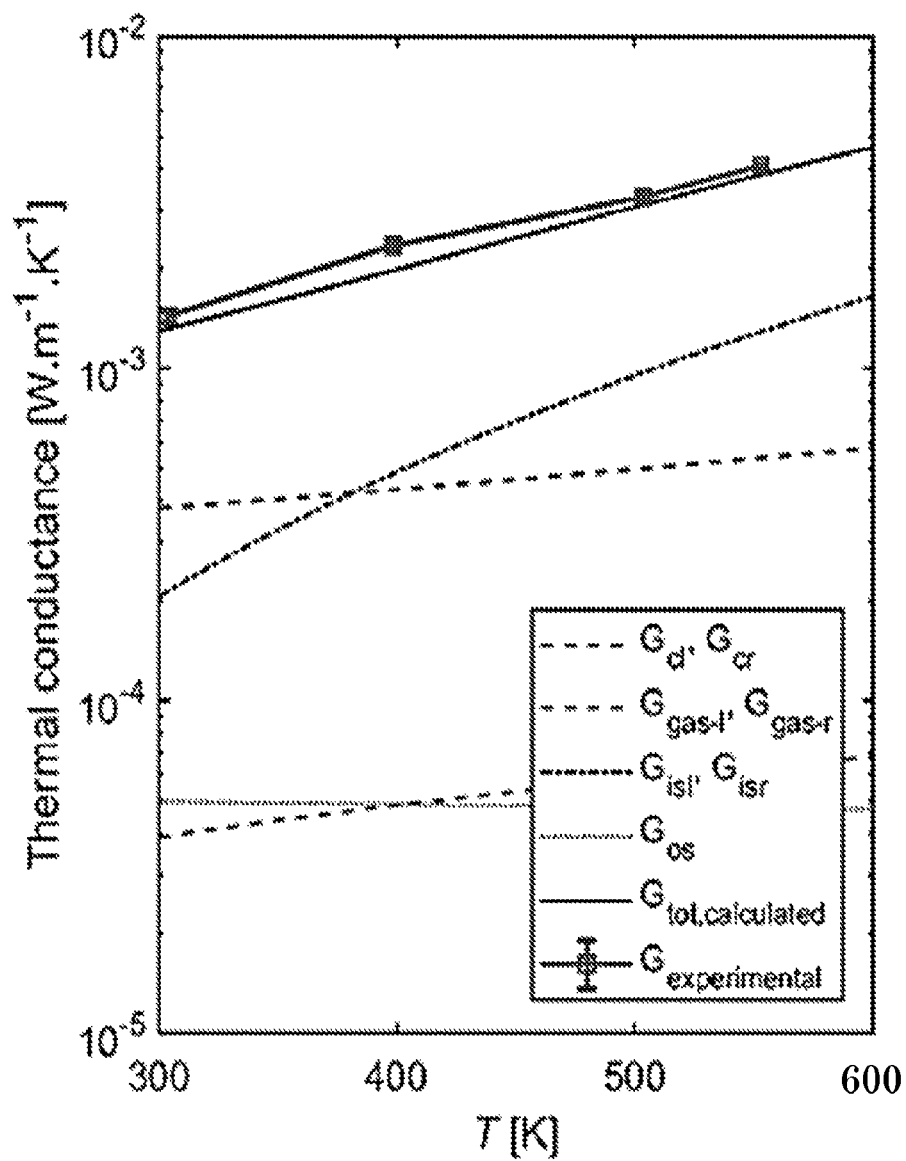
FIG. 6A is a plot showing the modelled thermal conductance values ($G_{cl}$, $G_{cr}$, $B_{isl}$, $G_{isr}$, and $G_{os}$ are the conductance values corresponding to FIG. 5; $G_{gas-l}$ and $G_{gas-r}$ are the gas conductance of left and right part of capillary, $G_{tot,calculated}$ is the sum of all the above conductances) and the measured total effective thermal conductance of the calorimeter ($G_{experimental}$).
Figure 6B:
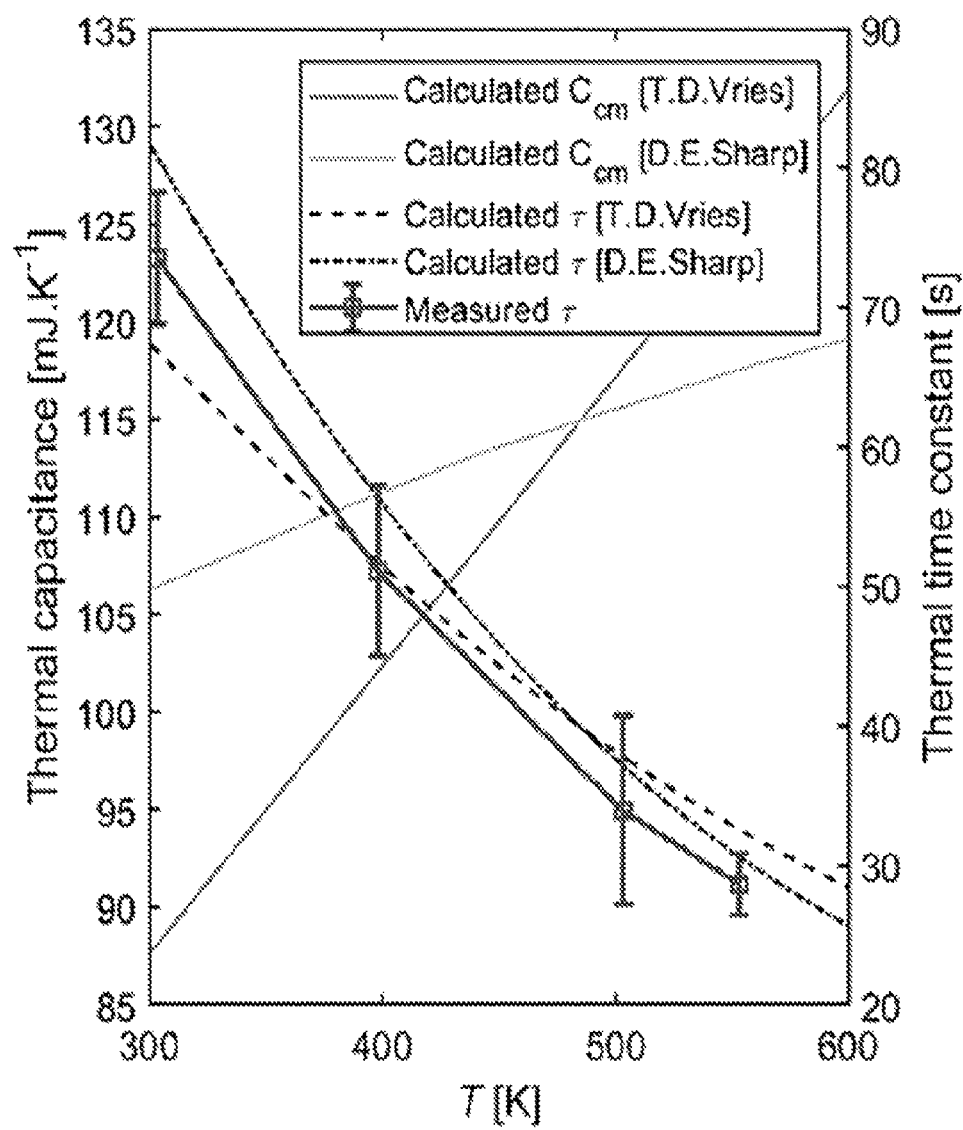
FIG. 6B is a plot showing the modelled thermal capacitance ($C_{cm}$) and the thermal time constant ($\tau$), and the measured thermal time constant of the calorimeter. The modeled capacitance is calculated using two different relations for heat capacity of borosilicate glass obtained from reference numbers 19 and 20, each of which is incorporated herein by reference.

Here, G is the thermal conductance and L, $A_{cross}$, and k are the length, cross sectional area, and the thermal conductivity of a heat conduction path, respectively, and $m_i$ and $c_i$ are the mass and specific heat capacity (per mass), respectively, of the $i^{th}$ component of the lumped material in a thermal node. Temperature-dependent thermal conductivity data for borosilicate glass (14) and copper (15) were used to model the capillary thermal conductance ($G_{cl}$ and $G_{cr}$) and the thermal conductance of copper wires connecting the central thermistors to the outer shield, respectively. The thermal conductance of gas in the glass tube was estimated using the pressure and temperature dependent thermal conductivity of hydrogen (16). The thermal conductance from the center node to inner shield ($G_{isl}$ and $G_{isr}$) via radiation is estimated from:

$$G_{radiation} = 4\varepsilon\sigma A_1 F_{1\to 2} T_{c-mid}^3, \quad (5)$$

where $A_1$, $\varepsilon$, and $T_{c-mid}$ are the surface area, emissivity, and temperature of the center node, respectively, and o is the Stefan-Boltzmann constant. In these calculations a surface averaged emissivity of 0.92 was assumed for borosilicate glass (17) and 0.1 for the solder (18) covering the glass surface along with a view factor ($F_{1\to 2}$) of unity, since the inner shield completely encloses the central part of capillary. The heat capacity of the central node was estimated from data for the heat capacity of borosilicate glass (19, 20). The calculated parameters are shown as a function of the inner shield temperature in FIG. 6. The validity of these estimates was confirmed by performing a set of calibration experiments and comparing the measured total thermal conductance and thermal time constant with those predicted by the thermal model (FIG. 5). The details of the calibration runs are described in the next section. Finally, the aforementioned thermal parameters as well as the time series measurements of various temperatures $T_i$ were used in Equation 2 to calculate the heat release rate from the central node ($\dot{q}_{mid}$).

The outer shield temperature was feedback-controlled using a PID controller with a bandwidth of 1 Hz, which was sufficient to maintain, depending on operating conditions, a target temperature of 23-36° C. with <5 mK RMS temperature variation during the entire experiment. The inner shield temperature was controlled via two feedback loops for the left and right part of the inner shield running at 10 Hz. To provide high calorimetric resolution, the temperatures of the thermal shields are maintained at a steady value. In particular, the outer shield temperature was measured using a glass-encapsulated thermistor located 6 mm inside the bulk of the side wall of the outer shield as shown in FIG. 11, and heated using two planar film heaters (Omega Polyimide Film insulated heaters, 1" by 5", power=2.5 W/in²). This temperature was feedback-controlled using a PID controller (1 Hz bandwidth) with gains tuned using the Ziegler-Nichols method (see, e.g., Ziegler, J. G.; Nichols, N. B., Optimum settings for automatic controllers. trans. ASME 1942, 64 (11), incorporated herein by reference). This controller was sufficient to maintain the temperature at a target of 23-36° C. (depending on operating conditions) with better than 5 $mK_{RMS}$ stability. As an example, the stability of $T_{os}$ during an $H_2$ absorption experiment is shown in FIG. 12 at a setpoint of 23.2° C. The control of the inner shield temperature was more challenging specifically at higher temperature setpoints due to increased thermal coupling of the inner and outer shield, which increased the disturbance on the inner shield. In addition, the thermal time constant of the inner shield is ~600 s which is significantly smaller than that of the outer shield. A relatively high controller bandwidth of 10 Hz was used to address the combination of these effects, e.g., to reduce the temperature error band to the desired sub-mK level (see, e.g., Åström, K. J.; Wittenmark, B., Computer-controlled systems: theory and design. Courier Corporation: 2013, incorporated herein by reference). In addition, the significant variation in thermal conductance and thermal time constant of the inner shield as a function of temperature makes the thermal system a non-linear plant, which was controlled using a gain-scheduled PID controller where the gains vary as a function of reaction temperature (Ioannou, P. A.; Sun, J., Robust adaptive control. Courier Corporation: 2012, incorporated herein by reference). The stability of the capillary left and right ($T_{c\text{-}left}$ and $T_{c\text{-}right}$) temperatures during an $H_2$ absorption experiment are shown in FIG. 12.

Figure 7A:
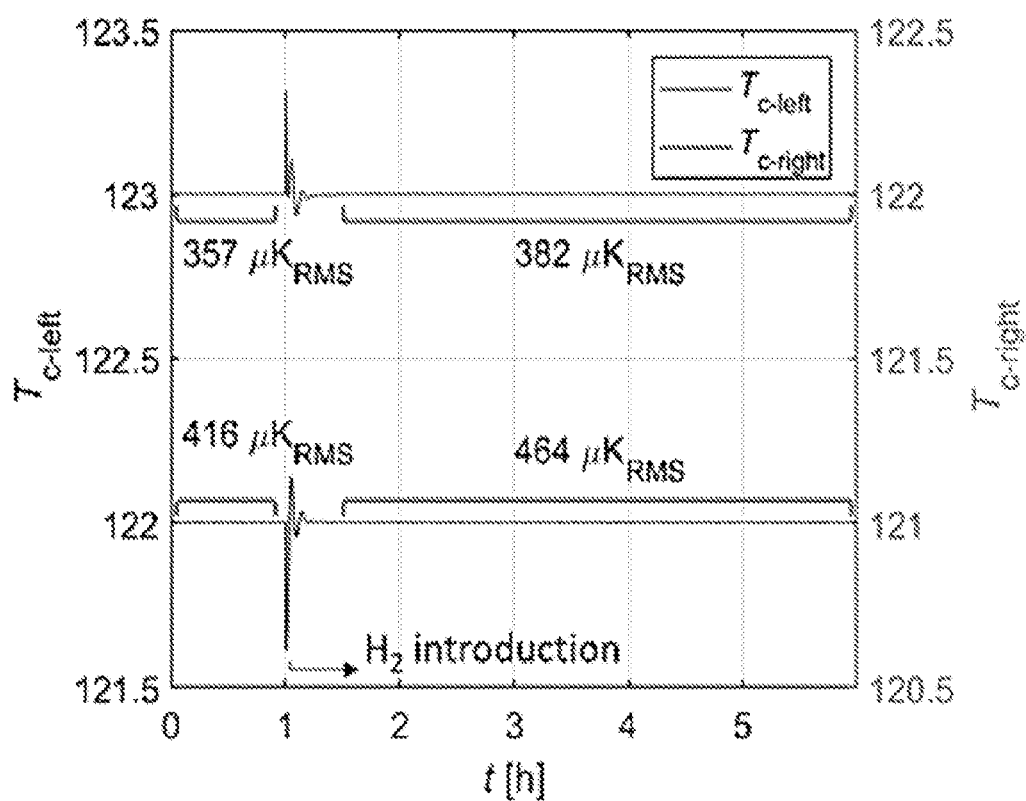
FIGS. 7A and 7B are plots showing the stability of the inner shield temperature controller during introduction of reactants to the capillary tube at a setpoint of 122° C.
Figure 7B:
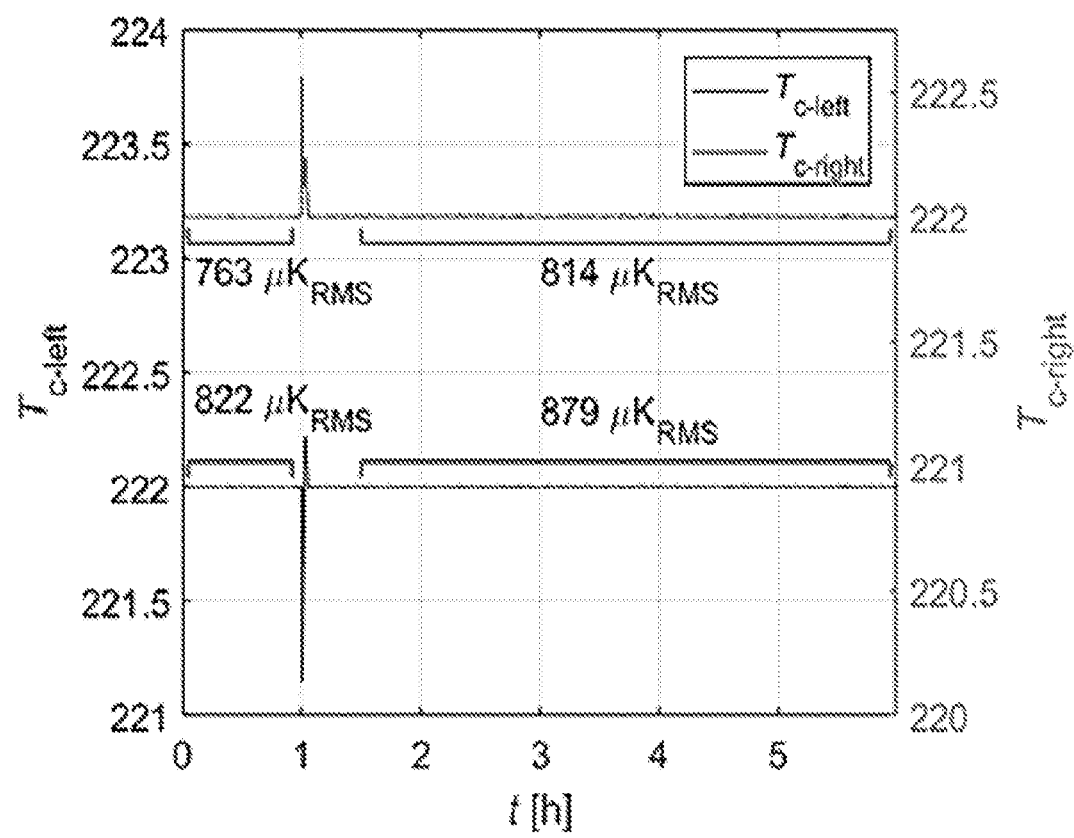
Figure 8A:
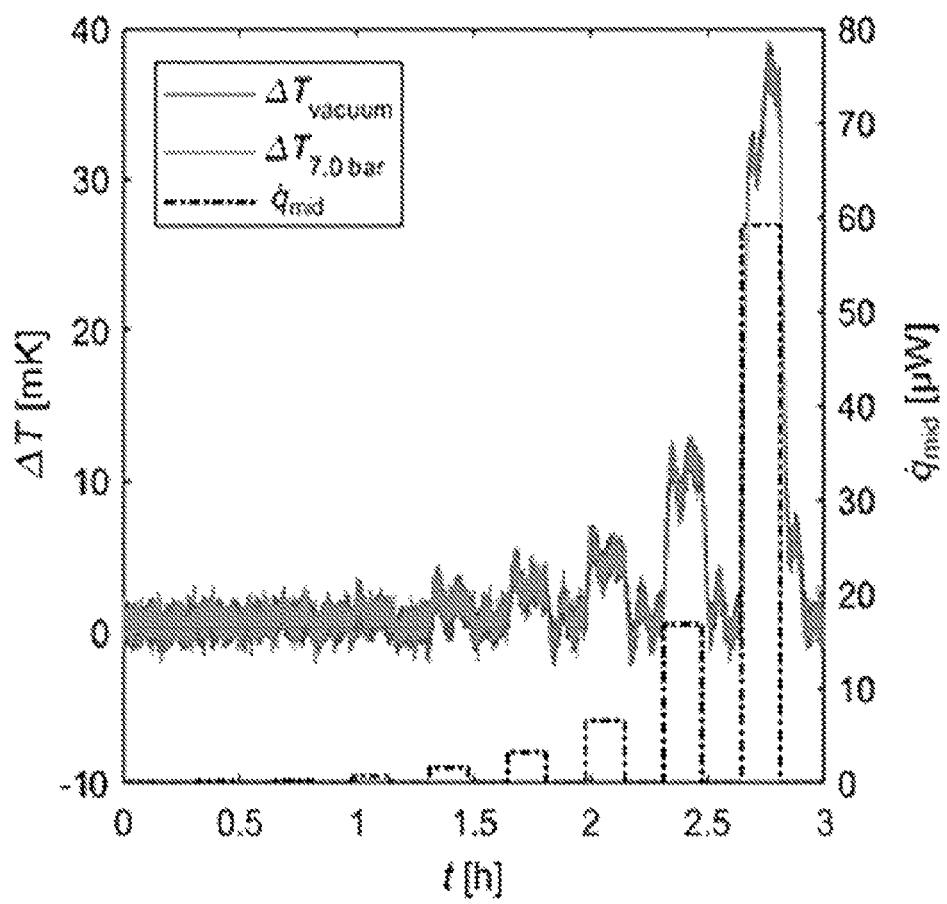
FIG. 8A to 8D are plots showing the characterization of the calorimeter at two different temperatures (a $T_{c-mid}$ value of 30° C.
Figure 8B:
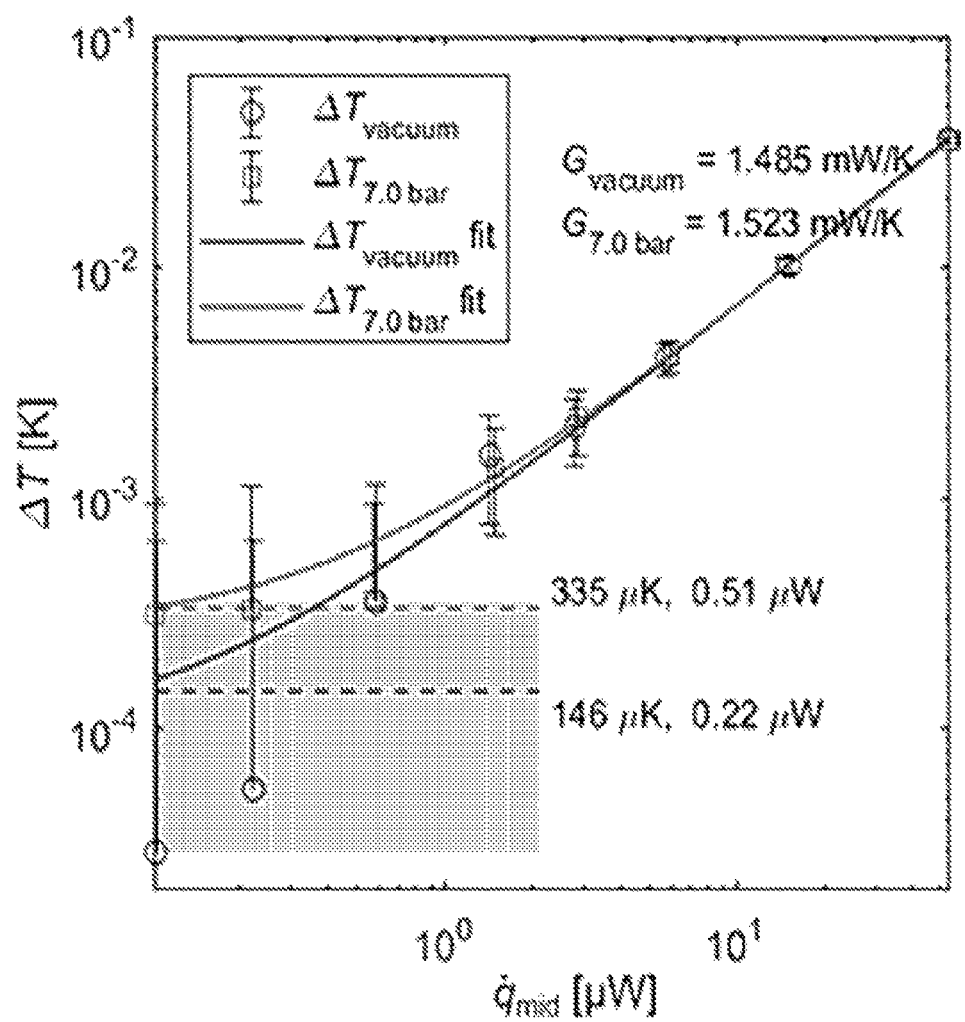
Figure 8C:
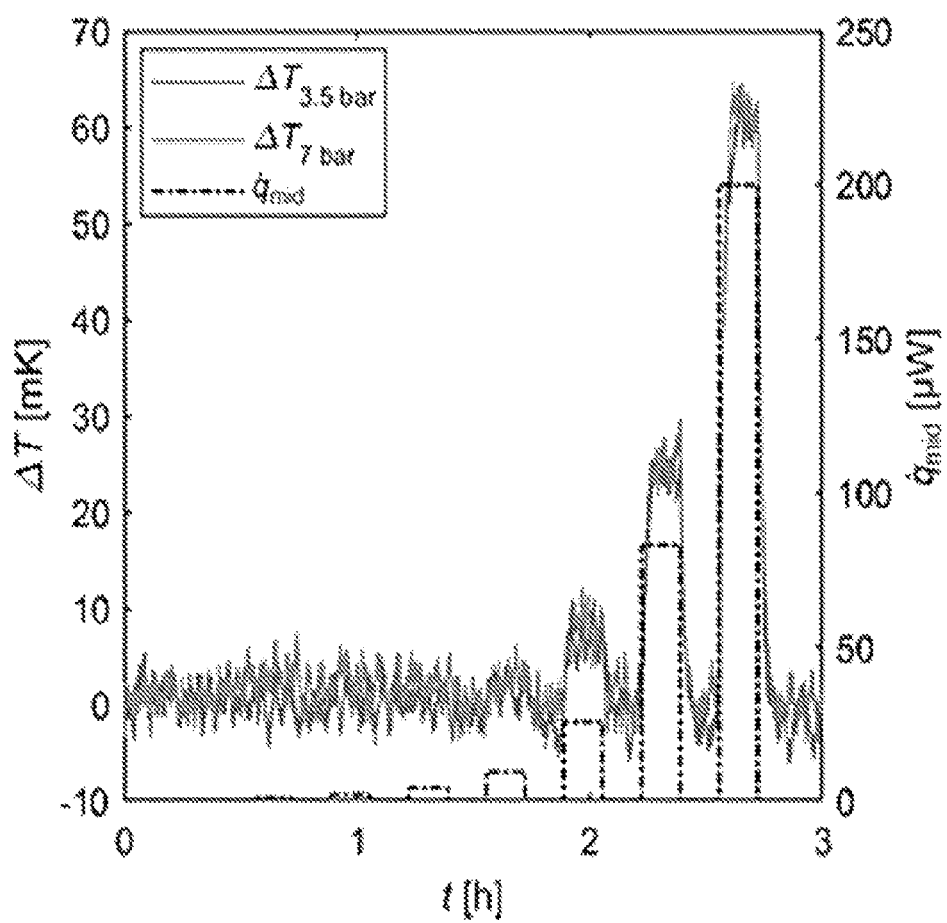
Figure 8D:
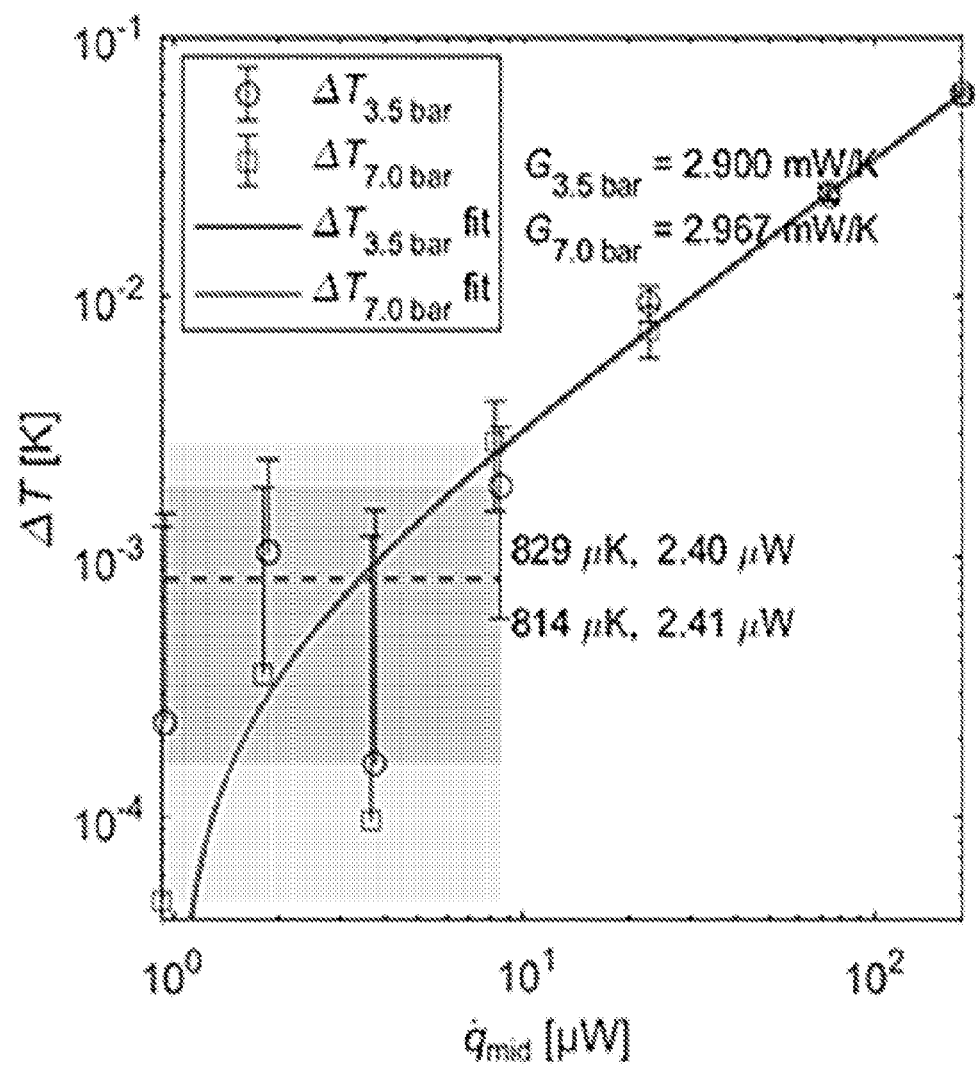

The measured temperature stability of the capillary located inside the inner shield is shown in FIG. 7, where, during the first hour of the experiment, the capillary tube is under vacuum and has a temperature stability of better than 1 mK. At a time t=1 hour the reactant gas ($H_2$) is introduced into the capillary tube leading to perturbation of $T_{c\text{-}left}$ and $T_{c\text{-}right}$, which settle back to millikelvin stability within 15 minutes of reactant introduction.

To characterize the calorimeter resolution, as well as the effective calorimeter conductance, the temperatures of the outer and inner shields are feedback-controlled at constant values and pulses of heat of increasing amplitude are deposited at the center node ($T_{c\text{-}mid}$) of the calorimeter using the calibration thermistor as a Joule heater. This test was repeated at different temperatures with the capillary tube being either under vacuum or filled with $H_2$ at different pressure levels. FIG. 8 shows the results of calorimeter characterization experiments at $T_{c\text{-}mid}$ values of 30° C. and 230° C. The transient response of the calorimeter to heat flow pulses (shown in FIGS. 8A and 8C) is used to extract the thermal time constant (e.g., the rise time to a temperature equal to $(1-e^{-1})\times\Delta T_{steady}$) (13). In addition, the total conductance of the center node ($T_{c\text{-}mid}$) to the surrounding nodes is obtained by a linear fit to the temperature rise as a function of power input (see FIGS. 8B and 8D). For instance, in FIG. 8B, total thermal conductances of 1.485 mW/K and 1.523 mW/K were obtained under vacuum conditions and when filled with $H_2$ under 7.0 bar of pressure, respectively, at 30° C. The slight increase in thermal conductance in the later case is due to the contribution arising from $H_2$. In addition, a heat flow resolution of 0.51 and 2.41 $\mu W/\sqrt{Hz}$ was observed at 30° and 230°, respectively. The decrease in calorimetric resolution at higher temperatures is due to (i) a decrease in inner shield temperature stability, and (ii) a decrease in thermistor resistance leading to a lower signal to noise ratio as discussed in below.

Example 3

During the development of embodiments of the technology provided herein, experiments were conducted to characterize hydrogenation of Pd nanoparticles. To demonstrate the utility of our calorimeter, experiments were conducted to observe hydrogenation of palladium (Pd) nanoparticles. In this reaction, hydrogen gas is absorbed on Pd particles, and it was expected (21) that, depending on the concentration of H in Pd lattice, either a low concentration α-phase, a high concentration β-phase, or a supercritical palladium hydride ($PdH_x$) would be formed. The sample in our experiments was composed of commercially available Pd nanoparticles with a mean diameter of 15 nm (US Research Nanomaterials Inc.—Pd 99.95%). FIG. 13A shows a scanning electron microscope (SEM) image of the sample as purchased, showing larger mean diameter of ~57 nm. After dispersion of the sample by five minutes of sonication in DI water, the image in FIG. 13B was obtained, which matches the specification mean diameter of ~15 nm. FIG. 13C shows the energy-dispersive X-ray spectroscopy (EDX) spectrum of the sample, indicating the Pd and carbon (C) peaks. The elemental analysis showed 99.47 Wt % of Pd and 0.53 Wt % of C, the small carbon content may be due to sample contamination by carrying it in atmospheric condition. Experiments at two pressure levels, 3 and 7 bar-absolute, and three temperature levels of 30, 125, and 230° C., were conducted.

The experiments were performed on seven different samples of identical Pd nanoparticles. As some of the samples were tested multiple times, it was important to consider the issue of hysteresis in hydrogen absorption/desorption. To minimize the effect of hysteresis, prior to each absorption experiment, the sample was pretreated under vacuum (<10 mTorr) and at high temperature (>150° C.) for a duration of at least two hours. Based on past work (21-22) on hydrogenation of Pd nanoparticles, at such low pressures and high temperatures it is expected that absorbed hydrogen is mostly desorbed and the absorption desorption curves overlap. In addition, based on past work (23, 24), the aforementioned preheating step was performed to remove a substantial portion of absorbed $O_2$ and water from the samples. For full $O_2$ removal from the Pd nanoparticles the samples are reduced under hydrogen environment; however, experimental procedures described herein avoided this reduction step during the sample pretreatment to make a measurement on the enthalpy of reaction during the first exposure of the sample to $H_2$, as well as subsequent exposures to $H_2$ during the repeats of the measurement. The detailed experimental conditions for these measurements are summarized in Table 2.

TABLE 1

Measuring hydrogenation enthalpy of Pd nanoparticles

|   | Experimental Step | Duration |
|---|---|---|
| 1 | Temperature ramp from 30° C. to 150° C. | 65 min |
| 2 | Pretreatment under vacuum | 120 min |
| 3 | Ramp to target temperature | — |
| 4 | Stabilize inner & outer shield temperatures | 120-240 min |
| 5 | Pre-chamber gas introduction | 30 s |
| 6 | Stabilize pre-chamber pressure | 2 min |
| 7 | Gas introduction to capillary tube | ~20 s |
| 8 | Measurement of thermal response | 300 min |
| 9 | Calibration run: heat flow step input sequence to capillary center | 160 min |
| 10 | Vacuum | 60 min |

During the introduction of gas-phase reactants into the calorimeter, a number of effects are considered to minimize and/or eliminate artifacts in the measurement of the heat of reaction. These effects include, e.g:

1. Cooling of reaction tube due to introduction of reactant gases at a lower temperature, as well as the Joule-Thomson effect due to expansion of the gas from the pre-chamber to the reactor capillary.
2. The aforementioned cooling of the reaction tube imposes an additional transient thermal load on the heaters, which can disturb the closed-loop temperature controller of the inner shield and temporarily perturb the temperature of different parts of the inner shield as shown in FIG. 7.
3. Introduction of gas into the capillary tube results in a change of its conductance which in turn leads to variations of the thermal resistance network and changes the steady-state temperature of the capillary center ($T_{c-mid}$), despite all other inner/outer shield temperatures maintained at constant values.

To minimize and/or eliminate the effects of the aforementioned artifacts, a baseline experiment was performed prior to each reaction experiment with operating conditions identical to the actual reaction experiment, e.g., identical sequence and timing of valve operation, gas introduction, and temperature set points. The baseline experiment can in principle be done using one of the following two approaches:

1. Using an empty sample capsule or using a non-reacting and non-absorbing sample.
2. Using an inert gas with similar thermal properties as the main reactant.

Experiments were performed using the first approach. To evaluate the performance of the calorimeter, a series of experiments was performed to characterize hydrogenation of small samples of Pd nanoparticles (mass ranging from 3.77 to 5.28 mg). Some examples of the absorption measurements at hydrogen pressure of 7 bar are shown in FIG. 9 (results at 3 bar are shown in FIG. 13A to FIG. 13C). As stated above, for all experiments, a baseline measurement was recorded using an empty sample holder. In all these figures a time span of 6 hours is shown, where initially the reaction capillary tube was under vacuum in the temperature stabilization step (step 4 in Table 2), then the chamber was pressurized (steps 5 and 6 in Table 2), and the reactant ($H_2$) at specified pressure was introduced into the reaction tube at t=1 h (step 7 in Table 2).

Although the heat output associated with the hydrogenation reaction was undetectably low 10 to 20 minutes after the start of the reaction, the experiments were continued for 5 hours to establish the long-term thermal stability of the calorimeter. FIGS. 9A, 9C, and 9E show the temperature rise of the capillary center ($\Delta T$) obtained by subtracting from the measured mid-point temperature ($T_{c-mid}$) the expected temperature of the midpoint ($T_{c-mid, expected}$) in the absence of heat generation in the capillary tube. The resistance network shown in FIG. 2 can be employed to obtain the expression shown in Equation 6 for evaluating $T_{c-mid, expected}$.

$$\Delta T = T_{c-mid} - T_{c-mid, expected}, \text{ where} \quad (6)$$

$$T_{c-mid, expected} = R_{tot} \sum_i T_i/R_i, \text{ and } R_{tot} = \left(\sum_i R_i^{-1}\right)^{-1}$$

It can be seen that $\Delta T$ is steady for the entire 1 hour (offset to zero in the plot) prior to the addition of hydrogen. Following the addition of hydrogen the reaction was rapidly initiated and a transient reaction lasting for ~0.3 hours was observed. Following this initial hydrogen absorption reaction the calorimetric heat signatures settled to a new steady-state value. This offset relative to the pre-hydrogen incubation level (~25 mK at to ~200 mK at 230° C.) is due to a change in thermal conductance of the capillary tube, which effectively changes the steady-state value of $T_{c-mid}$ at thermal equilibrium and is discussed in the previous section. This offset is well captured by the baseline experiment, eliminating a possible misinterpretation of "continuous" heat generation. Other transient artifacts which could occur in the first few minutes after reactant introduction, due to heat transfer to the reactant gas and temperature controller disturbance (as described in the previous section), are also eliminated by the baseline experiment.

To obtain the heat generation rate at the capillary center due to chemical reactions, subtract the net heat release rate (estimated using Eq. 2) of the baseline is subtracted from the absorption experiment ($\dot{q}_{rxn} = \dot{q}_{absorption} - \dot{q}_{baseline}$) (FIGS. 9B, 9D, and 9F). Inspection of the heat release plots revealed up to three features, depending on the reaction temperature.

(i) All heat release plots showed a sharp positive peak following the introduction of hydrogen (t=1 hour) with a full width (duration) at half maximum of less than 1 minute at all temperatures, which is limited by the calorimeter response time. This sharp peak is attributable to the initial step of hydrogenation, which is the dissociative chemisorption of $H_2$ molecules on the surface of Pd and is highly exothermic. Because of the low activation energy (23) of hydrogeneation, the initial heat generation does not show a large temperature dependence and occurs faster than the thermal response of the calorimeter at all reaction temperatures.

(ii) Following the initial saturation of chemisorbed hydrogen on the surface, the net heat release curves showed a smaller shoulder (e.g., a significantly smaller secondary peak), which was attributed to two possible processes: Hydrogen uptake by a subsurface layer of Pd (25) and subsequent diffusion to bulk Pd for forming α-phase hydride (23). Both these steps are moderately exothermic and, based on previous reports, have activation energies of approximately −29 and −25 kJ/mol-$H_2$) (25, 26) due to which they demonstrate a temperature dependent rate. The duration of this step is about 6 minutes at 30° C., decreasing to 2 minutes at 230° C.

(iii) An additional broad feature after 1.15 to 1.2 hours is seen at 30 and 125° C., which requires further studies to elucidate its origin, but can possibly be related to further bulk diffusion of hydrogen or to the formation of β-phase of Pd-hydride which is expected to occur on comparable timescales based on past work on α→β phase transformation kinetics (27).

It should be noted that, upon successfully incorporating the effect of the offset in $\Delta T$ via the baseline experiment, the heat release rate was seen to be close to zero ~0.3 hours after $H_2$ introduction in all experiments. Therefore, the integral of heat release rate from $t_{start}$=1 h (start of reaction) to $t_{end}$=1.3 h was used to obtain the heat of reaction (q) shown on FIGS. 9B, 9D, and 9F. To obtain a bound on the long term thermal stability of the instrument, the maximum deviation of cumulative heat release rate from zero in the period from t=5 h to t=6 h was calculated, which is listed as $\Delta q_{long}$ in the plots. As can be seen, the long-term uncertainty values are small compared to heat of hydrogenation during a five hour long experiment, indicating that the instrument can resolve the heat of reaction over several hours.

The results from these experiments along with some repeats are listed in Table 2.

TABLE 2

Summary of results of reaction calorimetry on hydrogenation of Pd nanoparticles.
To obtain the error on enthalpy (ΔH), the maximum error of heat of reaction
(q) is normalized by amount of absorbed reactant (mol-$H_2$)

| Test # | Sample label | $T_m$ °C. | $p_m$ bar | $m_{nd}$ mg | q mJ | max q error mJ | H/Pd — | ΔH kJ/mol-$H_2$ | Max ΔH error kJ/mol-$H_2$ | comment |
|---|---|---|---|---|---|---|---|---|---|---|
| 1 | A | 30.27 | 3.12 | 5.28 | 707.58 | 2.74 | 0.752 | −36.07 | 0.15 | $1^{st}$ absorption |
| 2 | A | 30.23 | 3.12 | 5.28 | 535.49 | 6.47 | 0.725 | −27.30 | 0.36 | $2^{nd}$ absorption |
| 3 | B | 30.29 | 3.11 | 5.45 | 2075.62 | 31.67 | 0.881 | −89.51 | 1.40 | no pre-hesting |
| 4 | C | 30.23 | 7.06 | 5.10 | 724.12 | 4.41 | 0.830 | −33.93 | 0.22 | $1^{st}$ absorption |
| 5 | D | 124.94 | 3.27 | 4.77 | 779.79 | 24.92 | 0.683 | −47.21 | 1.51 | $1^{st}$ absorption |
| 6 | E | 125.00 | 3.22 | 5.61 | 727.57 | 37.72 | 0.725 | −44.75 | 2.32 | $1^{st}$ absorption |
| 7 | F | 125.43 | 3.57 | 3.89 | 610.14 | 22.63 | 0.681 | −46.54 | 1.82 | $1^{st}$ absorption |
| 8 | F | 125.36 | 6.90 | 3.89 | 506.20 | 27.58 | 0.747 | −34.59 | 2.02 | $2^{nd}$ absorption |
| 9 | F | 125.34 | 6.88 | 3.89 | 504.73 | 26.52 | 0.763 | −33.69 | 1.90 | $3^{rd}$ absorption |
| 10 | F | 125.32 | 3.27 | 3.89 | 477.24 | 20.61 | 0.662 | −36.96 | 1.70 | $4^{th}$ absorption |
| 11 | F | 230.10 | 6.85 | 3.77 | 125.76 | 17.34 | 0.229 | −28.48 | 4.27 | $2^{nd}$ absorption |
| 12 | G | 230.09 | 6.86 | 3.77 | 130.59 | 12.59 | 0.231 | −29.43 | 3.08 | $3^{rd}$ absorption |
| 13 | G | 230.11 | 7.09 | 3.77 | 95.19 | 22.39 | 0.179 | −27.44 | 7.04 | $4^{th}$ absorption |
| 14 | G | 230.12 | 3.31 | 3.77 | 42.73 | 30.87 | 0.068 | −33.11 | 25.73 | $5^{th}$ absorption |
| 15 | G | 230.17 | 3.27 | 3.77 | 54.95 | 7.05 | 0.100 | −28.55 | 3.98 | $6^{th}$ absorption |

In Table 3, the second column shows the sample label for the experiments. The samples were all taken from a single batch of Pd nanoparticles; therefore, on average their properties are expected to be identical. The third and fourth columns list the mean reaction temperature during measurement and equilibrium hydrogen pressure after its introduction into the capillary tube, respectively. The main results are the internal energy (ΔU) and enthalpy (ΔH) of hydrogenation calculated using Equations 7 and 8, and the equilibrium atomic ratio of hydrogen to palladium (H/Pd).

$$\Delta U = q = \frac{1}{\Delta n_{absorbed}} \int_{t_{start}}^{t_{end}} (\dot{q}_{absorption} - \dot{q}_{baseline}) dt \quad (7)$$

$$\Delta H = \frac{1}{\Delta n_{absorbed}} \left( \int_{t_{start}}^{t_{end}} (\dot{q}_{absorption} - \dot{q}_{baseline}) dt + V\Delta p \right) \quad (8)$$

In Equation 8, the VΔp term is the heat of compression, where $V=\forall_1+\forall_2=6.59$ ml was the total volume of the gas after introduction to the capillary, and Δp was the pressure change as a result of reaction. The contribution of VΔp was relatively small, e.g. at 30° C. and 7 bar, VΔp=6.59 ml×(−7.52 kPa)=−49.58 mJ compared to the heat of reaction of q=724.12 mJ. The measurements at 30° C. and 3 bar were repeated twice, with and without preheating a fresh sample at 150° C. The experiment with a fresh sample without preheating showed a much larger enthalpy of hydrogenation, which is believed to be due to oxidation of hydrogen by the residual oxygen on the sample. Based on past work (23, 24), preheating a fresh sample under vacuum may have been necessary to desorb residual oxygen and water and obtain metallic Pd prior to hydrogen introduction.

To check the accuracy of the instrument and analysis procedure, the experiment was repeated at 125° C. and 3 bar three times on different Pd samples (test #5-7 listed in Table 3). The results indicated closely clustered enthalpies of hydrogenation for the three repeats with a standard deviation of 2.75%. This relatively small variation observed may be attributed to sample to sample variation of equilibrium H:Pd ratio (21), and variation in equilibrium $H_2$ pressure.

FIG. 10A shows the internal energy of hydrogenation of Pd nanoparticles, per unit mass of Pd as a function of equilibrium H/Pd ratio. The data indicate a linear pattern and are in good agreement with previous measurements on bulk Pd (28). FIG. 10B shows the enthalpy of hydrogenation per mole of adsorbed $H_2$, which spans a range from −28.45 to −36.96 kJ/mol-$H_2$. This value is also in agreement with previous studies that mostly use an indirect measurement of the enthalpy of hydrogenation using an isotherm method and Van't Hoff s relation, clustered within −28 to −40 kJ/mol-$H_2$ depending on Pd particle size and measurement technique (21, 22, 269, 30). The results are also in agreement with previous calorimetric measurements, which report a wide range for the enthalpy of hydrogenation of Pd (−32 to approximately −60 kJ/mol-$H_2$) (7, 23, 31). In FIG. 10B, the enthalpy of hydrogenation showed no significant trend as a function of temperature; however, a decrease in absolute value of enthalpy of hydrogenation with the reaction pressure was observed. This effect can be explained based on the variation of equilibrium H/Pd ratio as a function of reaction pressure, where some previous studies have reported that the enthalpy of hydrogenation is higher at lower H/Pd ratios as a result of highly exothermic dissociative chemisorption of $H_2$ molecules on the Pd surface (23, 28).

In terms of the equilibrium phase of the Pd hydride, the data indicated that all the measurements at 230° C. (503 K) demonstrated a low equilibrium hydrogen concentration of H/Pd<0.23 after the reaction. Based on previous calculations and measurements on Pd nanoparticles, this low concentration indicates either an a-phase or a supercritical palladium hydride phase (21, 32). On the other hand, measurements at 30 and 125° C. showed a higher hydrogen concentration of H/Pd>0.66, which indicated a β-phase of palladium hydride (see the phase diagram of $PdH_x$ nanoparticles in FIG. 14A-F). FIG. 14A-F show some examples of the measurement of heat of hydrogenation of Pd nanoparticles at a hydrogen pressure of 3 bar. The heat release curves are of similar shape to the experiments at 7 bar (FIG. 9). However, they produce a smaller heat output as a result of less hydrogen absorption. The temperature offset after reactant introduction is also slightly different compared to the case of 7 bar which is due to the pressure dependent conductance of the capillary tube, this effect is well captured and eliminated by measurement of baseline at the same reaction pressure of 3 bar. Therefore, at all reaction pressures tested here, the heat release goes to a value close to zero ~0.3 hours after reactant introduction.

To compare the results with the literature, the equilibrium H/Pd ratio is plotted on the phase diagram of H—Pd system for 32 nm Pd nanocubes in FIG. 15. The solid lines indicate the results of a statistical mechanics Ising model (adapted from Griessen, R.; Strohfeldt, N.; Giessen, H., Thermodynamics of the hybrid interaction of hydrogen with palladium nanoparticles. Nature materials 2016, 15(3), 311-317, incorporated herein by reference) and filled circles are experimental results using luminescent based sensing of H-content measured by Bardhan, R.; Hedges, L. O.; Pint, C. L.; Javey, A.; Whitelam, S.; Urban, J. J., Uncovering the intrinsic size dependence of hydriding phase transformations in nanocrystals. *Nature materials* 2013, 12(10), 905-912, incorporated herein by reference. However, since the photo-luminescent based approach does not provide an absolute value of H-content and only provides relative values, it is scaled by Griessen et al. to fit their model. The experiments reported herein used the scaled values in this plot as well. It can be seen that all the measurements at 230° C. (503 K) are either in the low concentration α-phase or in the supercritical phase. On the other hand, measurements at 30° C. and 125° C. are in the β-phase.

All publications and patents mentioned in the above specification by citation and/or by reference number and listed below are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

REFERENCES

1. Prieto, G.; Zečević, J.; Friedrich, H.; De Jong, K. P.; De Jongh, P. E., Towards stable catalysts by controlling collective properties of supported metal nanoparticles. *Nature materials* 2013, 12 (1), 34-39.
2. Murdoch, M.; Waterhouse, G.; Nadeem, M.; Metson, J.; Keane, M.; Howe, R.; Llorca, J.; Idriss, H., The effect of gold loading and particle size on photocatalytic hydrogen production from ethanol over Au/TiO 2 nanoparticles. *Nature chemistry* 2011, 3(6), 489-492.
3. Mohtadi, R.; Orimo, S.-i., The renaissance of hydrides as energy materials. *Nature Reviews Materials* 2016, 2(3), 1-15.
4. Xu, Z.; Xiao, F.-S.; Purnell, S.; Alexeev, O.; Kawi, S.; Deutsch, S.; Gates, B., Size-dependent catalytic activity of supported metal clusters. *Nature* 1994, 372 (6504), 346-348.
5. Mauron, P.; Bielmann, M.; Bissig, V.; Remhof, A.; Züttel, A., High-pressure and high-temperature differential scanning calorimeter for combined pressure-concentration-temperature measurements of hydrides. *Review of Scientific Instruments* 2009, 80(9), 095113.
6. MacLeod, B.; Schauer, P.; Hu, K.; Lam, B.; Fork, D.; Berlinguette, C., High-temperature high-pressure calorimeter for studying gram-scale heterogeneous chemical reactions. *Review of Scientific Instruments* 2017, 88(8), 084101.
7. Akiba, H.; Hashimoto, N.; Kofu, M.; Kobayashi, H.; Kitagawa, H.; Yamamuro, O., Development of adiabatic calorimetry system for enthalpy of gas absorption/adsorption and its application to H2/D2 absorption into palladium nanoparticles. *Thermochimica Acta* 2018, 670, 87-91.
8. Fischer-Wolfarth, J.-H.; Hartmann, J.; Farmer, J. A.; Flores-Camacho, J. M.; Campbell, C. T.; Schauermann, S.; Freund, H.-J., An improved single crystal adsorption calorimeter for determining gas adsorption and reaction energies on complex model catalysts. *Review of Scientific Instruments* 2011, 82(2), 024102.
9. Smith, A. L.; Shirazi, H. M., Principles of quartz crystal microbalance/heat conduction calorimetry: Measurement of the sorption enthalpy of hydrogen in palladium. *Thermochimica Acta* 2005, 432(2), 202-211.
10. Fiorino, A.; Thompson, D.; Yadlapalli, S.; Jiang, C.; Shafer, O. T.; Reddy, P.; Meyhofer, E., Parallelized, real-time, metabolic-rate measurements from individual Drosophila. *Scientific reports* 2018, 8(1), 1-10.
11. Hur, S.; Mittapally, R.; Yadlapalli, S.; Reddy, P.; Meyhofer, E., Sub-nanowatt resolution direct calorimetry for probing real-time metabolic activity of individual C. elegans worms. *Nature Communications* 2020.
12. Lide, D. R., *CRC handbook of chemistry and physics*. CRC press: 2004; Vol. 85.
13. Bergman, T.; Lavine, A.; Incropera, F.; Dewitt, D., Fundamentals of heat and mass transfer John Wiley & Sons. Inc: 2011.
14. Assael, M.; Botsios, S.; Gialou, K.; Metaxa, I., Thermal conductivity of polymethyl methacrylate (PMMA) and borosilicate crown glass BK7. *International Journal of Thermophysics* 2005, 26(5), 1595-1605.
15. Powell, R.; Ho, C. Y.; Liley, P. E., Thermal conductivity of selected materials. US Department of Commerce, National Bureau of Standards Washington, DC: 1966; Vol. 8.
16. Roder, H., Thermal conductivity of hydrogen for temperatures between 78 and 310 K with pressures to 70 MPa. *International journal of thermophysics* 1984, 5(4), 323-350.
17. McMahon, H. O., Thermal radiation characteristics of some glasses. *Journal of the American Ceramic Society* 1951, 34(3), 91-96.
18. Tavárez, A.; González, J., Modeling the thermal behavior of solder paste inside reflow ovens. *J. Electron. Packag.* 2003, 125(3), 335-346.
19. Vries, T. D., Specific Heat of Pyrex Glass from 25 to 175 C. *Industrial & Engineering Chemistry* 1930, 22(6), 617-618.
20. Sharp, D.; Ginther, L., Effect of composition and temperature on the specific heat of glass. *Journal of the American Ceramic Society* 1951, 34(9), 260-271.
21. Griessen, R.; Strohfeldt, N.; Giessen, H., Thermodynamics of the hybrid interaction of hydrogen with palladium nanoparticles. *Nature materials* 2016, 15(3), 311-317.
22. Syrenova, S.; Wadell, C.; Nugroho, F. A.; Gschneidtner, T. A.; Fernandez, Y. A. D.; Nalin, G.; Świtlik D.; Westerlund, F.; Antosiewicz, T. J.; Zhdanov, V. P., Hydride formation thermodynamics and hysteresis in individual Pd nanocrystals with different size and shape. *Nature materials* 2015, 14(12), 1236-1244.

23. Huang, S.-Y.; Huang, C.-D.; Chang, B.-T.; Yeh, C.-T., Chemical activity of palladium clusters: sorption of hydrogen. *The Journal of Physical Chemistry B* 2006, 110(43), 21783-21787.
24. Yamauchi, M.; Ikeda, R.; Kitagawa, H.; Takata, M., Nanosize effects on hydrogen storage in palladium. *The Journal of Physical Chemistry C* 2008, 112(9), 3294-3299.
25. Behm, R.; Penka, V.; Cattania, M. G.; Christmann, K.; Ertl, G., Evidence for "subsurface" hydrogen on Pd (110): An intermediate between chemisorbed and dissolved species. *The Journal of Chemical Physics* 1983, 78(12), 7486-7490.
26. Langhammer, C.; Zhdanov, V. P.; Zorić, I.; Kasemo, B., Size-dependent kinetics of hydriding and dehydriding of Pd nanoparticles. *Physical review letters* 2010, 104(13), 135502.
27. Johnson, N. J.; Lam, B.; MacLeod, B. P.; Sherbo, R. S.; Moreno-Gonzalez, M.; Fork, D. K.; Berlinguette, C. P., Facets and vertices regulate hydrogen uptake and release in palladium nanocrystals. *Nature materials* 2019, 18(5), 454-458.
28. Jewell, L. L.; Davis, B. H., Review of absorption and adsorption in the hydrogen-palladium system. *Applied Catalysis A: General* 2006, 310, 1-15.
29. Dantzer, P.; Millet, P., Advances in hydride phase growth: Automatic high precision calorimeter-volumetric devices, for thermodynamic and kinetics analyses. *Review of scientific instruments* 2000, 71(1), 142-153.
30. Wadell, C.; Pingel, T.; Olsson, E.; Zorić, I.; Zhdanov, V. P.; Langhammer, C., Thermodynamics of hydride formation and decomposition in supported sub-10 nm Pd nanoparticles of different sizes. *Chemical Physics Letters* 2014, 603, 75-81.
31. Robinson, D. B.; Luo, W.; Cai, T. Y.; Stewart, K. D., Metal hydride differential scanning calorimetry as an approach to compositional determination of mixtures of hydrogen isotopologues and helium. *International Journal of Hydrogen Energy* 2015, 40 (41), 14257-14270.
32. Bardhan, R.; Hedges, L. O.; Pint, C. L.; Javey, A.; Whitelam, S.; Urban, J. J., Uncovering the intrinsic size dependence of hydriding phase transformations in nanocrystals. *Nature materials* 2013, 12(10), 905-912.

We claim:

1. A calorimetry system comprising:
   i) a calorimetry apparatus comprising:
      a capillary comprising a sample holder capsule;
      an inner thermal shield encapsulating the capillary and in thermal communication with the capillary; and
      an outer thermal shield encapsulating the inner thermal shield and thermally isolated from an environment; and
   ii) a gas handling unit configured to provide a gas phase reactant to the sample holder capsule,
   wherein said gas handling unit comprises:
      a gas handling unit capillary tube coupled to the calorimetry apparatus capillary; and
      a prechamber configured to hold and provide the gas phase reactant to the gas handling unit capillary tube.

2. The calorimetry system of claim 1, wherein said apparatus has a heat flow resolution of less than 3 $\mu W/\sqrt{Hz}$.

3. The calorimetry system of claim 1, wherein said apparatus operates over a temperature range of 20° C. to 300° C.

4. The calorimetry system of claim 1, wherein said sample holder capsule comprises the gas phase reactant.

5. The calorimetry system of claim 1, wherein said sample holder capsule comprises a solid phase reactant.

6. The calorimetry system of claim 5, wherein said solid phase reactant has a mass of 1-10 mg.

7. The calorimetry system of claim 5, wherein said solid phase reactant comprises a nanomaterial.

8. A method of measuring a heat transfer for a chemical reaction, said method comprising:
   providing the calorimetry system of claim 1;
   reacting a solid phase reactant with the gas phase reactant in said sample holder capsule; and
   recording a heat transfer measurement of heat produced by reacting said solid phase reactant with said gas phase reactant.

9. The method of claim 8, further comprising providing said gas phase reactant using said gas handling unit.

10. The method of claim 8, wherein said heat transfer measurement has a resolution of less than 3 $\mu W/\sqrt{Hz}$.

11. The method of claim 8, further comprising removing gas from a volume enclosed by said outer thermal shield or enclosed by said gas handling unit to provide a pressure of less than 10, 9, 8, 7, 6, or 5 $\mu$Torr.

12. The method of claim 8, further comprising heating the outer thermal shield.

13. The method of claim 8, wherein said solid phase reactant has a mass of 1-10 mg.

14. The method of claim 8, wherein said solid phase reactant comprises a nanomaterial.

15. The method of claim 8, wherein recording the heat transfer measurement comprises using a thermistor ultrasonically soldered to said capillary.

16. The method of claim 8, further comprising quantifying a mass of said gas phase reactant.

17. The method of claim 8, further comprising quantifying a mass of said gas phase reactant that reacts with said solid phase reactant to form a product.

* * * * *